(12) United States Patent
Niibo et al.

(10) Patent No.: US 11,209,828 B2
(45) Date of Patent: Dec. 28, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Nana Niibo, Wako (JP); Chihiro Abe, Wako (JP); Katsuya Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 292 days.

(21) Appl. No.: 16/433,036

(22) Filed: Jun. 6, 2019

(65) Prior Publication Data
US 2019/0384305 A1   Dec. 19, 2019

(30) Foreign Application Priority Data
Jun. 15, 2018   (JP) ............... JP2018-114871

(51) Int. Cl.
*G05D 1/02*    (2020.01)
*B60W 30/18*   (2012.01)

(52) U.S. Cl.
CPC ..... *G05D 1/0223* (2013.01); *B60W 30/18163* (2013.01); *B60W 2552/30* (2020.02);
(Continued)

(58) Field of Classification Search
CPC .... B60W 30/08; B60W 30/14; B60W 30/143; B60W 30/18163; B60W 10/04;
(Continued)

(56) References Cited

U.S. PATENT DOCUMENTS

| 7,860,639 B2 * | 12/2010 | Yang ............... G08G 1/081 |
| | | 701/117 |
| 2008/0040029 A1 * | 2/2008 | Breed ................ G01S 19/17 |
| | | 701/514 |

(Continued)

FOREIGN PATENT DOCUMENTS

| CN | 106461406 A | * | 2/2017 | ............. G08G 1/133 |
| CN | 105292116 B | * | 1/2018 | ............. B60W 30/12 |

(Continued)

OTHER PUBLICATIONS

Japanese Office Action for Japanese Patent Application No. 2018-114871 dated Dec. 10, 2019.

*Primary Examiner* — Atul Trivedi
(74) *Attorney, Agent, or Firm* — Amin, Turocy & Watson, LLP

(57) ABSTRACT

A vehicle control device includes a recognizer configured to recognize a surrounding situation of a host vehicle and a driving controller configured to control acceleration/deceleration and steering of the host vehicle on the basis of a recognition result of the recognizer, wherein the driving controller determines a target speed of the host vehicle by reflecting a first target speed based on a relationship between a first vehicle that travels in front of the host vehicle in a first lane and the host vehicle and a second target speed based on a relationship between a second vehicle that travels in front of a target position to which the host vehicle makes a lane change in a second lane and the host vehicle in a prescribed ratio according to progress of the lane change when the lane change from the first lane to the second lane is made.

11 Claims, 39 Drawing Sheets

(52) U.S. Cl.
CPC . *B60W 2554/4041* (2020.02); *B60W 2710/20* (2013.01); *B60W 2720/106* (2013.01); *G05D 1/0231* (2013.01); *G05D 1/0257* (2013.01); *G05D 2201/0213* (2013.01)

(58) Field of Classification Search
CPC .. B60W 10/18; B60W 10/20; B60W 2420/42; B60W 2420/52; B60W 2554/00; B60W 2554/4041; B60W 2552/15; B60W 2552/30; B60W 2720/106; B60W 2556/50; B60W 2710/20; G05D 1/0223; G05D 1/0231; G05D 1/0257; G05D 2201/0213
USPC ............................................................ 701/23
See application file for complete search history.

(56) References Cited

U.S. PATENT DOCUMENTS

| | | | |
|---|---|---|---|
| 2015/0197248 A1* | 7/2015 | Breed | G08G 1/167 701/93 |
| 2016/0001781 A1* | 1/2016 | Fung | B60K 28/02 701/36 |
| 2016/0185388 A1* | 6/2016 | Sim | B60W 10/20 701/41 |
| 2017/0261989 A1* | 9/2017 | Ishioka | G05D 1/0212 |
| 2017/0308090 A1* | 10/2017 | Asakura | B60W 30/182 |
| 2017/0313313 A1* | 11/2017 | Asakura | B60W 50/0098 |
| 2017/0313321 A1* | 11/2017 | Asakura | G01C 21/3469 |
| 2017/0314957 A1* | 11/2017 | Mimura | G05D 1/021 |
| 2017/0315551 A1* | 11/2017 | Mimura | B62D 15/025 |
| 2017/0315556 A1* | 11/2017 | Mimura | G08G 1/167 |
| 2017/0332010 A1* | 11/2017 | Asakura | G05D 1/0223 |
| 2017/0334452 A1* | 11/2017 | Abe | G05D 1/0088 |
| 2017/0334453 A1* | 11/2017 | Mimura | B60W 30/12 |
| 2017/0334454 A1* | 11/2017 | Abe | B60W 50/0098 |
| 2017/0349173 A1* | 12/2017 | Nishiguchi | B62D 15/0255 |
| 2018/0086373 A1* | 3/2018 | Tamura | B60W 40/06 |
| 2018/0126990 A1* | 5/2018 | Shimada | B60W 30/09 |
| 2018/0297639 A1* | 10/2018 | Fujii | G05D 1/0212 |
| 2018/0297640 A1* | 10/2018 | Fujii | B62D 15/0255 |
| 2018/0345959 A1* | 12/2018 | Fujii | B60W 30/18163 |
| 2018/0345960 A1* | 12/2018 | Fujii | B62D 15/0255 |
| 2019/0016338 A1 | 1/2019 | Ishioka et al. | |
| 2019/0347939 A1* | 11/2019 | Kim | B60W 30/18163 |
| 2019/0382019 A1* | 12/2019 | Abe | G08G 1/167 |
| 2019/0382021 A1* | 12/2019 | Niibo | B60W 10/04 |
| 2019/0382022 A1* | 12/2019 | Niibo | B60W 30/165 |
| 2019/0384305 A1* | 12/2019 | Niibo | B60W 30/14 |
| 2020/0406969 A1* | 12/2020 | Ersal | B60W 30/18163 |
| 2021/0004615 A1* | 1/2021 | Yashiro | G06K 9/00798 |
| 2021/0009103 A1* | 1/2021 | Yashiro | B60W 30/18163 |
| 2021/0009126 A1* | 1/2021 | Yashiro | B60W 30/18163 |
| 2021/0009127 A1* | 1/2021 | Horiba | B60W 30/16 |
| 2021/0009134 A1* | 1/2021 | Horiba | B60W 30/18163 |
| 2021/0009148 A1* | 1/2021 | Oguro | B60W 50/14 |

FOREIGN PATENT DOCUMENTS

| | | | | | |
|---|---|---|---|---|---|
| CN | 109435943 | A | * | 3/2019 | ......... B60W 30/095 |
| CN | 110667578 | A | * | 1/2020 | ....... B60W 60/0011 |
| CN | 111361564 | A | * | 7/2020 | |
| CN | 211995540 | U | * | 11/2020 | |
| DE | 102017128201 | A1 | * | 6/2018 | ........... B60W 10/20 |
| JP | 2003-025868 | | | 1/2003 | |
| JP | 2004330995 | A | * | 11/2004 | ......... B62D 15/025 |
| JP | 2009-149255 | | | 7/2009 | |
| JP | 4389567 | B2 | * | 12/2009 | .............. B62D 1/28 |
| JP | 2017-165153 | | | 9/2017 | |
| WO | WO-2004045890 | A1 | * | 6/2004 | ........... B60W 30/16 |
| WO | WO-2015200224 | A2 | * | 12/2015 | ........... B60W 40/08 |
| WO | 2017/022448 | | | 2/2017 | |
| WO | 2017-141788 | | | 8/2017 | |
| WO | 2017/179710 | | | 10/2017 | |
| WO | WO-2021053393 | A1 | * | 3/2021 | ........... G08G 1/0133 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-114871, filed Jun. 15, 2018, the content of which is incorporated herein by reference.

BACKGROUND

Field of the Invention

The present invention relates to a vehicle control device, a vehicle control method, and a storage medium.

Description of Related Art

Recently, research on technology for automatedly controlling vehicles has been conducted. In relation to such technology, the invention of a vehicle control device including a recognizer configured to recognize a position of a nearby vehicle that travels around a host vehicle; a target position setter configured to set a lane change target position to a lane of a lane change destination to which the host vehicle automatically makes a lane change; a lane change possibility determiner configured to determine that the lane change is possible when one or both of a first condition in which the nearby vehicle is absent in a forbidden area which is a lateral side of the host vehicle and which is set on the lane of the lane change destination and a second condition in which time to collision (TTC) between the host vehicle and the nearby vehicle present in front of or behind the target position is greater than a threshold value are satisfied; and a controller configured to cause the host vehicle to make the lane change to the lane of the lane change destination when the lane change possibility determiner determines that the lane change is possible has been disclosed (PCT International Publication No. WO/2017/141788).

SUMMARY

In the conventional technology, it is not possible to preferably perform speed control during a lane change and an occupant may feel uncomfortable.

An aspect of the present invention has been made in consideration of such circumstances and an objective of the present invention is to provide a vehicle control device, a vehicle control method, and a storage medium capable of implementing a natural lane change with little discomfort.

A vehicle control device, a vehicle control method, and a storage medium according to the present invention adopt the following configurations.

(1): According to an aspect of the present invention, there is provided a vehicle control device including: a recognizer configured to recognize a surrounding situation of a host vehicle; and a driving controller configured to control acceleration/deceleration and steering of the host vehicle on the basis of a recognition result of the recognizer, wherein the driving controller determines a target speed of the host vehicle by reflecting a first target speed based on a relationship between a first vehicle that travels in front of the host vehicle in a first lane and the host vehicle and a second target speed based on a relationship between a second vehicle that travels in front of or behind a target position to which the host vehicle makes a lane change in a second lane and the host vehicle in a prescribed ratio according to progress of the lane change when the driving controller causes the host vehicle to make the lane change from the first lane to the second lane, and wherein the driving controller determines a degree of change in the prescribed ratio relative to the progress of the lane change in accordance with a type of lane change.

(2): In the above-described aspect (1), the progress of the lane change is progress in an extension direction of a road or progress in a width direction of the road.

(3): In the above-described aspect (1), the driving controller causes the degree of change in the prescribed ratio relative to the progress of the lane change to be different between a first case in which the host vehicle is able to be moved to the target position without changing relative positions of the host vehicle and the second vehicle in a road extension direction at a start time point of the lane change and a second case in which it is necessary to change the relative positions so that the host vehicle is moved to the target position at the start time point of the lane change.

(4): In the above-described aspect (3), the driving controller sets a ratio in which the second target speed at the start time point of the lane change is reflected to a value exceeding zero in the first case.

(5): In the above-described aspect (3), the driving controller makes an increase rate of the ratio in which the second target speed is reflected slower than an increase rate before a state when the state in which the host vehicle is able to be moved to the target position is reached without changing the relative positions of the host vehicle and the second vehicle in the road extension direction according to the progress of the lane change in the first case.

(6): In the above-described aspect (1), the driving controller causes the degree of change in the prescribed ratio relative to the progress of the lane change to be different between a case A in which the acceleration/deceleration is performed during the lane change and a case B in which no acceleration/deceleration is performed during the lane change.

(7): In the above-described aspect (1), when a state in which the host vehicle is able to be moved to the target position is reached without changing relative positions of the host vehicle and the second vehicle in a road extension direction, the driving controller makes an increase rate of the ratio in which the second target speed relative to the progress of the lane change before a first time point is reflected slower than an increase rate of the ratio in which the second target speed relative to the progress of the lane change after the first time point is reflected.

(8): In the above-described aspect (7), when the state in which the host vehicle is able to be moved to the target position is reached without changing the relative positions of the host vehicle and the second vehicle in the road extension direction, the driving controller makes an increase rate of the ratio in which the second target speed relative to the progress of the lane change before a second time point after the first time point is reflected faster than an increase rate of the ratio in which the second target speed relative to the progress of the lane change after the second time point is reflected.

(9): In the above-described aspect (1), after the host vehicle enters a lane of a lane change destination, the driving controller controls the acceleration/deceleration of the host vehicle so that an inter-vehicle distance from another vehicle in the lane of the lane change destination is extended.

(10): In the above-described aspect (1), the driving controller sets a predetermined prescribed speed as the first target speed or the second target speed if there is no object vehicle in an appropriate range when the first target speed or the second target speed is determined.

(11): According to another aspect of the present invention, there is provided a vehicle control method including: recognizing, by a computer, a surrounding situation of a host vehicle; controlling, by the computer, acceleration/deceleration and steering of the host vehicle on the basis of a recognition result; determining, by the computer, a target speed of the host vehicle by reflecting a first target speed based on a relationship between a first vehicle that travels in front of the host vehicle in a first lane and the host vehicle and a second target speed based on a relationship between a second vehicle that travels in front of a target position to which the host vehicle makes a lane change in a second lane and the host vehicle in a prescribed ratio according to progress of the lane change when the host vehicle makes the lane change from the first lane to the second lane, and determining, by the computer, a degree of change in the prescribed ratio relative to the progress of the lane change in accordance with a type of lane change.

(12): According to another aspect of the present invention, there is provided a computer-readable non-transitory storage medium storing a program for causing a computer to: recognize a surrounding situation of a host vehicle; control acceleration/deceleration and steering of the host vehicle on the basis of a recognition result; determine a target speed of the host vehicle by reflecting a first target speed based on a relationship between a first vehicle that travels in front of the host vehicle in a first lane and the host vehicle and a second target speed based on a relationship between a second vehicle that travels in front of a target position to which the host vehicle makes a lane change in a second lane and the host vehicle in a prescribed ratio according to progress of the lane change when the host vehicle makes the lane change from the first lane to the second lane; and determine a degree of change in the prescribed ratio relative to the progress of the lane change in accordance with a type of lane change.

According to (1) to (12), it is possible to implement a natural lane change with little discomfort.

According to (7) to (9), it is possible to further increase a success rate of the lane change.

DESCRIPTION OF EMBODIMENTS

Embodiments of a vehicle control device, a vehicle control method, and a storage medium of the present invention will be described below with reference to the drawings.

[Overall Configuration]

Figure 1:
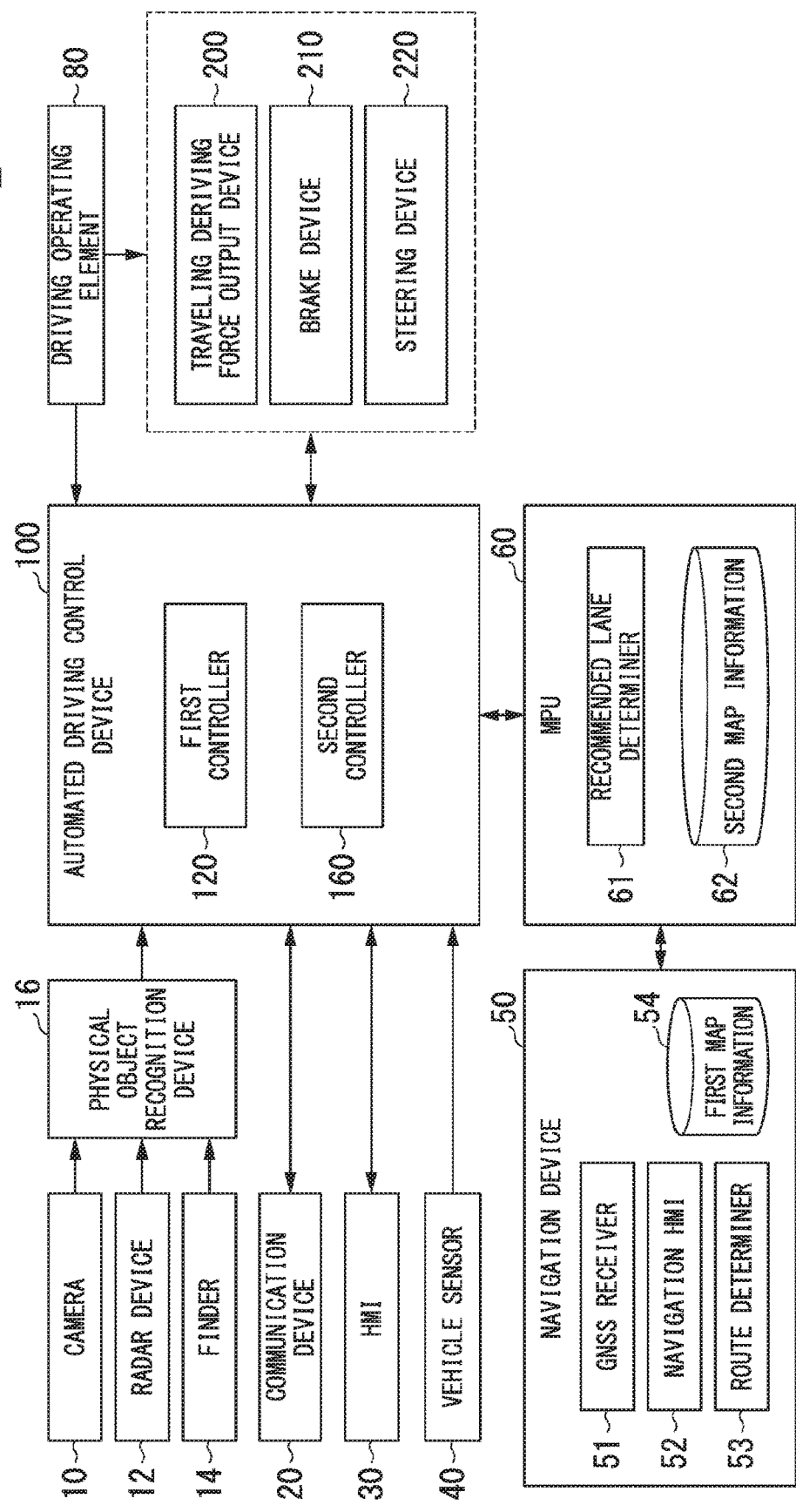
FIG. 1 is a configuration diagram of a vehicle system using a vehicle control device according to an embodiment.

FIG. 1 is a configuration diagram of a vehicle system 1 using a vehicle control device according to a first embodiment. A vehicle equipped with the vehicle system 1 is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a power generator connected to the internal combustion engine, or discharge power of a secondary battery or a fuel cell.

The vehicle system 1 includes, for example, a camera 10, a radar device 12, a finder 14, a physical object recognition device 16, a communication device 20, a human machine interface (HMI) 30, a vehicle sensor 40, a navigation device 50, a map positioning unit (MPU) 60, driving operating elements 80, an automated driving control device 100, a traveling driving force output device 200, a brake device 210, and a steering device 220. These devices and apparatuses are connected to each other by a multiplex communication line such as a controller area network (CAN) communication line, a serial communication line, a wireless communication network, or the like. Also, the configuration shown in FIG. 1 is merely an example, and a part of the configuration may be omitted or other components may be further added.

For example, the camera 10 is a digital camera using a solid-state imaging device such as a charge coupled device (CCD) or a complementary metal oxide semiconductor (CMOS). The camera 10 is attached to any position on the vehicle equipped with the vehicle system 1 (hereinafter referred to as a "host vehicle M"). When a view in front is imaged, the camera 10 is attached to an upper portion of a front windshield, a rear surface of a rearview mirror, or the like. For example, the camera 10 periodically and iteratively images the vicinity of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any position on the host vehicle M. The radar device 12 may detect a position and speed of the physical object in a frequency modulated continuous wave (FM-CW) scheme.

The finder 14 is a light detection and ranging (LIDAR) finder. The finder 14 radiates light to the vicinity of the host vehicle M and measures scattered light. The finder 14 detects a distance to an object on the basis of time from light emission to light reception. The radiated light is, for example, pulsed laser light. The finder 14 is attached to any position on the host vehicle M.

The physical object recognition device 16 performs a sensor fusion process on detection results from some or all of the camera 10, the radar device 12, and the finder 14 to recognize a position, a type, a speed, and the like of a physical object. The physical object recognition device 16 outputs recognition results to the automated driving control device 100. The physical object recognition device 16 may output detection results as they are from some or all of the camera 10, the radar device 12, and the finder 14 to the automated driving control device 100. The physical object recognition device 16 may be omitted from the vehicle system 1.

The communication device 20 communicates with another vehicle present in the vicinity of the host vehicle M using, for example, a cellular network, a Wi-Fi network, Bluetooth (registered trademark), dedicated short range communication (DSRC), or the like or communicates with various types of server devices via a wireless base station.

The HMI 30 presents various types of information to an occupant of the host vehicle M and receives an input operation of the occupant. The HMI 30 includes various types of display devices, a speaker, a buzzer, a touch panel, a switch, keys, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by a link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by an occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] with respect to a traveling direction of the vehicle), and determines a recommended lane for each block with reference to the second map information 62. The recommended lane determiner 61 determines what number lane the vehicle travels on from the left. The recommended lane determiner 61 determines the recommended lane so that the host vehicle M can travel along a reasonable traveling route for traveling to a junction destination when there is a junction in the route on the map.

The second map information 62 is map information which has higher accuracy than the first map information 54. For example, the second map information 62 includes information about a center of a lane, information about a boundary of a lane, or the like. The second map information 62 may include road information, traffic regulations information, address information (an address/zip code), facility information, telephone number information, and the like. The second map information 62 may be updated at any time when the communication device 20 communicates with another device.

For example, the driving operating element 80 includes an accelerator pedal, a brake pedal, a shift lever, a steering wheel, a steering wheel variant, a joystick, a direction indicator lever, a microphone, various types of switches, and the like. A sensor configured to detect an amount of operation or the presence or absence of an operation is attached to the driving operating element 80, and a detection result thereof is output to the automated driving control device 100 or some or all of the traveling driving force output device 200, the brake device 210, and the steering device 220.

For example, the automated driving control device 100 includes a first controller 120 and a second controller 160. For example, the first controller 120 and the second controller 160 are implemented by a processor such as a central processing unit (CPU) executing a program (software). Some or all of these components are implemented, for example, by hardware (a circuit unit including circuitry) such as large scale integration (LSI), an application specific integrated circuit (ASIC), a field-programmable gate array (FPGA), or a graphics processing unit (GPU) or may be implemented by cooperation between software and hardware. The program may be pre-stored in a storage device such as an HDD or flash memory of the automated driving control device 100 or pre-stored in a removable storage medium such as a DVD or a CD-ROM. The program may be installed in an HDD or flash memory of the automated driving control device 100 when the storage medium is mounted in a drive device.

Figure 2:
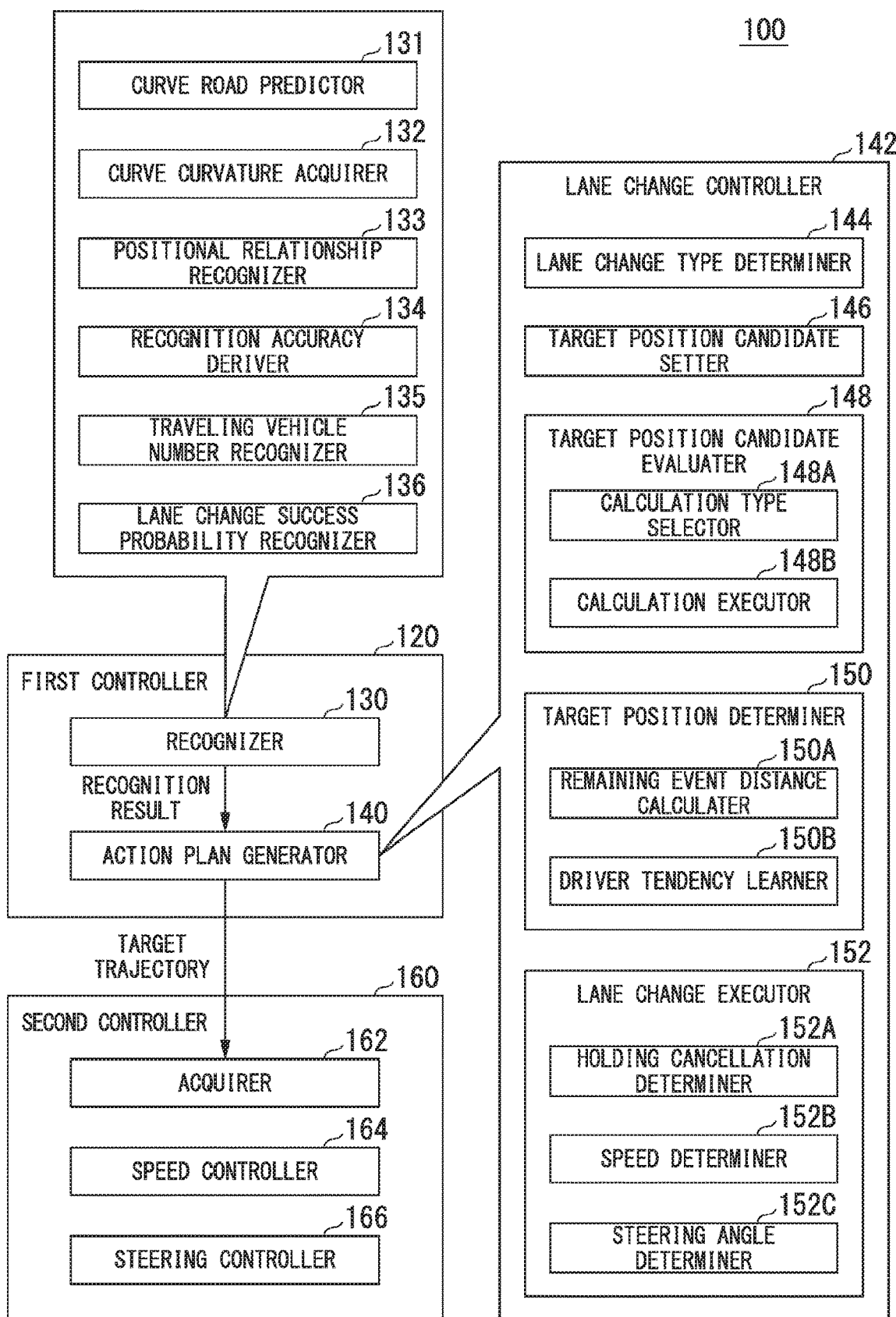
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals capable of pattern matching, road signs, or the like) in parallel and performing comprehensive evaluation by assigning scores to both the recognitions. Thereby, the reliability of automated driving is secured.

The recognizer 130 recognizes states of a position, a speed, acceleration, and the like of a physical object present in the vicinity of the host vehicle M on the basis of information input from the camera 10, the radar device 12, and the finder 14 via the physical object recognition device 16. The physical object includes other vehicles. For example, the position of the physical object is recognized as a position on absolute coordinates (i.e., a relative position with respect to the host vehicle M) with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the recognizer 130 recognizes a lane (a traveling lane) in which the host vehicle M is traveling. For example, the recognizer 130 recognizes the traveling lane by comparing a pattern of a road dividing line (for example, an arrangement of solid lines and broken lines) obtained from the second map information 62 with a pattern of a road dividing line in the vicinity of the host vehicle M recognized from an image captured by the camera 10. The recognizer 130 may recognize a traveling lane by recognizing a traveling route boundary (a road boundary) including a road shoulder, a curb stone, a median strip, a guardrail, or the like as well as a road dividing line. In this recognition, a position of the host vehicle M acquired from the navigation device 50 or a processing result of the INS may be added. The recognizer 130 recognizes a temporary stop line, an obstacle, red traffic light, a toll gate, and other road events.

When the traveling lane is recognized, the recognizer 130 recognizes a relative position or orientation of the host vehicle M with respect to the traveling lane. For example, the recognizer 130 may recognize a deviation of a representative point of the host vehicle M from the center of the lane and an angle formed with respect to a line connecting the center of the lane in the traveling direction of the host vehicle M as a relative position and an orientation of the host vehicle M relative to the traveling lane. Instead, the recognizer 130 may recognize a position of the representative point of the host vehicle M relative to one side end portion (a road dividing line or a road boundary) of the traveling lane or the like as a relative position of the host vehicle M relative to the traveling lane.

The recognizer 130 may further include a curve road predictor 131, a curve curvature acquirer 132, a positional relationship recognizer 133, a recognition accuracy deriver 134, a traveling vehicle number recognizer 135, a lane change success probability recognizer 136, and the like.

The curve road predictor 131 refers to, for example, a position of the host vehicle M derived by the navigation device 50 and the second map information 62, predicts the presence or absence of a curve road at a traveling destination of the host vehicle M, and predicts how many meters [m] the host vehicle M will travel to reach the curve road in front of the host vehicle M when viewed from the host vehicle M.

The curve curvature acquirer 132 refers to, for example, the position of the host vehicle M derived by the navigation device 50 and the second map information 62, and acquires the curvature of the road on which the host vehicle M is traveling. The curve curvature acquirer 132 may acquire the curvature of the road on which the host vehicle M is traveling on the basis of a position of the road dividing line in the captured image of the camera 10.

The positional relationship recognizer 133 is activated in response to a request from the lane change controller 142 of the action plan generator 140 and recognizes whether another vehicle m to be compared is in front or behind the host vehicle M.

The recognition accuracy deriver 134 derives the recognition accuracy at that time in a process of recognizing a position of a physical object, a position of a road dividing line, and the like and outputs the derived recognition accuracy as recognition accuracy information to the action plan generator 140. For example, the recognition accuracy deriver 134 generates the recognition accuracy information on the basis of a frequency at which the road dividing line has been recognized during a control cycle of a fixed period. The recognition accuracy information may be generated by comparing a result of the recognition process with the map. For example, recognition accuracy information indicating the deterioration of the recognition accuracy may be generated when it is not possible to recognize a temporary stop position, an intersection, a right/left turn route, or the like (an example of a "specific road event") from an image captured by the camera 10 with reference to the second map information 62 even though one is present at a position where imaging with the camera 10 is possible. The recognition accuracy information is, for example, information obtained by representing the recognition accuracy in three levels of "high", "medium", and "low".

The traveling vehicle number recognizer 135 recognizes the number of other vehicles that are traveling in a prescribed range around the host vehicle M.

The lane change success probability recognizer 136 recognizes a probability of success of a lane change on the road on which the host vehicle M is traveling. The lane change success probability recognizer 136 may calculate a success rate of the lane change on the basis of the lane change of another vehicle detected by the camera 10 or the like while the host vehicle M is traveling or may acquire a value pre-calculated on the basis of information from a probe car by a facility outside the vehicle using the communication device 20.

The action plan generator 140 generates a future target trajectory for causing the host vehicle M to automatically travel (independently of a driver's operation) so that the host vehicle M can generally travel in the recommended lane determined by the recommended lane determiner 61 and further cope with a surrounding situation of the host vehicle M. The target trajectory includes, for example, a speed element. For example, the target trajectory is represented as a sequence of points (trajectory points) at which the host vehicle M is required to arrive. The trajectory point is a point at which the host vehicle M is required to arrive for each prescribed traveling distance (for example, about several meters [m]) along a road. Alternatively, a target speed and target acceleration for each prescribed sampling time (for example, about several tenths of a second [sec]) are generated as a part of the target trajectory. The trajectory point may be a position at which the host vehicle M is required to arrive at the sampling time for each prescribed sampling time. In this case, information of the target speed or the target acceleration is represented by an interval between the trajectory points.

The action plan generator 140 may set an automated driving event when the target trajectory is generated. In the automated driving event, there are a constant-speed driving event, a low-speed following driving event for performing traveling while following a preceding vehicle at a prescribed vehicle speed (for example, 60 [km] or less), a lane change event, a junction event, an interchange event, a takeover event, and the like. The action plan generator 140 generates a target trajectory according to an activated event.

The action plan generator 140 includes a lane change controller 142 configured to control the lane change event. The lane change event is activated, for example, only in the first driving state of the host vehicle M. The first driving state is a driving state in which a forward observation task is at least imposed on the driver. In the first driving state, the driver may be given the task of holding the steering wheel as necessary. The second driving state is a driving state in which the number of tasks imposed on the driver is reduced as compared to the first driving state, and includes, for example, the constant-speed following traveling event described above. In the second driving state, the lane change event is not activated. This is because, during the lane change, the driver needs to pay attention to the surroundings of the host vehicle M and prepare for switching to manual driving. The lane change event may be activated regardless of the driving state when the number of tasks imposed on the driver is reduced in all scenes including a lane change.

The lane change controller 142 includes, for example, a lane change type determiner 144, a target position candidate setter 146, a target position candidate evaluater 148, a target position determiner 150, and a lane change executor 152. The target position candidate evaluater 148 includes, for example, a calculation type selector 148A and a calculation executor 148B. The target position determiner 150 includes, for example, a remaining distance calculater 150A and a driver tendency learner 150B. The lane change executor 152 includes, for example, a holding cancellation determiner 152A, a speed determiner 152B, and a steering angle determiner 152C. The functions of these functional units will be described below.

The second controller 160 controls the traveling driving force output device 200, the brake device 210, and the steering device 220 so that the host vehicle M passes through the target trajectory generated by the action plan generator 140 at scheduled times.

The second controller 160 includes, for example, an acquirer 162, a speed controller 164, and a steering controller 166. The acquirer 162 acquires information about the target trajectory (trajectory points) generated by the action plan generator 140 and causes the information to be stored in a memory (not shown). The speed controller 164 controls the traveling driving force output device 200 or the brake device 210 on the basis of speed elements associated with the target trajectory stored in the memory. The steering controller 166 controls the steering device 220 in accordance with a degree of curvature of the target trajectory stored in the memory. For example, processes of the speed controller 164 and the steering controller 166 are implemented by a combination of feed-forward control and feedback control. As one example, the steering controller 166 combines and executes feed-forward control according to the curvature of the road in front of the host vehicle M and feedback control based on a deviation from the target trajectory.

The traveling driving force output device 200 outputs a traveling driving force (a torque) to driving wheels so as to allow the vehicle to travel. For example, the traveling driving force output device 200 includes a combination of an internal combustion engine, an electric motor, a transmission, and the like, and an ECU configured to control them. The ECU controls the above-described configuration in accordance with information input from the second controller 160 or information input from the driving operating element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with information input from the second controller 160 or information input from the driving operating element 80 so that a brake torque according to a braking operation is output to each wheel. The brake device 210 may include a mechanism for transferring the hydraulic pressure generated by the operation of the brake pedal included in the driving operating element 80 to the cylinder via the master cylinder as a backup. The brake device 210 is not limited to the above-described configuration and may be an electronically controlled hydraulic brake device that controls an actuator in accordance with information input from the second controller 160 and transfers the hydraulic pressure of the master cylinder to the cylinder.

For example, the steering device 220 includes a steering ECU and an electric motor. The electric motor, for example, changes a direction of the steering wheels by applying a force to a rack and pinion mechanism. The steering ECU drives the electric motor and causes the direction of the steering wheels to be changed in accordance with the information input from the second controller 160 or the information input from the driving operating element 80.

[Lane Change Control]

Figure 3:
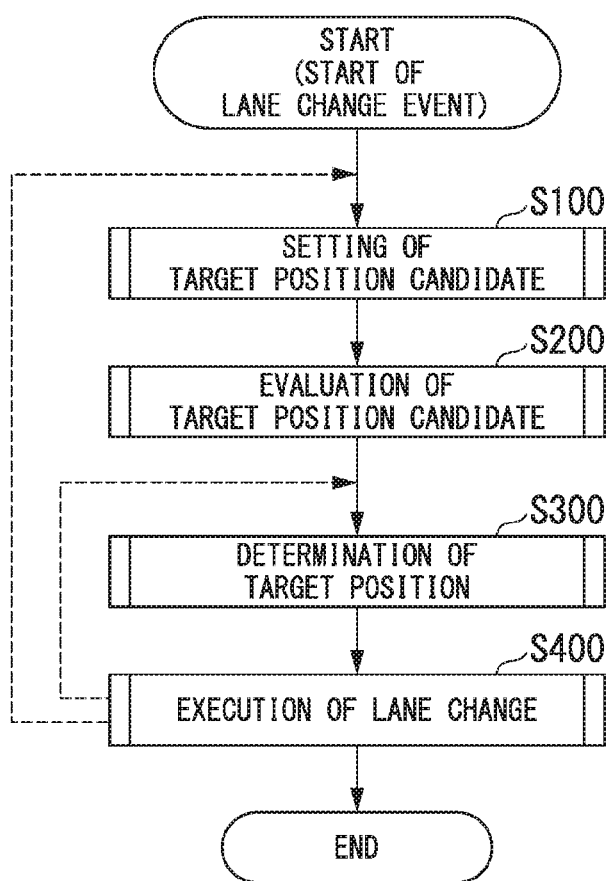
FIG. 3 is a flowchart showing a flow of an overall process executed by a lane change controller.

Hereinafter, lane change control executed by the lane change controller 142 will be described in more detail. FIG. 3 is a flowchart showing a flow of an overall process executed by the lane change controller 142.

First, the target position candidate setter 146 sets target position candidates (step S100). Next, the target position candidate evaluator 148 evaluates each of the target position candidates with a plurality of indices (step S200). Next, the target position determiner 150 determines a target position (step S300). When types of lane changes (B) and (C) to be described below have been performed, only a process of determining whether or not the "lane change is impossible at that time" is performed in the processing of step S200. If it is determined that the "lane change is not impossible at that time", the target position candidate is determined to be the target position in the processing of step S300. Then, the lane change executor 152 executes the lane change toward the target position (step S400). When it is determined that the "lane change is impossible at that time" at all target position candidates, the processing of step S400 is not performed. Details will be sequentially described below. While the lane change is being executed, a holding cancellation determination on the target position may be made and at least the target position (in some cases, the target position candidate) may be re-determined.

[Setting of Target Position Candidate]

Figure 4:
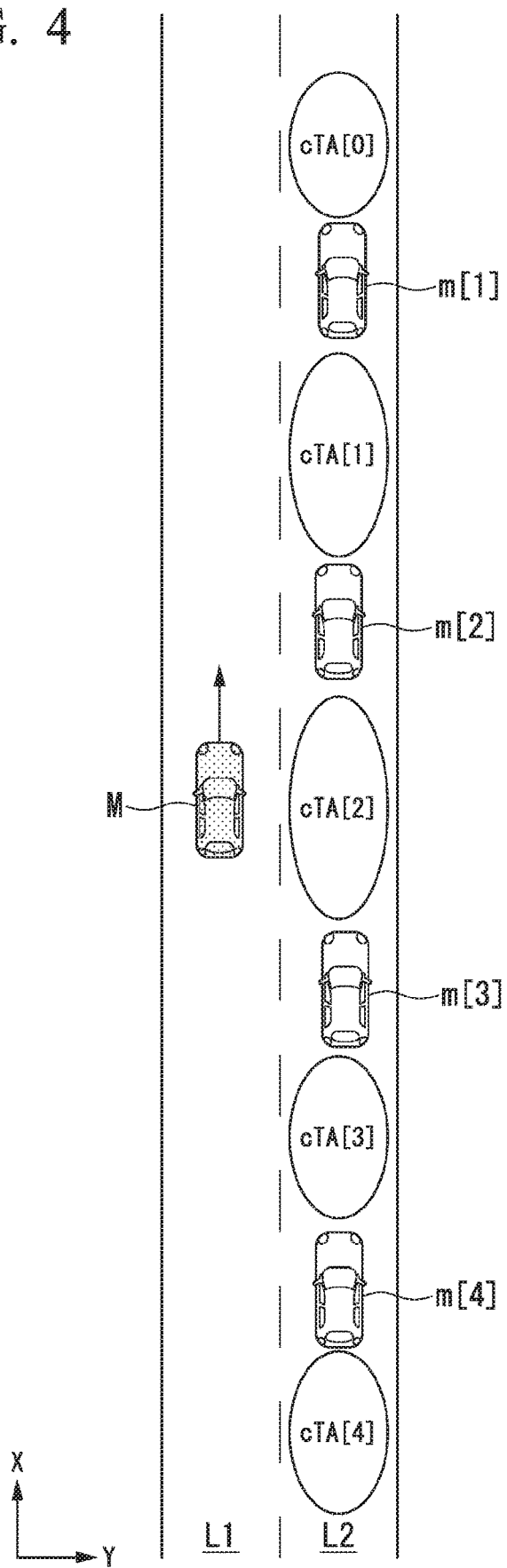
FIG. 4 is an explanatory diagram showing setting of target position candidates.

The target position candidate setter 146 sets a target position candidate on the basis of a determination result of the lane change type determiner 144. FIG. 4 is an explanatory diagram showing setting of a target position candidate cTA. In the example of FIG. 4, the host vehicle M is traveling in a lane L1 and intends to make a lane change to a lane L2. In the lane L2, other vehicles m1, m2, m3, and m4 to be monitored in control of the lane change are traveling. Hereinafter, the lane in which the host vehicle M is traveling may be referred to as a host vehicle lane.

A target position candidate cTA[i] is a position that is a candidate for the target position TA (i=0, 1, ... ). The target position TA is a relative position determined in relation to other vehicles that are traveling in a lane of a lane change destination. In the following description, the smaller the number of an argument i is, the more forward the vehicle is traveling.

The target position candidate cTA[i] is a "position between another vehicle m[i] and another vehicle m[i+1] (an inter-vehicle region)". A region in front of the other vehicle m[1] that is traveling at the most forward position among the other vehicles to be monitored is denoted by cTA[0]. When there is no other vehicle m[i+1] to be monitored, cTA[i] is assumed to simply have the meaning of a position behind the other vehicle m[i].

The lane change type determiner 144 determines whether a type of lane change is (A), (B), or (C) in the following on the basis of the reason that the lane change event is activated.

(A): Lane change for following a route (a recommended route) on the map (a lane change for traveling along a predetermined route) (a first type)

(B): Lane change for overtaking a preceding vehicle (a second type)

(C): Lane change according to a request from an occupant (a driver) (lane change assist (LCA)) (a third type)

The lane change controller 142 makes the lane change (A) at a timing when the recommended lane has been switched on the basis of the route on the map. The lane change controller 142 makes the lane change (B) when the speed of the host vehicle M is a prescribed speed or more less than an average speed of the vehicles on an adjacent lane (for example, the lane L2 of FIG. 4). In this case, when there are two adjacent lanes, the lane change controller 142 sets an overtaking lane among adjacent lanes as a lane of a lane change destination. The lane change controller 142 makes the lane change (C) in accordance with an operation of indicating the lane change of the driven vehicle. The operation of indicating the lane change of the driven vehicle is, for example, an operation of a direction indicator lever for indicating a desired direction for the lane change, an operation of indicating a desired direction for the lane change such as "right" or "left" by speech, or the like. In the latter case, the lane change controller 142 recognizes the speech collected by the microphone and recognizes the operation of indicating the lane change of the driven vehicle. The lane change type determiner 144 determines any one of these types in which the lane change event is activated.

Then, the target position candidate setter 146 makes a setting rule of the target position candidate variable in accordance with the type of lane change determined by the lane change type determiner 144.

For example, when the type of lane change is (A), the target position candidate setter 146 sets the target position candidate cTA in a range in which a plurality of target position candidates cTA as shown in FIG. 4 can be set. When the type of lane change is (B) or (C), the target position candidate setter 146 sets an inter-vehicle region closest to the host vehicle M as the target position candidate cTA. The inter-vehicle region is a region between two vehicles that travel in the same direction on the same lane in a state in which there is no vehicle between them.

The target position candidate setter 146 sets the search range in the adjacent lane so that the target position candidate cTA can be set in a range in which a plurality of target position candidates cTA can be set, particularly when the type of lane change is (A). The search range is a spatial range of a physical object to be considered when the target position candidate is set among physical objects detected by the camera 10, the radar device 12, the finder 14, the physical object recognition device 16, and the like. In other words, the target position candidate setter 146 does not consider a physical object outside the search range when a target position candidate is set even if the physical object outside the search range is a physical object detected by the camera 10, the radar device 12, the finder 14, the physical object recognition device 16, or the like.

Figure 5:
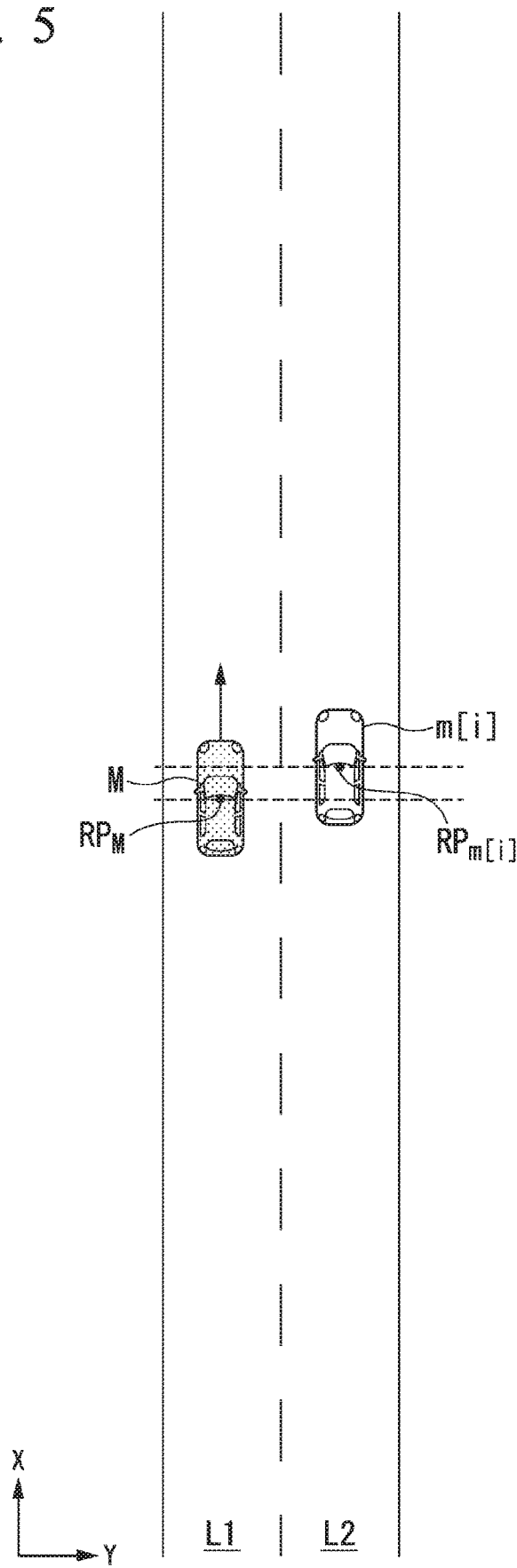
FIG. 5 is a diagram illustrating the definition of an inter-vehicle region closest to a host vehicle.

Here, the "inter-vehicle region closest to the host vehicle M" when the lane change (B) or (C) is made is defined. FIG. 5 is a diagram illustrating the definition of the inter-vehicle region closest to the host vehicle M. The target position candidate setter 146 sets the target position candidate cTA behind the other vehicle m[i] when a representative point $RP_M$ is in front of a representative point $RP_{m[i]}$ and sets the target position candidate cTA in front of the other vehicle m[i] when the representative point $RP_M$ is behind the representative point $RP_{m[i]}$ in a road extension direction (an X direction of FIG. 5 which is hereinafter referred to as a "longitudinal direction") and a road width direction (a Y direction of FIG. 5 which is referred to as a "lateral direction") in a relationship between a representative point (such as the center of gravity or the center of the drive shaft) $RP_M$ of the host vehicle M and a representative point (such as the center of gravity or the center of the drive shaft) $RP_{m[i]}$ of another vehicle m[i] closest to the host vehicle M.

As described above, the target position candidate setter 146 makes the setting rule of the target position candidate variable in accordance with the type of lane change determined by the lane change type determiner 144. Thereby, it is possible to implement lane change control according to a degree of necessity of a lane change.

When the lane change (A) for following a route on the map (a recommended route) is made, because there is a situation that "it is necessary to travel in a direction thereof in the near future" and it is necessary to make the lane change even when alignment in the longitudinal direction to be described below is performed with respect to another vehicle on the adjacent lane, the setting range or the search range of the target position candidate cTA are widely set. Thereby, it is possible to set a plurality of target position candidates cTA in accordance with the situation and it is possible to more reliably make the lane change.

On the other hand, even if an opportunity for making the lane change is missed at a timing when the lane change (B) or (C) is made, the setting range or the search range of the target position candidate cTA is set to a range narrower than in the case of (A) because it is only necessary to re-attempt the lane change when no particular inconvenient situation occurs and a trigger for making the lane change is satisfied at a timing when the situation in the adjacent lane changes. Thereby, it is possible to prevent the occupant from feeling uncomfortable due to unnecessary alignment. The lane change (C) can be suitable for the regulation that a "vehicle is required to cross the lane within a prescribed number of seconds" when the regulation is defined.

Figure 6:
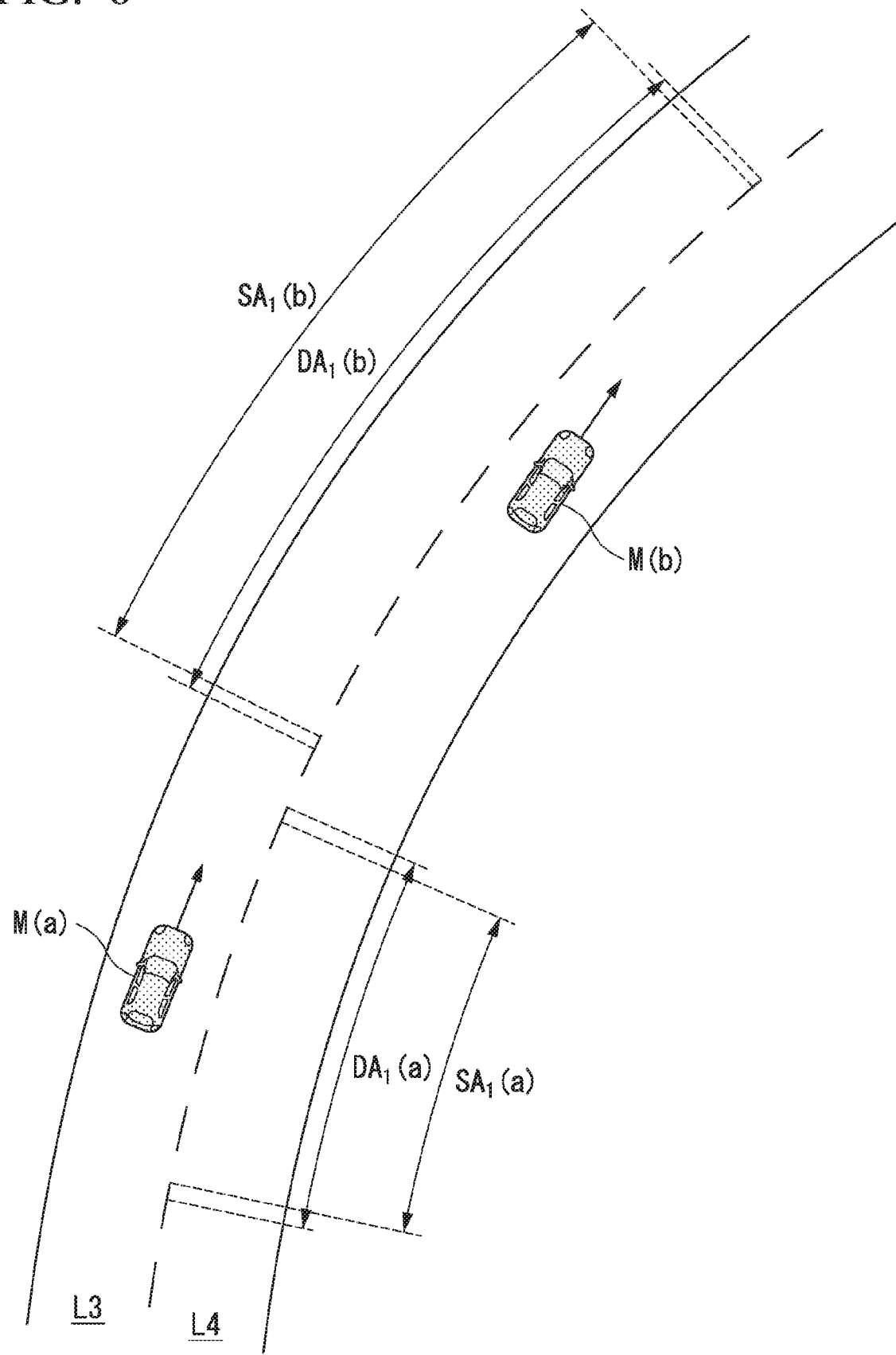
FIG. 6 is a diagram showing an example of a search range and a setting range set by a target position candidate setter on a curve road.

The target position candidate setter 146 may set the search range and the setting range to different sizes in at least the case of (A) in accordance with whether the vehicle makes the lane change to the inside or outside of a curve when the lane change is made while the host vehicle M is traveling on a curve road. FIG. 6 is a diagram showing an example of a search range and a setting range set by the target position candidate setter 146 on a curve road. In FIG. 6, a host vehicle M(a) intends to make the lane change from a lane L3 to a lane L4, i.e., to the inside of the curve. In this case, the target position candidate setter 146 sets the search range and the setting range narrower than when the vehicle travels on a straight road. In this case, the target position candidate setter 146 may increase a degree of reduction (a reduction rate) as the curvature of the curve road increases. In FIG. 6, $DA_1(a)$ denotes a search range when the lane change to the inside of the curve is made and $SA_1(a)$ denotes a setting range when the lane change to the inside of the curve is made.

A host vehicle M(b) intends to make the lane change from a lane L4 to a lane L3, i.e., to the outside of the curve. In this case, the target position candidate setter 146 sets the search range and the setting range wider than when the lane change to the inside of the curve is made. In FIG. 6, $DA_1(b)$ denotes a search range when the lane change to the outside of the curve is made and $SA_1(b)$ denotes a setting range when the lane change to the outside of the curve is made. When the lane change to the outside of the curve is made, the search range and the setting range may be narrower than or the same as those when the vehicle travels on a straight road. When the search range and the setting range are narrower, the target position candidate setter 146 may increase a degree of reduction (a reduction rate) in this case as the curvature of the curve road increases.

When the lane change (B) or (C) is made, the search range and the setting range on the curve road may be equal to those on the straight road or the lane change according to the type of (B) or (C) on the curve road may inherently not be allowed.

Figure 7:
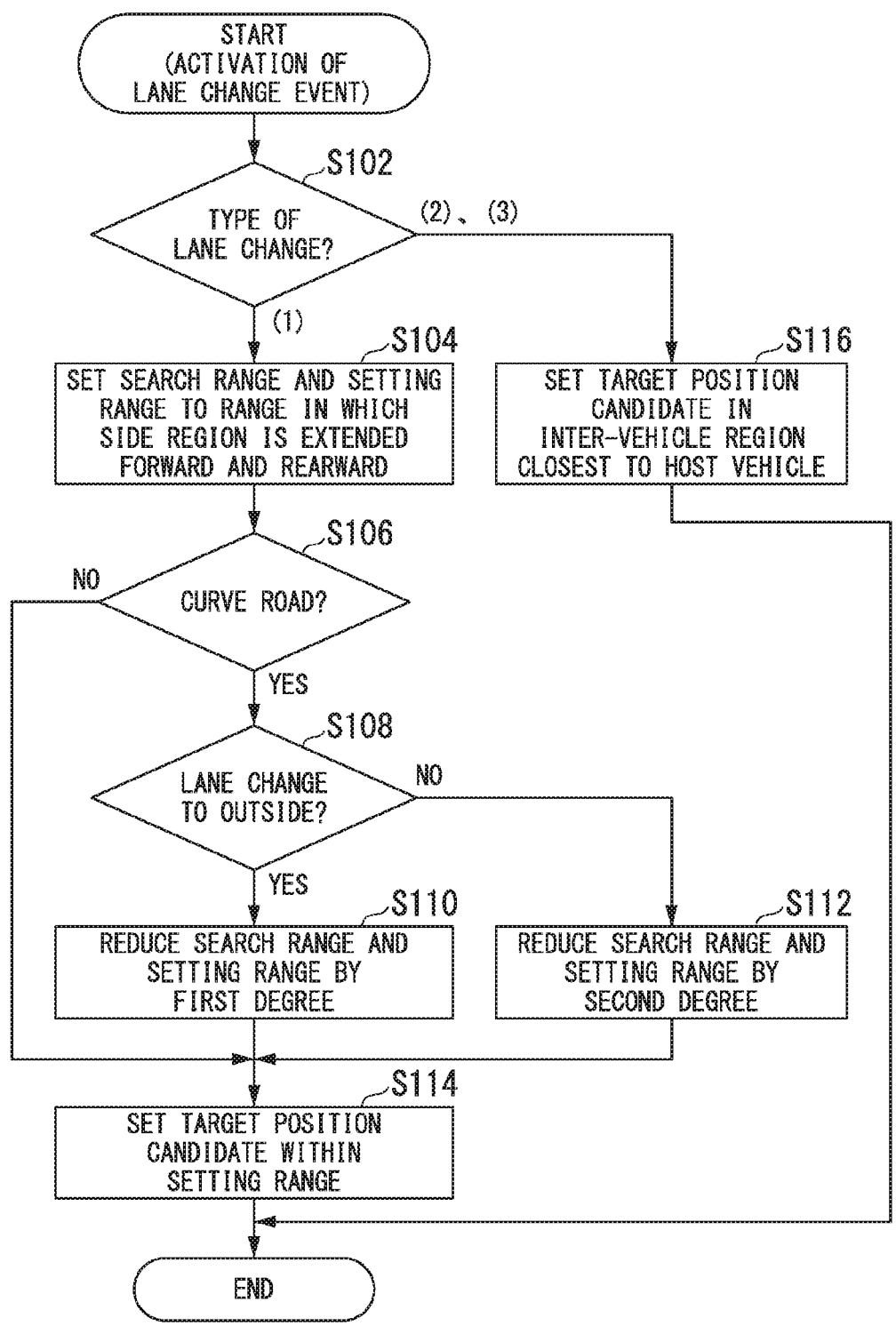
FIG. 7 is a flowchart showing an example of a flow of a process executed by a lane change type determiner and a target position candidate setter.

FIG. 7 is a flowchart showing an example of a flow of a process executed by the lane change type determiner 144 and the target position candidate setter 146. The process of the present flowchart is started when a lane change event is activated. The process of the present flowchart shows details of the processing of step S100 in the flowchart of FIG. 3.

First, the lane change type determiner 144 determines a type of lane change (step S102). When it is determined that the type of lane change is (A), the target position candidate setter 146 sets the search range and the setting range to a range in which a region on the side of the host vehicle M extends forward and rearward (step S104). Next, the target position candidate setter 146 determines whether or not the host vehicle M is traveling on a curve road (step S106). When the host vehicle M is not traveling on a curve road, the target position candidate setter 146 sets each inter-vehicle region within the setting region set in step S104 as a target position candidate (step S114).

If it is determined that the host vehicle M is traveling on the curve road in step S106, the target position candidate setter 146 determines whether or not the host vehicle M intends to make the lane change to the outside of the curve road on the basis of switching of a recommended lane (step S116). When the host vehicle M intends to make the lane change to the outside of the curve road, the target position candidate setter 146 reduces the search range and the setting range by a first degree (step S110) and sets the target position candidate within the setting range reduced by the first degree (step S114). When the host vehicle M intends to make the lane change to the inside of the curve road, the target position candidate setter 146 reduces the search range and the setting range by a second degree (step S112) and sets the target position candidate within the setting range reduced by the second degree (step S114). As described above, a degree of reduction for the second degree is larger than that for the first degree.

If it is determined that the type of lane change is (B) or (C) in step S102, the target position candidate setter 146 sets an inter-vehicle region closest to the host vehicle M as a target position candidate (step S116).

According to the process of the lane change type determiner 144 and the target position candidate setter 146 described above, the search range and the setting range can be set in a suitable range in accordance with the type of lane change, i.e., the purpose. As a result, it is possible to implement a lane change in which an occupant does not feel uncomfortable. For example, when it is necessary to make the lane change in accordance with a route on the map, the occupant is assumed to feel uncomfortable if the lane change is not made indefinitely because the side of the host vehicle M is not vacant. However, the above-described process can reduce the probability that such a situation will occur.

[Evaluation of Target Position Candidate (Evaluation Value Calculation)]

Hereinafter, a process of selecting a target position TA from the target position candidates cTA determined as described above will be described. The target position candidate evaluater 148 selects one of a plurality of types of calculations on the basis of a positional relationship and a speed relationship between the host vehicle M and another vehicle m present in front of or behind (immediately in front of or behind) the target position candidate cTA and calculates a plurality of evaluation values for each target position candidate cTA according to the calculation performed in the selected type of calculation. Because a plurality of target position candidates cTA are set only when a first type of lane change is made, the following description is about a case in which the first type of lane change is made.

In the present embodiment, the target position candidate evaluater 148 determines a lane change mode for each target position candidate cTA on the basis of the following criteria (1) and (2) or (3). The lane change mode is for determining the behavior of approaching the target position candidate cTA with respect to each target position candidate cTA and the target position candidate evaluater 148 determines an evaluation expression for evaluating the target position candidate cTA. During the process of determining the lane change mode, the target position candidate evaluater 148 performs a process of excluding the target position candidate cTA for which it is determined that the "lane change is impossible at that time".

Figure 8:
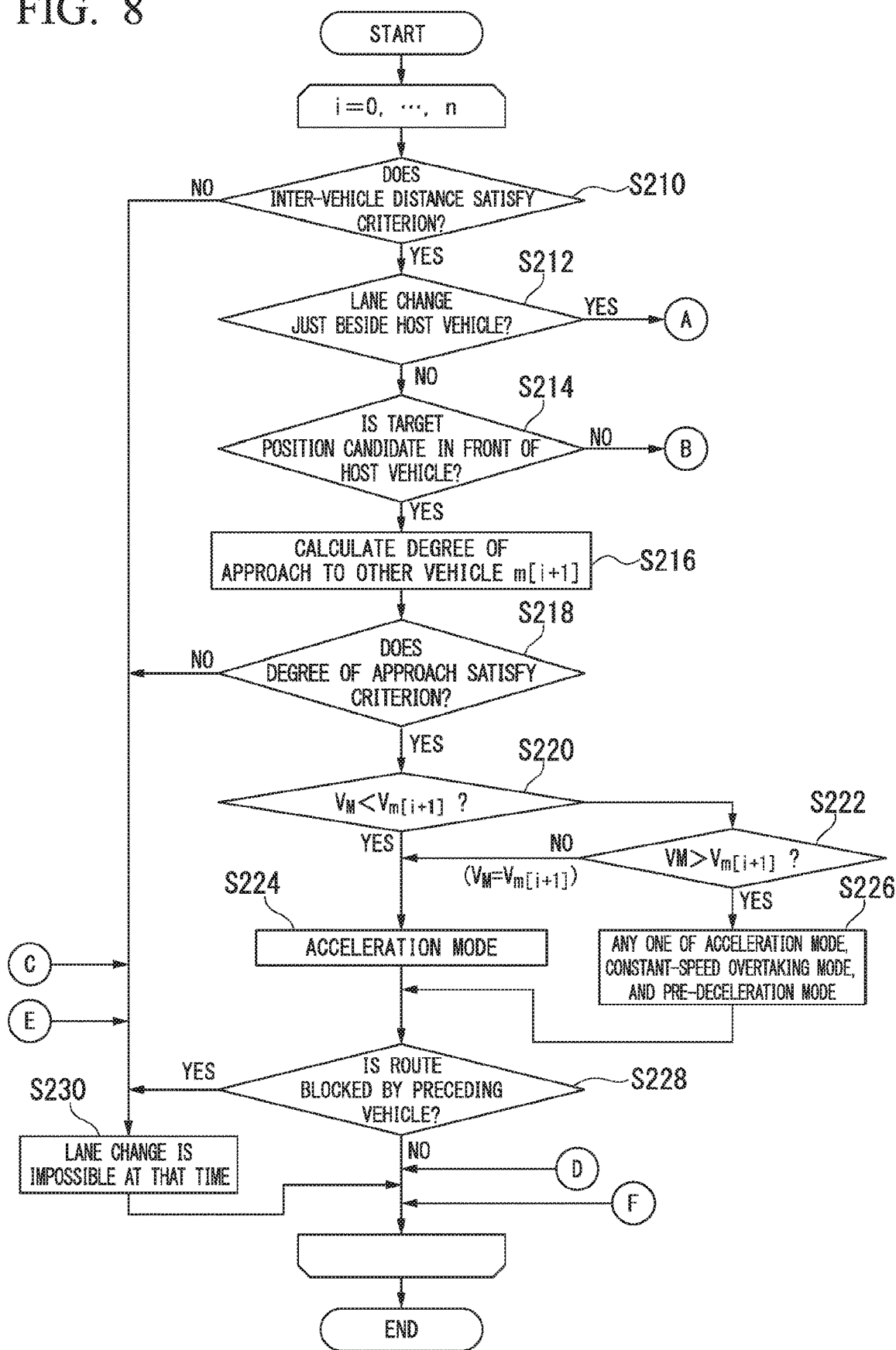
FIG. 8 is a part of a flowchart showing an example of a flow of a previous-stage process of a target position candidate evaluater.
Figure 14:
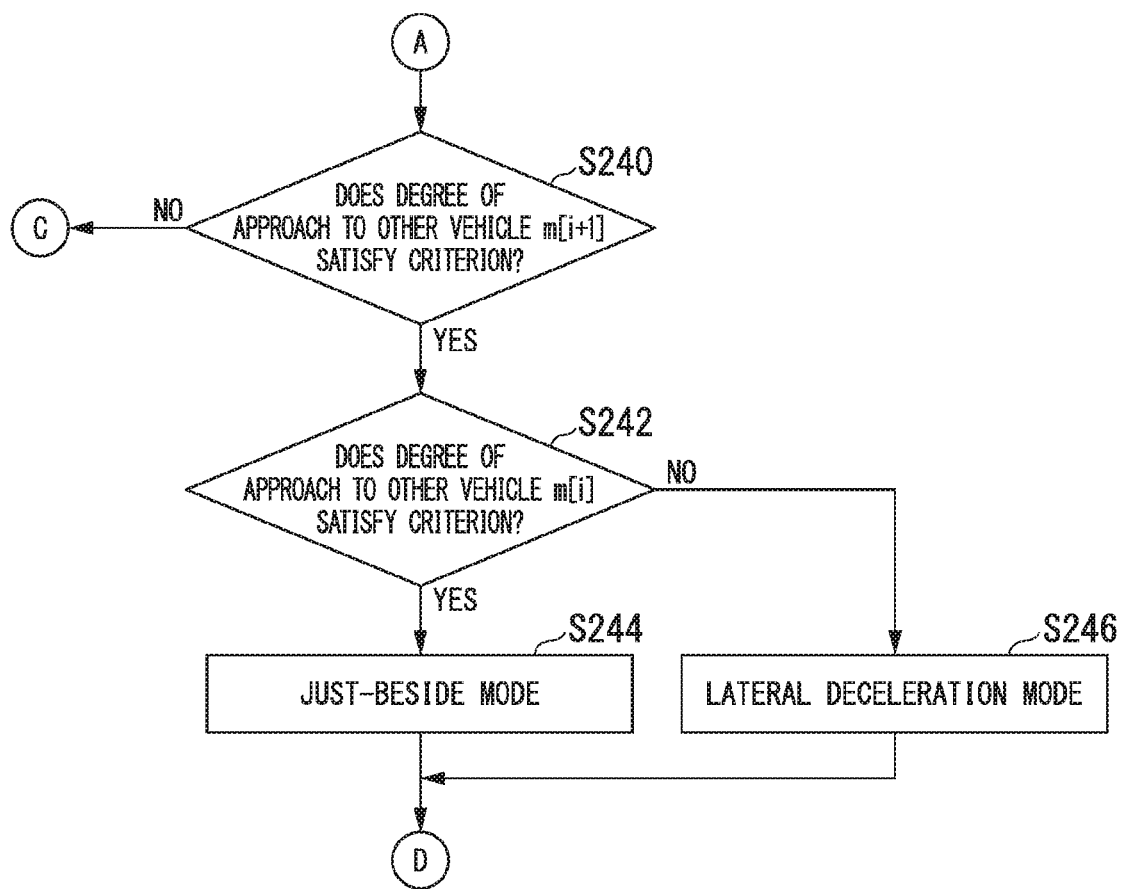
FIG. 14 is a part of the flowchart showing the example of the flow of the previous-stage process of the target position candidate evaluater.
Figure 15:
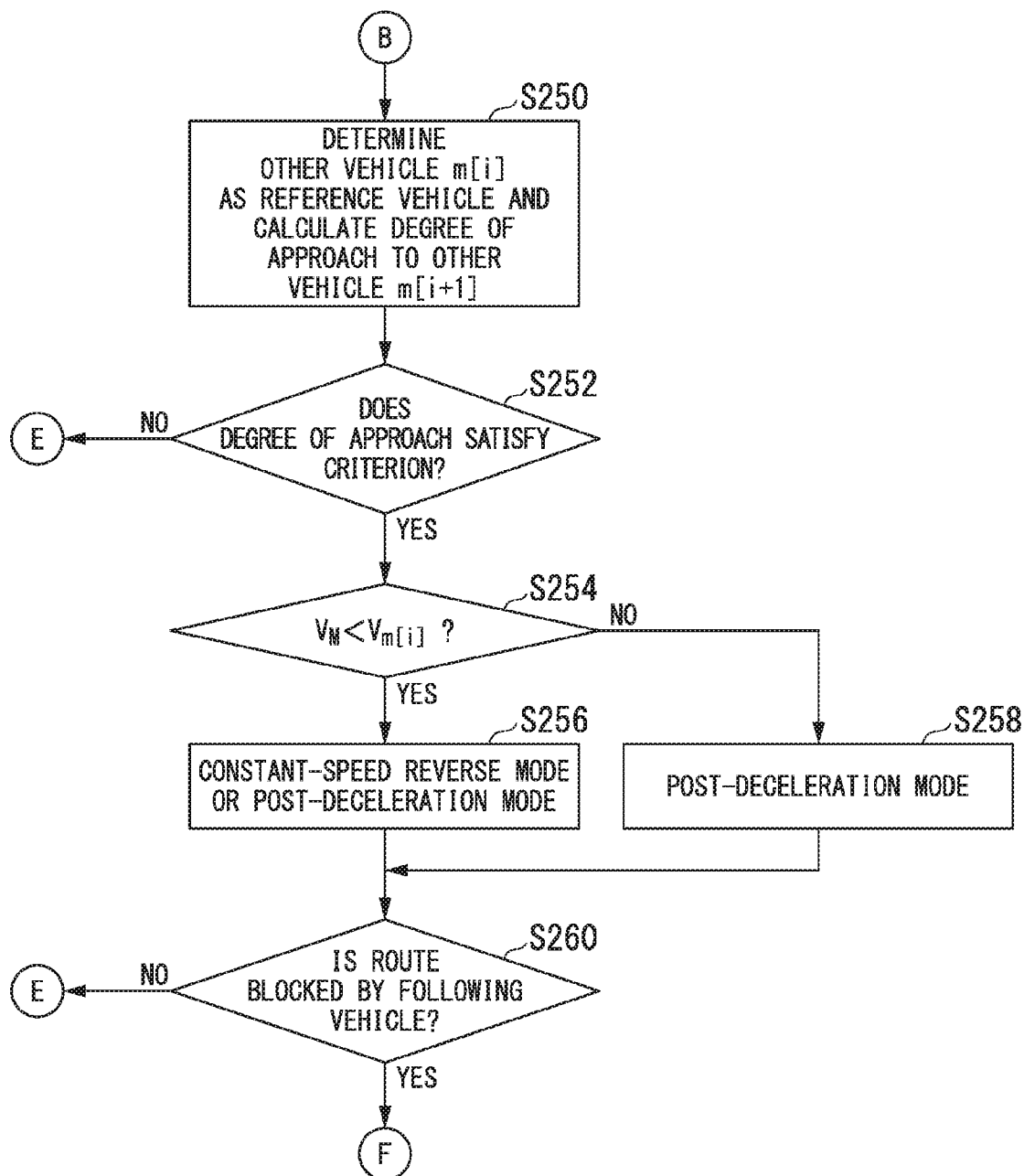
FIG. 15 is a part of the flowchart showing the example of the flow of the previous-stage process of the target position candidate evaluater.

(1) Whether the target position candidate cTA is in front of, just beside, or behind the host vehicle M (2) Speed relationship between the host vehicle M and a reference vehicle determined on the basis of a result of (1) and a speed relationship between a vehicle in front of or behind the target position candidate cTA and the host vehicle M (3) Magnitude of an index value indicating a degree of approach between the vehicle in front of or behind the target position candidate cTA and the host vehicle M Each of FIGS. 8, 14, and 15 is a part of a flowchart showing an example of a flow of a previous-stage process of the target position candidate evaluater 148. The processes of the flowcharts of FIGS. 8, 14, and 15 and FIG. 19 to be described below show details of the processing of step S200 in the flowchart of FIG. 3.

The target position candidate evaluater 148 executes the processing of steps S210 to S230 to be described below for each target position candidate cTA[i] (i=0, . . . , n).

Figure 9:
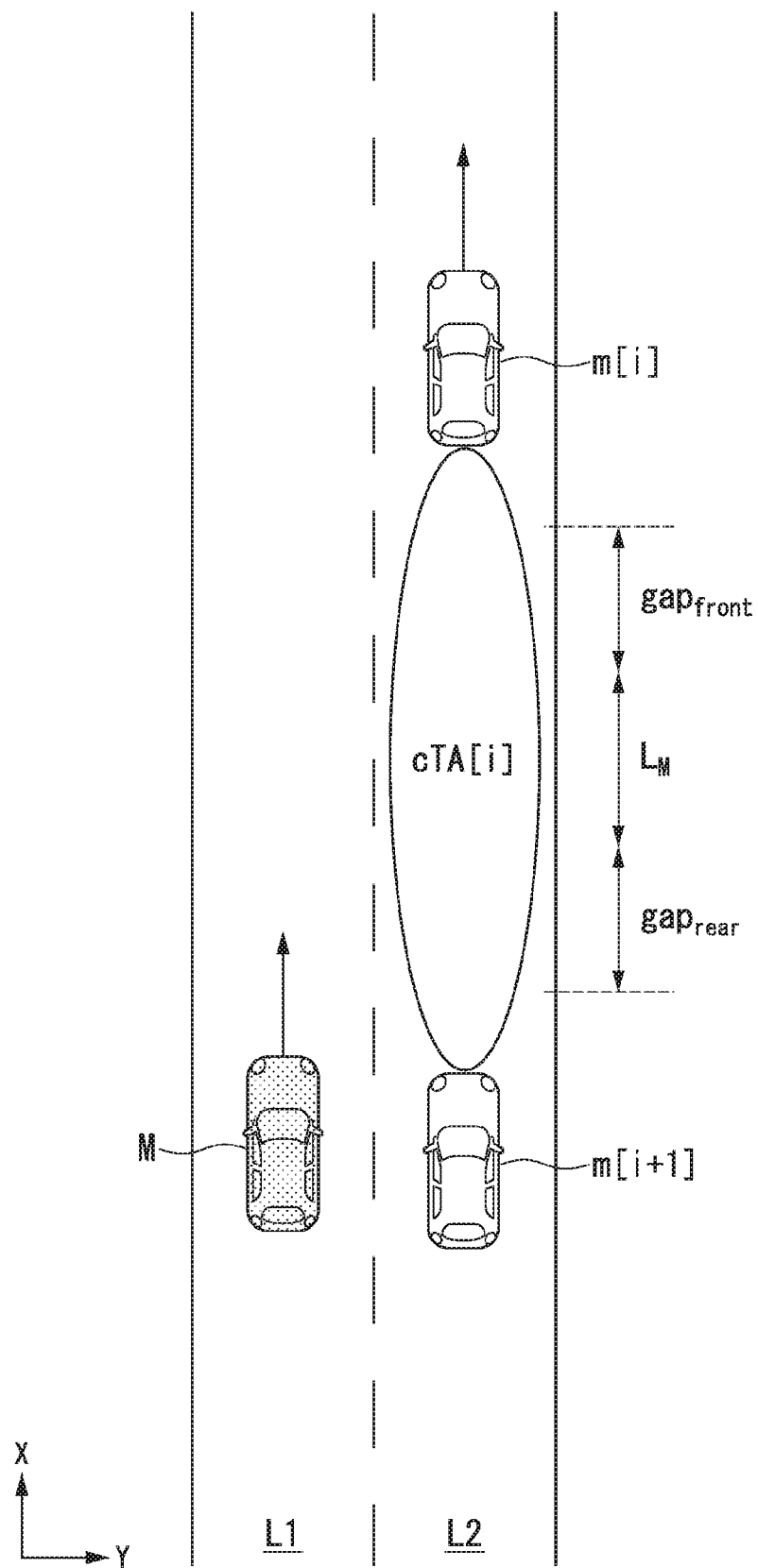
FIG. 9 is an explanatory diagram showing the processing of step S210.

First, the target position candidate evaluater 148 determines whether or not an inter-vehicle distance of the target position candidate cTA[i], which is an inter-vehicle region, satisfies a criterion (step S210). FIG. 9 is an explanatory diagram showing the processing of step S210. The target position candidate evaluater 148 determines that the inter-vehicle distance of the target position candidate cTA[i] satisfies the criterion when the inter-vehicle distance of the target position candidate cTA[i] (the inter-vehicle distance between the other vehicle m[i] and the other vehicle m[i+1]) is greater than or equal to a distance obtained by adding a front allowance distance $gap_{front}$ and a rear allowance distance $gap_{rear}$ to a vehicle length $L_M$ of the host vehicle M. The front allowance distance $gap_{front}$ and the rear allowance distance $gap_{rear}$ are obtained on the basis of Eq. (1) and Eq. (2), respectively. In Eq. (1) and Eq. (2), $V_M$ is the speed of the host vehicle M and Tfr1 and Tre1 are prescribed values. The prescribed values Tfr1 and Tre1 are values indicating "how much vehicle time-headway can be secured for front and rear vehicles at a lane change destination to make the lane change" and may be fixed values or may be changed on the basis of a degree of congestion of the road. For example, the prescribed values Tfr1 and Tre1 may be set to small values on roads where a density of vehicles is high and the prescribed values Tfr1 and Tre1 may be set to large values on roads where the density of vehicles is low and vehicles generally travel at a high speed.

$$gap_{front} = Tfr1 \times V_M \qquad (1)$$

$$gap_{rear} = Tre1 \times V_M \qquad (2)$$

When it is determined that the inter-vehicle distance does not satisfy the criterion in step S210, the target position candidate evaluater 148 determines that a "lane change to the target position candidate cTA[i] is impossible at that time" (step S230).

When it is determined that the inter-vehicle distance satisfies the criterion in step S210, the target position candidate evaluater 148 determines whether or not the target position candidate cTA[i] is a position where the lane change to a position just beside the host vehicle M is possible (step S212). The "position where the lane change to a position just beside the host vehicle M is possible" means a position where the lane change can be started without performing alignment in the longitudinal direction.

Figure 10:
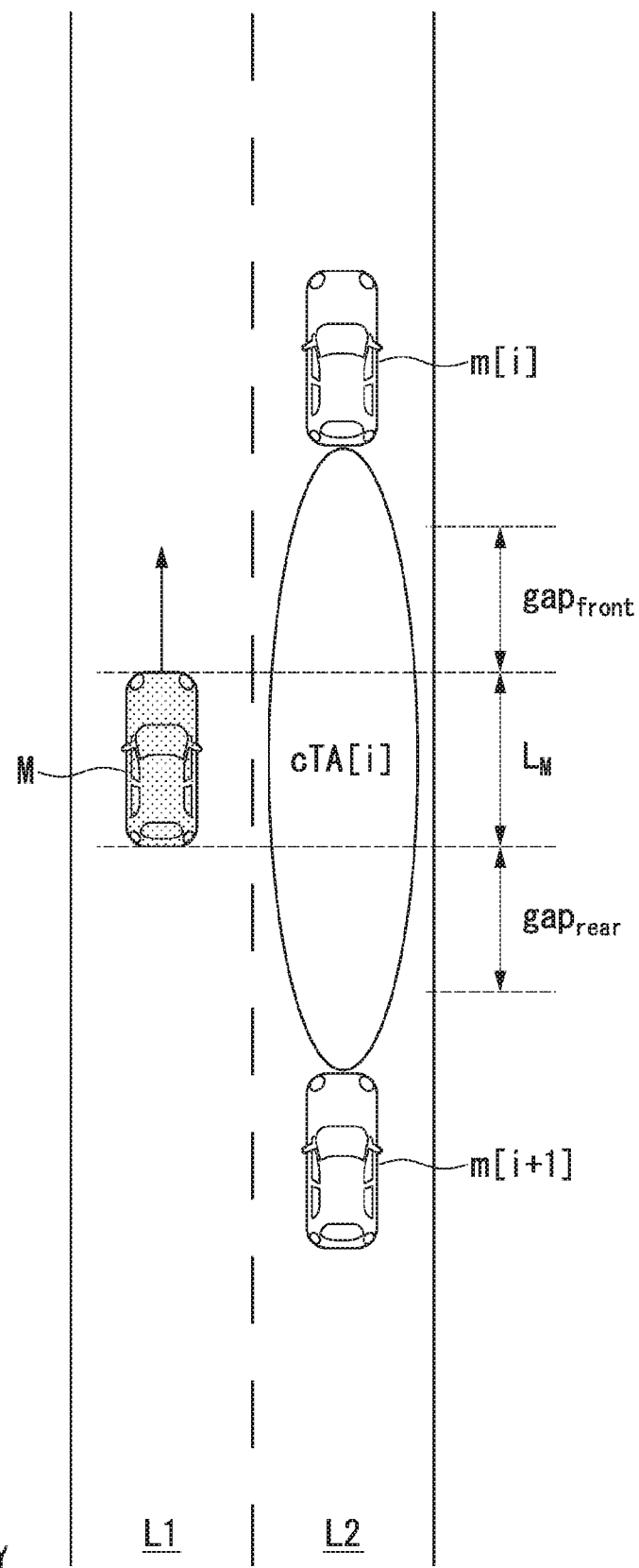
FIG. 10 is an explanatory diagram showing the processing of step S212.

FIG. 10 is an explanatory diagram showing the processing of step S212. The positional relationship between the host vehicle M and the other vehicles m[i] and m[i+1] in front of and behind the target position candidate cTA[i] is considered in the processing of S212 without being particularly considered in the processing of step S210 described with reference to FIG. 9. That is, the target position candidate evaluater 148 projects a front end and a rear end of the host vehicle M onto a lane (L2 in FIG. 10) of the lane change destination and determines that the target position candidate cTA[i] is a position where the lane change to a position just beside the host vehicle M is possible when there is no other vehicle m in a region from a point in front of a front allowance distance $gap_{front}$ from the projected front end to a point behind a rear allowance distance $gap_{rear}$ from the projected rear end.

Returning to FIG. 8, when it is determined that the target position candidate cTA[i] is a position where the lane change to a position just beside the host vehicle M is possible, the target position candidate evaluater 148 moves the process to step S240 of FIG. 14. This will be described below.

When it is determined that the target position candidate cTA[i] is not a position where the lane change to a position just beside the host vehicle M is possible, the target position candidate evaluater 148 determines whether or not the target position candidate cTA[i] is in front of the host vehicle (step S214).

Figure 11:
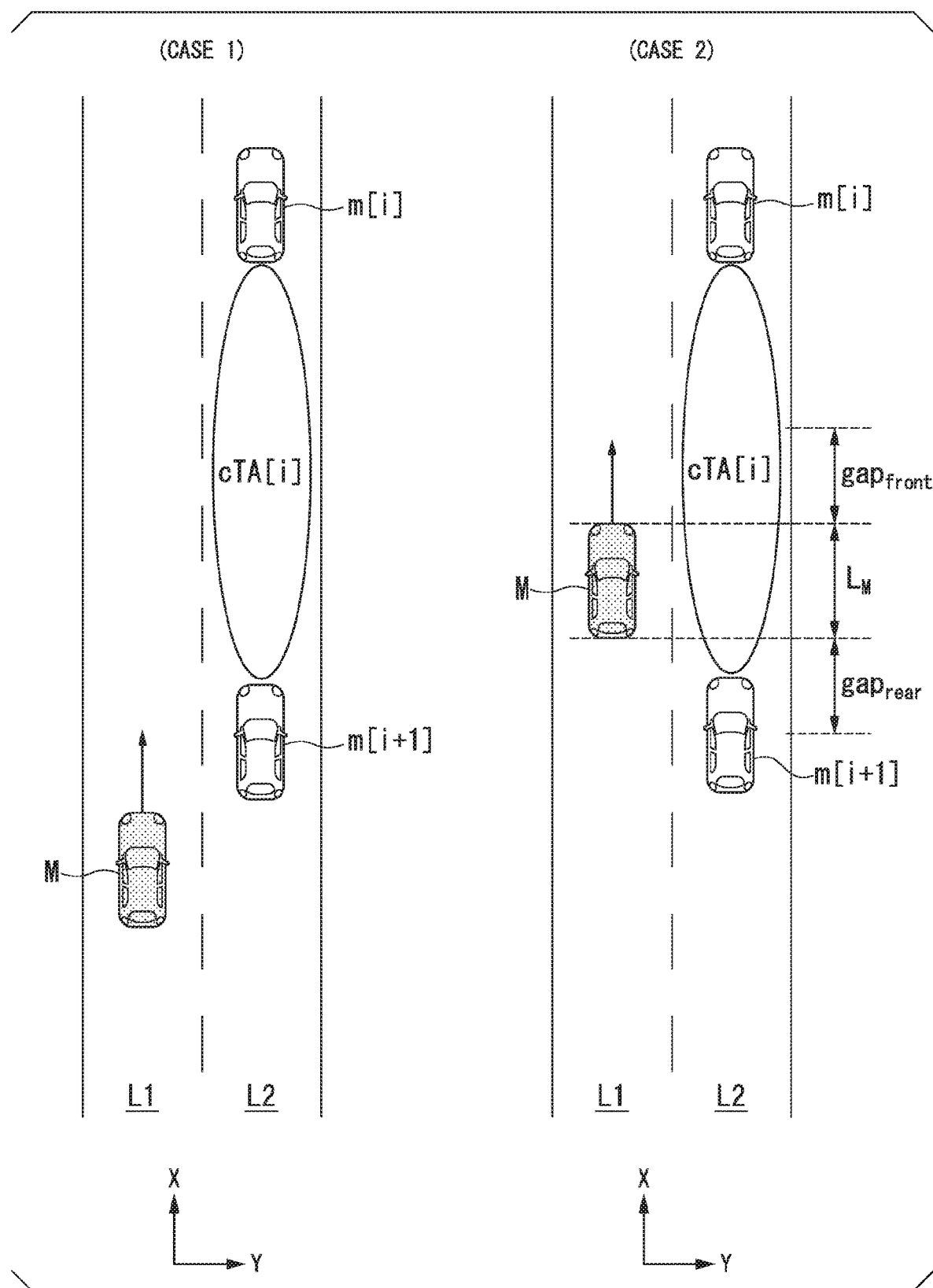
FIG. 11 is an explanatory diagram showing the processing of step S214.
Figure 12:
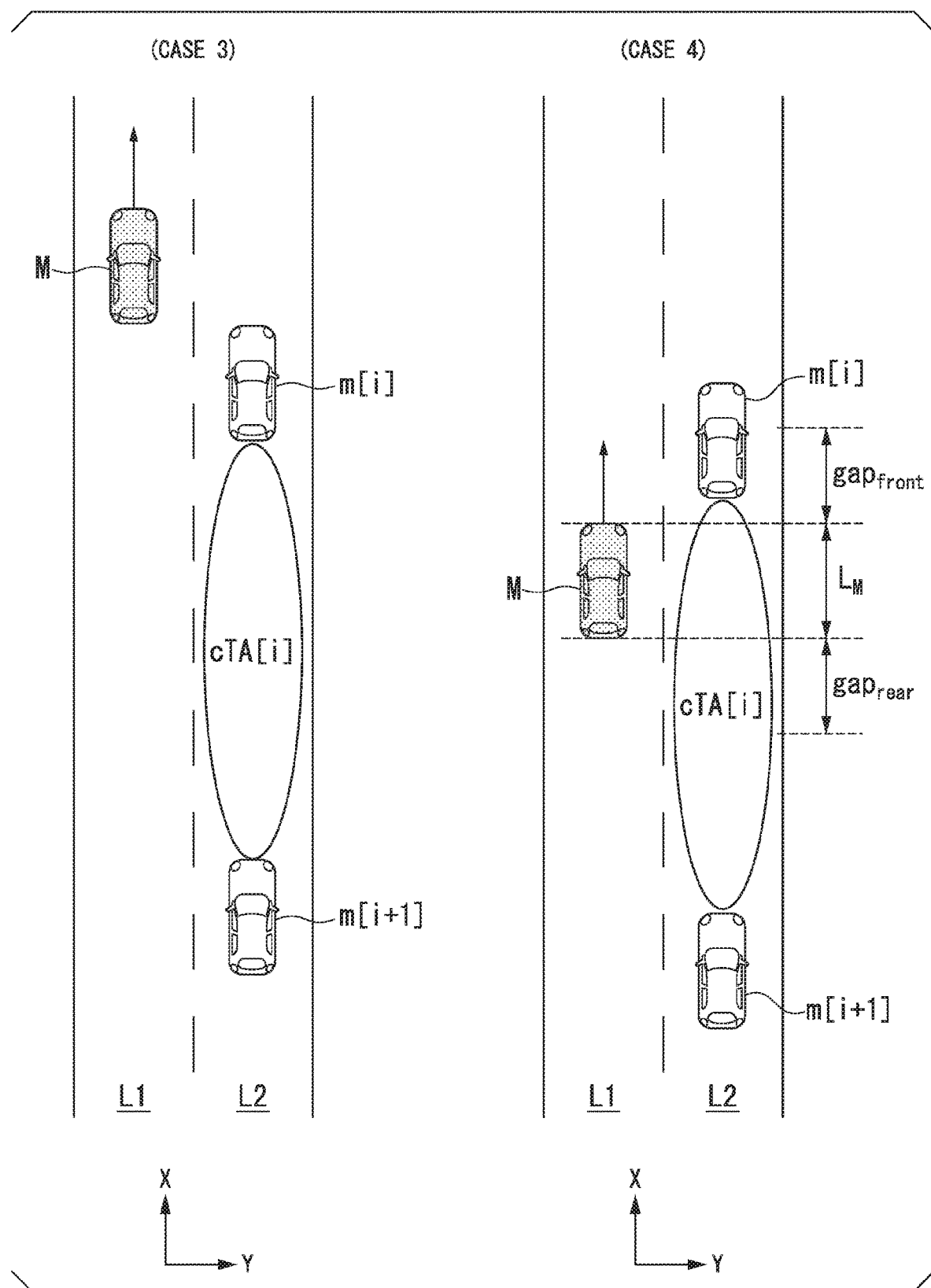
FIG. 12 is an explanatory diagram showing the processing of step S214.

FIGS. 11 and 12 are explanatory diagrams showing the processing of step S214. FIG. 11 shows two cases (case 1 and case 2) in which it is determined that the target position candidate cTA[i] is in front of the host vehicle. Case 1 is a case in which the entire target position candidate cTA[i] is in front of the host vehicle M. Case 2 is a case in which a part of the target position candidate cTA[i] overlaps the host vehicle M in the longitudinal direction, but at least a part of another vehicle m[i+1] is present in a region from the projected front end of the host vehicle M to a point behind the rear allowance distance $gap_{rear}$ from the rear end of the host vehicle M. The target position candidate evaluater 148 determines that the target position candidate cTA[i] is in front of the host vehicle in both cases 1 and 2.

FIG. 12 shows two cases (case 3 and case 4) in which it is determined that the target position candidate cTA[i] is behind the host vehicle. Case 3 is a case in which the entire target position candidate cTA[i] is behind the host vehicle M. Case 4 is a case in which a part of the target position candidate cTA[i] overlaps the host vehicle M in the longitudinal direction, but at least a part of another vehicle m[i] is present in a region from the projected rear end of the host vehicle M to a point in front of the front allowance distance $gap_{front}$ from the front end of the host vehicle M. The target position candidate evaluater 148 determines that the target position candidate cTA[i] is behind the host vehicle in both cases 3 and 4.

Returning to FIG. 8, when it is determined that the target position candidate cTA[i] is behind the host vehicle M, the target position candidate evaluater 148 moves the process to step S250 of FIG. 15. This will be described below.

When it is determined that the target position candidate cTA[i] is in front of the host vehicle M, the target position candidate evaluater 148 calculates a degree of approach to another vehicle m[i+1] (to be determined in accordance with a lane change mode thereafter) without limiting the number of reference vehicles (to be described below) to 1 at that time (step S216). The degree of approach is, for example, time to collision (TTC), and is obtained by dividing a distance by a relative speed. Instead of the TTC, any index value indicating the degree of approach may be calculated. Although the TTC is usually obtained as a relationship between vehicles on the same lane, the TTC is assumed to be obtained in a state in which it is assumed that the host vehicle M is in the lane of the lane change destination in the present embodiment.

The reference vehicle is another vehicle m for which a speed relationship with the host vehicle M is referred to in order to calculate an evaluation value. In the present embodiment, the speed of the host vehicle M is controlled so that the lane change is completed in a state in which a sufficient inter-vehicle distance is maintained with respect to the other vehicle m that travels immediately behind the target position TA when the host vehicle M makes the lane change to the front target position TA, and the speed of the host vehicle M is controlled so that the lane change is completed in a state in which a sufficient inter-vehicle distance is maintained with respect to another vehicle m that travels immediately in front of the target position TA when the host vehicle M makes the lane change to the rear target position TA. Accordingly, when it is determined that the target position candidate cTA[i] is in front of the host vehicle M, the target position candidate evaluater 148 sets another vehicle m[i+1] that travels behind the target position candidate cTA[i] as a reference vehicle. However, when a "pre-deceleration mode" to be described below is adopted, the target position candidate evaluater 148 sets another vehicle m[i] that travels in front of the target position candidate cTA[i] as the reference vehicle. The pre-deceleration mode is a mode in which the lane is changed to the target position TA located in front of the host vehicle M while deceleration is being performed. In this case, the other vehicle m[i] is set as the reference vehicle because it is unnatural to assume vehicle behavior such as purposely passing through the vicinity of the other vehicle m[i+1] when the lane change to a position in front of the host vehicle M is made while deceleration is being performed. When it is determined that the target position candidate cTA[i] is behind the host vehicle M, the target position candidate evaluater 148 sets the other vehicle m[i] that travels in front of the target position candidate cTA[i] as the reference vehicle. The other vehicle m[i] that travels in front of the target position candidate cTA[i] when it is determined that the target position candidate cTA[i] is in front of the host vehicle M and the other vehicle m[i+1] that travels behind the target position candidate cTA[i] when it is determined that the target position candidate cTA[i] is behind the host vehicle M are set as materials for evaluating the target position candidate cTA[i] without being set as references for speed control.

Next, the target position candidate evaluater 148 determines whether or not a degree of approach satisfies a criterion (step S218). For example, when the TTC between the host vehicle M and the other vehicle m[i+1] is greater than or equal to a prescribed value, the target position candidate evaluater 148 determines that the degree of approach satisfies the criterion. When it is determined that the degree of approach does not satisfy the criterion, the target position candidate evaluater 148 determines that the "lane change to the target position candidate cTA[i] is impossible at that time" (step S230).

When it is determined that the degree of approach satisfies the criterion, the target position candidate evaluater 148 determines whether or not a speed $V_M$ of the host vehicle M is less than a speed $V_{m[i+1]}$ of the reference vehicle m[i+1] (step S220). When it is determined that the speed $V_M$ of the host vehicle M is less than the speed $V_{m[i+1]}$ of the reference vehicle m[i+1], the target position candidate evaluater 148 determines an "acceleration mode" as the lane change mode (step S224).

When it is determined that the speed $V_M$ of the host vehicle M is greater than or equal to the speed $V_{m[i+1]}$ of the reference vehicle m[i+1], the target position candidate evaluater 148 determines whether or not the speed $V_M$ of the host vehicle M exceeds the speed $V_{m[i+1]}$ of the reference vehicle m[i+1] (step S222). When it is determined that the speed $V_M$ of the host vehicle M does not exceed the speed $V_{m[i+1]}$ of the reference vehicle m[i+1], i.e., the speed $V_M$ of the host vehicle M is equal to the speed $V_{m[i+1]}$ of the reference vehicle m[i+1], the target position candidate evaluator 148 determines the "acceleration mode" as the lane change mode (step S224).

When it is determined that the speed $V_M$ of the host vehicle M exceeds the speed $V_{m[i+1]}$ of the reference vehicle m[i+1], the target position candidate evaluater 148 determines any one of the "acceleration mode", the "constant-speed overtaking mode", and the "pre-deceleration mode" as the lane change mode (step S226).

Figure 13:
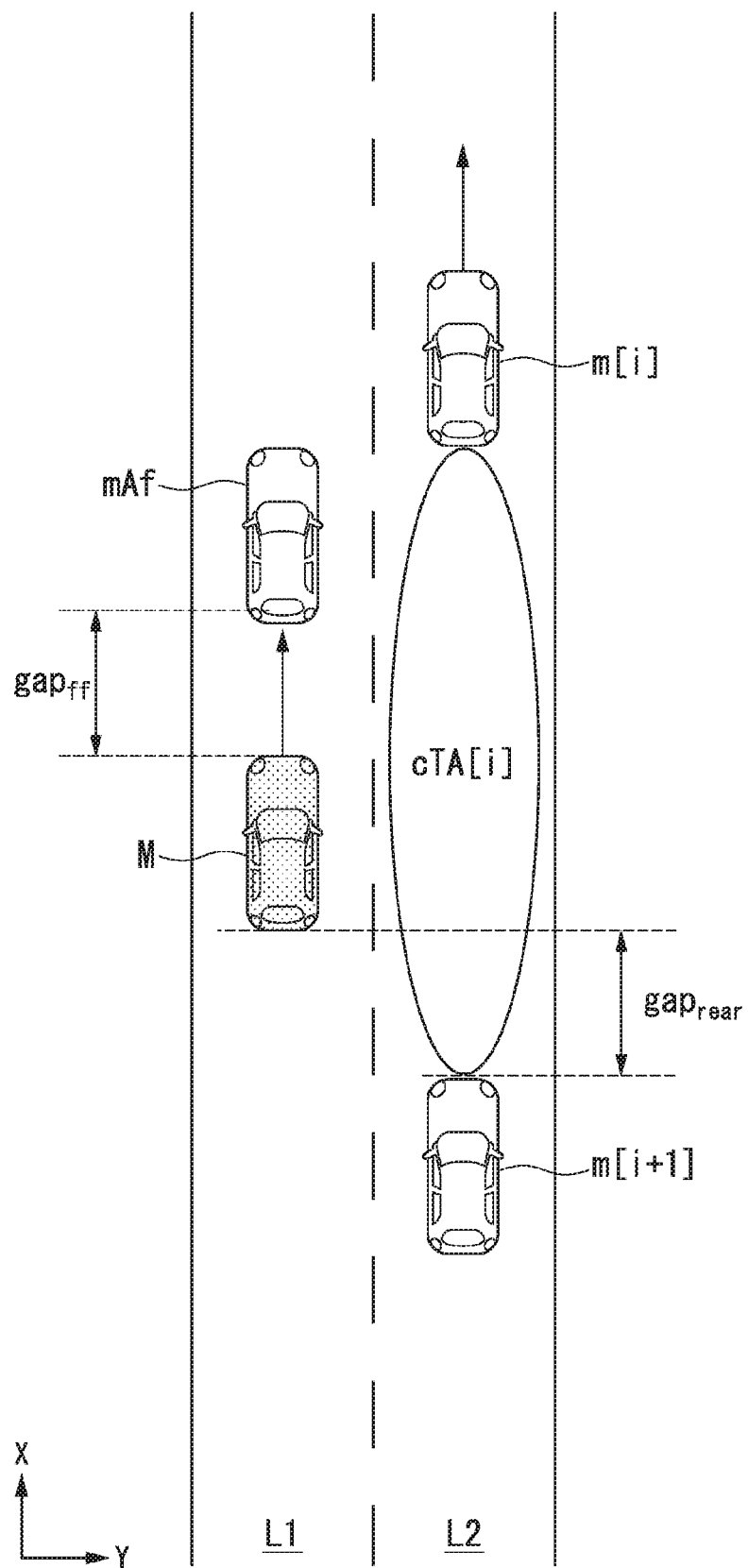
FIG. 13 is an explanatory diagram showing the processing of step S228.

When the lane change mode is determined, the target position candidate evaluater 148 determines whether or not the route is blocked by a preceding vehicle during the lane change (step S228). FIG. 13 is an explanatory diagram showing the processing of step S228. For example, the target position candidate evaluater 148 determines that the route is blocked by the preceding vehicle during the lane change when an inter-vehicle distance from a preceding vehicle mAf that travels in the same direction on the same lane as that of the host vehicle M is less than a following inter-vehicle distance $gap_{ff}$ if the host vehicle M is assumed to be at a position of an inter-vehicle distance equivalent to the rear allowance distance $gap_{rear}$ from the reference vehicle m[i+1]. The following inter-vehicle distance $gap_{ff}$ is obtained, for example, on the basis of Eq. (3). In Eq. (3), Tfr2 is time indicating how much vehicle time-headway is required to be secured with respect to the preceding vehicle mAf on the same lane until the completion of the lane change.

$$gap_{ff} = Tfr2 \times V_M \qquad (3)$$

Returning to FIG. 8, when it is determined that the route is blocked by the preceding vehicle during the lane change, the target position candidate evaluater 148 determines that the "lane change to the target position candidate cTA[i] is impossible at that time" (step S230). On the other hand, when it is determined that the route is not blocked by the preceding vehicle during the lane change, the target position candidate cTA[i] is treated as a valid target and is set as an evaluation target.

When it is determined that the target position candidate cTA[i] is a position where the lane change to a position just beside the host vehicle M is possible in step S212, the target position candidate evaluater 148 moves the process to the flowchart of FIG. 14 and determines whether or not the degree of approach to the other vehicle m[i+1] behind the target position candidate cTA[i] satisfies the criterion (step S240). For example, when the TTC between the host vehicle M and the other vehicle m[i+1] is greater than or equal to a prescribed value, the target position candidate evaluater 148 determines that the degree of approach to the other vehicle m[i+1] satisfies the criterion. When it is determined that the degree of approach to the other vehicle m[i+1] does not satisfy the criterion, the target position candidate evaluater 148 determines that the "lane change to the target position candidate cTA[i] is impossible at that time" (step S230; FIG. 8).

When it is determined that the degree of approach to the other vehicle m[i+1] satisfies the criterion, the target position candidate evaluater 148 determines whether or not the degree of approach to the other vehicle m[i] in front of the target position candidate cTA[i] satisfies the condition (step S242). For example, when the TTC between the host vehicle M and the other vehicle m[i] is greater than or equal to a prescribed value, the target position candidate evaluater 148 determines that the degree of approach to the other vehicle m[i] satisfies the criterion.

When it is determined that the degree of approach to the other vehicle m[i] satisfies the criterion, the target position candidate evaluater 148 determines a "just-beside mode" as the lane change mode (step S244). On the other hand, when it is determined that the degree of approach to the other vehicle m[i] does not satisfy the criterion, the target position candidate evaluater 148 determines a "lateral deceleration mode" as the lane change mode (step S244). In any case, the process returns to the process of the flowchart of FIG. 8.

When it is determined that the target position candidate cTA[i] is behind (not in front of) the host vehicle in step S214, the target position candidate evaluater 148 moves the process to the flowchart of FIG. 15, determines the other vehicle m[i] that travels in front of the target position candidate cTA[i] as the reference vehicle, and calculates the degree of approach to the other vehicle m[i+1] (step S250).

Next, the target position candidate evaluater 148 determines whether or not the degree of approach satisfies the criterion (step S252). For example, when the TTC between the host vehicle M and the other vehicle m[i+1] is greater than or equal to a prescribed value, the target position candidate evaluater 148 determines that the degree of approach satisfies the criterion. When it is determined that the degree of approach does not satisfy the criterion, the target position candidate evaluater 148 determines that the "lane change to the target position candidate cTA[i] is impossible at that time" (step S230; FIG. 8). Such processing is taken into consideration so that the lane change of the host vehicle M does not force the other vehicle m[i+1] that travels behind the target position TA into unnecessary deceleration. In contrast, the degree of approach to the other vehicle m[i] that travels in front of the target position TA is not taken into consideration because a distance between the vehicles can be adjusted by the deceleration of the host vehicle M.

When it is determined that the degree of approach satisfies the criterion, the target position candidate evaluater 148 determines whether or not the speed $V_M$ of the host vehicle M is less than the speed $V_{m[i]}$ of the reference vehicle m[i] (step S254). When it is determined that the speed $V_M$ of the host vehicle M is less than the speed $V_{m[i]}$ of the reference vehicle m[i], the target position candidate evaluater 148 determines that the lane change mode is a "constant-speed reverse mode" or a "post-deceleration mode" (step S256).

When it is determined that the speed $V_M$ of the host vehicle M is greater than or equal to the speed $V_{m[i]}$ of the reference vehicle m[i], the target position candidate evaluater 148 determines that the lane change mode is the "post-deceleration mode" (step S258).

Figure 16:
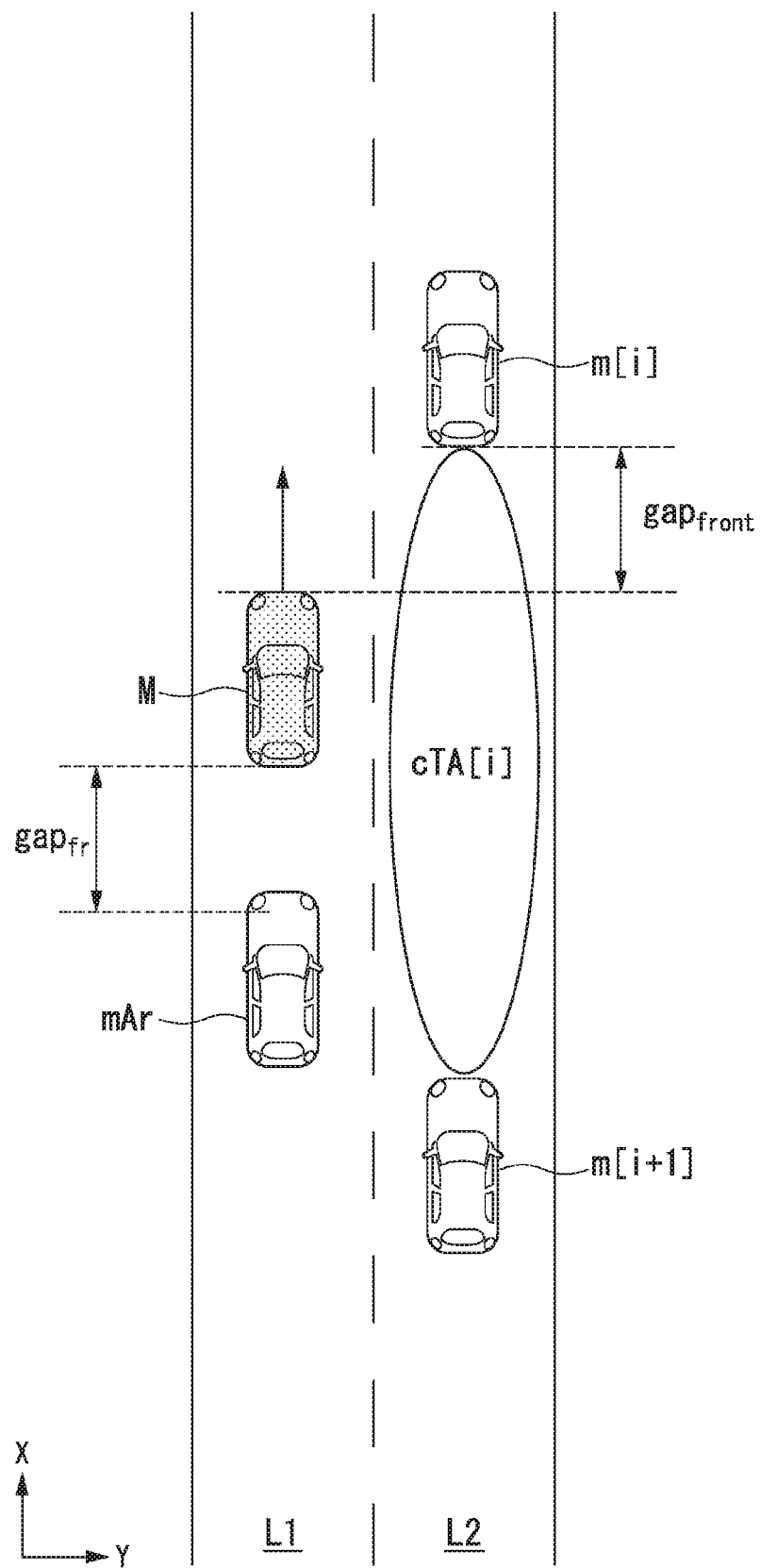
FIG. 16 is an explanatory diagram showing the processing of step S260.

When the lane change mode is determined, the target position candidate evaluater 148 determines whether or not the route is blocked by a following vehicle during the lane change (step S260). FIG. 16 is an explanatory diagram showing the processing of step S260. For example, the target position candidate evaluater 148 determines that the route is blocked by a following vehicle during the lane change when an inter-vehicle distance from the following vehicle mAr that travels in the same direction on the same lane as that of the host vehicle M is less than a followed inter-vehicle distance $gap_{fr}$ if the host vehicle M is assumed to be at a position of an inter-vehicle distance equivalent to the front allowance distance $gap_{front}$ from the reference vehicle m[i]. The followed inter-vehicle distance $gap_{fr}$ is obtained, for example, on the basis of Eq. (4). In Eq. (4), Tre2 is time indicating how much vehicle time-headway is required to be secured in the following vehicle mAr on the same lane with respect to the host vehicle M until the completion of the lane change. Here, a psychological influence on an occupant of the following vehicle mAr when the following vehicle mAr is braked by shortening an inter-vehicle distance from the following vehicle mAr is considered to be greater than a psychological influence on an occupant of the preceding vehicle mAf by shortening an inter-vehicle distance from the preceding vehicle mAf. Accordingly, it is preferable to set Tfr2 and Tre2 such that Tfr2>Tre2 is satisfied.

$$gap_{fr} = Tre2 \times V_M \quad (4)$$

Returning to FIG. 8, when it is determined that the route is blocked by the following vehicle during the lane change, the target position candidate evaluater 148 determines that the "lane change to the target position candidate cTA[i] is impossible at that time" (step S230). On the other hand, when it is determined that the route is not blocked by the following vehicle during the lane change, the target position candidate cTA[i] is treated as a valid target and is set as an evaluation target.

When the lane change mode is determined for each target position candidate cTA[i] or it is determined that the "lane change is impossible at that time", the calculation type selector 148A selects a type of calculation according to the lane change mode with respect to each target position candidate cTA[i] and the calculation executor 148B executes the selected calculation. Thereby, because it is possible to perform appropriate calculation in accordance with the lane change mode and eliminate the need to perform unnecessary calculation, it is possible to reduce the processing load on a processor.

The processes of the calculation type selector 148A and the calculation executor 148B will be described below for each of the lane change modes described above. The calculation executor 148B calculates a required lane change time $t_{LC}$ or a lane change time traveling distance $x_{LC}$, an evaluated inter-vehicle distance $gap_{LC}$, and acceleration (deceleration) g as evaluation values. The required lane change time $t_{LC}$ is time from the start of the lane change to the completion of the lane change when the lane change is made using the target position candidate cTA as the target position TA (the same is true for the following). The lane change time traveling distance $x_{LC}$ is a distance in the longitudinal direction in which the host vehicle M travels from the start of the lane change to the completion of the lane change. In the following description, instead of the required lane change time $t_{LC}$, the lane change time traveling distance $x_{LC}$ is assumed to be the evaluation value. The evaluated inter-vehicle distance $gap_{LC}$ is a displacement difference between the other vehicle m[i] and the other vehicle m[i+1] at a point in time when movement in the lateral direction in the lane change to the target position candidate cTA[i] has started (a point in time when the lane change has started if alignment in the longitudinal direction is unnecessary or a point in time when alignment in the longitudinal direction has been completed) as necessary. The completion of the lane change means, for example, that the entire body of the host vehicle M is contained in the lane of the lane change destination or that a center position of the host vehicle M has reached the center line of the lane of the lane change destination. In the following description, these may be simply denoted by $t_{LC}$, $x_{LC}$, and $gap_{LC}$.

(Basic Concept)

Figure 17:
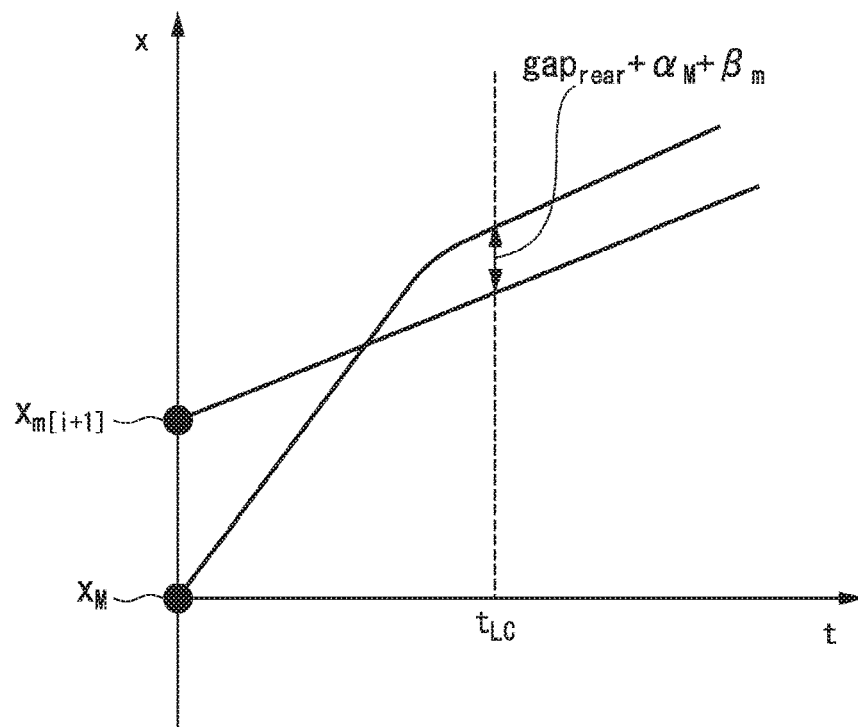
FIG. 17 is a diagram showing changes over time in displacements of a reference vehicle and a host vehicle in a longitudinal direction serving as a guideline for calculation when a target position candidate is in front of the host vehicle.

FIG. 17 shows changes over time in displacements of the reference vehicle m[i+1] and the host vehicle M in the longitudinal direction serving as a guideline for calculation when the target position candidate cTA[i] is in front of the host vehicle M (except for the case of the pre-deceleration mode). In FIG. 17, $x_{m[i+1]}$ is an initial value of the displacement of the reference vehicle m[i+1] in the longitudinal direction, $x_M$ is an initial value of the displacement of the host vehicle M in the longitudinal direction, and a straight line or a curve extending therefrom shows a change over time in the displacement in the longitudinal direction. The displacement in the longitudinal direction is based on representative points of the host vehicle M and the reference vehicle m[i+1]. As shown in FIG. 17, the calculation type selector 148A selects a type of calculation according to the premise that the speed of the host vehicle M is controlled so that the displacement difference between the host vehicle M and the reference vehicle m[i+1] is gradually close to a distance obtained by adding $\alpha_m$ and $\beta_m$ to the rear allowance distance $gap_{rear}$ when the host vehicle M is in front of the reference vehicle m[i+1] due to a relative speed difference between the host vehicle M and the reference vehicle m[i+1] and the required lane change time $t_{LC}$ has elapsed (i.e., when the lane change has been completed), and causes the calculation executor 148B to perform calculation. $\alpha_M$ is a distance from the rear end of the host vehicle M to the representative point and $\beta_m$ is a distance from the front end of the reference vehicle m[i+1] to the representative point. In the following description, $gap_{rear} + \alpha_M + \beta_m$ is written as "$gap_{rear}*$".

Figure 18:
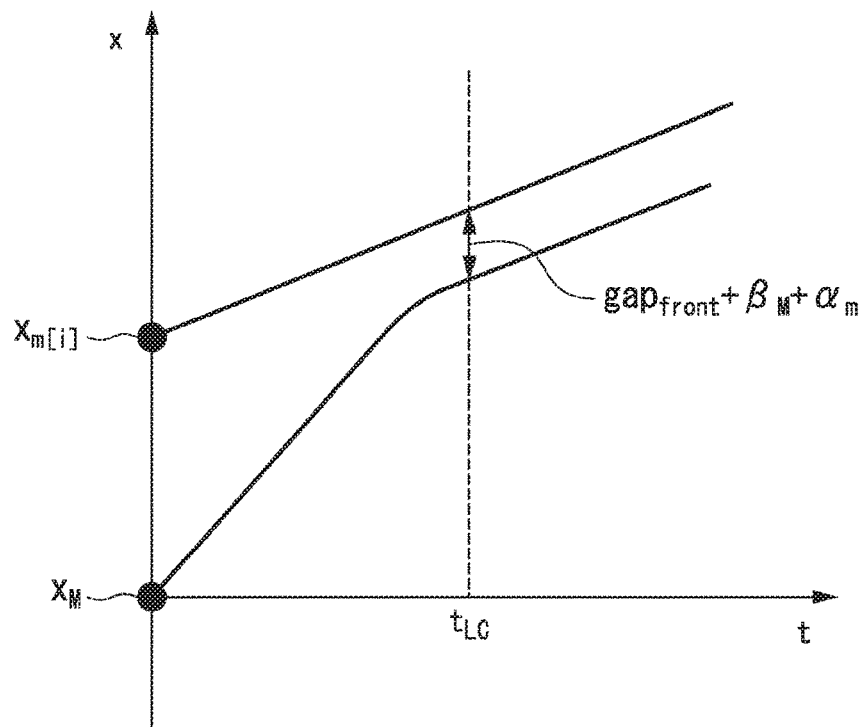
FIG. 18 is a diagram showing changes over time in displacements of the reference vehicle and the host vehicle in the longitudinal direction serving as the guideline for calculation in the case of a pre-deceleration mode.

FIG. 18 is a diagram showing changes over time in displacements of the reference vehicle m[i] and the host vehicle M in the longitudinal direction serving as the guideline for calculation in the case of the pre-deceleration mode. In FIG. 18, $x_{m[i]}$ denotes an initial value of the displacement of the reference vehicle m[i] in the longitudinal direction, $x_M$ denotes an initial value of the displacement of the host vehicle M in the longitudinal direction, and a straight line or a curve extending therefrom shows a change over time in the displacement in the longitudinal direction. The displacement in the longitudinal direction is based on representative points of the host vehicle M and the reference vehicle m[i]. As shown in FIG. 18, the calculation type selector 148A selects a type of calculation according to the premise that the speed of the host vehicle M is controlled so that the displacement difference between the host vehicle M and the reference vehicle m[i] is gradually close to a distance obtained by adding $\beta_M$ and $\alpha_m$ to the front allowance distance $gap_{from}$ when the host vehicle M approaches the rear of the reference vehicle m[i] due to a relative speed difference between the host vehicle M and the reference vehicle m[i] and the required lane change time $t_{LC}$ has elapsed (i.e., when the lane change has been completed), and causes the calculation executor 148B to perform calculation. $\beta_M$ denotes a distance from the front end of the host vehicle M to the representative point and $\alpha_m$ denotes a distance from the rear end of the reference vehicle m[i] to the representative point. In the following description, $gap_{front} + \beta_M + \alpha_m$ is written as "$gap_{front}*$".

Figure 19:
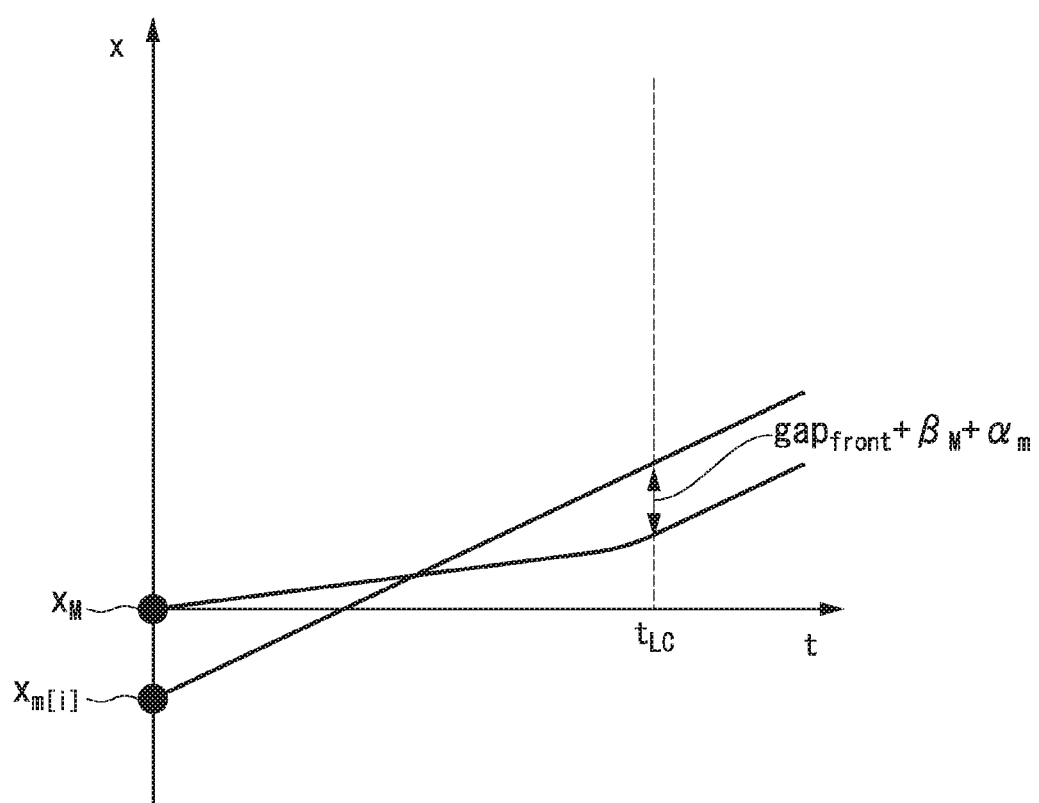
FIG. 19 is a diagram showing changes over time in displacements of the reference vehicle and the host vehicle in the longitudinal direction serving as the guideline for calculation when the target position candidate is behind the host vehicle.

FIG. 19 shows changes over time in displacements of the reference vehicle m[i] and the host vehicle M in the longitudinal direction serving as a guideline for calculation when the target position candidate cTA[i] is behind the host vehicle M. In FIG. 19, $x_{m[i]}$ denotes an initial value of the displacement of the reference vehicle m[i] in the longitudinal direction, $x_M$ denotes an initial value of the displacement of the host vehicle M in the longitudinal direction, and a straight line or a curve extending therefrom shows a change over time in the displacement in the longitudinal direction. The displacement in the longitudinal direction is based on representative points of the host vehicle M and the reference vehicle m[i]. As shown in FIG. 19, the calculation type selector 148A selects a type of calculation according to the premise that the speed of the host vehicle M is controlled so that the displacement difference between the host vehicle M and the reference vehicle m[i] is gradually close to a distance obtained by adding $\beta_M$ and $\alpha_m$ to the front allowance distance $gap_{front}$ when the host vehicle M is behind the reference vehicle m[i] due to a relative speed difference between the host vehicle M and the reference vehicle m[i] and the required lane change time $t_{LC}$ has elapsed (i.e., when the lane change has been completed), and causes the calculation executor 148B to perform calculation.

Although the front allowance distance $gap_{front}$ and the rear allowance distance $gap_{rear}$ used for such control are illustrated to be values dependent on the speed of the host vehicle M, the front allowance distance $gap_{front}$ and the rear allowance distance $gap_{rear}$ may be calculated using the speed of the host vehicle M at an evaluation time, or calculated on the basis of a future speed to which a change in the speed of the host vehicle M is added, in calculation to be described below.

(Acceleration Mode)

When the acceleration mode is adopted, for example, the calculation type selector 148A causes the calculation executor 148B to perform calculation under an assumption that the reference vehicle m[i+1] performs constant-speed motion and the host vehicle M performs constant-acceleration motion. Motion equations of the host vehicle M and the reference vehicle m[i+1] are represented by Eq. (5). In Eq. (5), g denotes acceleration in the constant-acceleration motion (i.e., the assumed acceleration acting on the host vehicle M) represented in the form of gravity acceleration. Hereinafter, g is referred to as acceleration g. $x_{m[i+1]}$ and $v_{m[i+1]}$ are an initial value of the displacement and the speed of the reference vehicle m[i+1] in the longitudinal direction, respectively. Eq. (6) is derived when Eq. (5) is rearranged for $t_{LC}$ and $t_{LC}$ is obtained as shown in Eq. (7) by solving Eq. (6). The calculation executor 148B obtains $x_{LC}$ and $gap_{LC}$ on the basis of Eqs. (8) and (9), respectively. In the acceleration mode, the acceleration g is set to a constant value (for example, from about 0.1 g to about 0.2 g).

[Math. 1]

$$x_{m[i+1]} + t_{LC} \times v_{m[i+1]} = t_{LC} \times v_M + \frac{1}{2}g \times 9.8 \times t_{LC}^2 - gap_{rear}^* \quad (5)$$

$$g \times 9.8 \times t_{LC}^2 + 2t_{CL} \times (v_M - v_{m[i+1]}) - 2(x_{m[i+1]} + gap_{rear}^*) = 0 \quad (6)$$

$$t_{LC} = \frac{-(v_M - v_{m[i+1]}) + \sqrt{(v_M - v_{m[i+1]})^2 + 2 \times 9.8 g(x_{m[i+1]} + gap_{rear}^*)}}{9.8 g} \quad (7)$$

$$x_{LC} = t_{LC} \times v_M + 0.5 \times g \times t_{LC}^2 \quad (8)$$

$$gap_{LC} = gap_{rear}^* + (v_{m[i]} \times t_{LC} + x_{m[i]} - x_{LC}) \quad (9)$$

(Constant-Speed Overtaking Mode)

When the constant-speed overtaking mode is adopted, the calculation type selector 148A assumes that both the reference vehicle m[i+1] and the host vehicle M perform constant-speed motion, selects a type of calculation according to the premise that a displacement difference from the reference vehicle m[i+1] becomes $gap_{rear}^*$ when the acceleration g=0 and the required lane change time $t_{LC}$ has elapsed (i.e., when the lane change has been completed), and causes the calculation executor 148B to perform calculation. The calculation executor 148B calculates $t_{LC}$, $x_{LC}$, and $gap_{LC}$ on the basis of Eqs. (11) to (13) obtained from Eq. (10). In Eq. (11), tset is a lower limit value defined by the regulation and is, for example, a value of about 3 [sec].

[Math. 2]

$$x_{m[i+1]} + t_{LC} \times v_{m[i+1]} + gap_{rear}^* = t_{LC} \times v_M \quad (10)$$

$$t_{LC} = \text{MAX}\left\{\frac{x_{m[i+1]} + gap_{rear}^*}{v_M - v_{m[i+1]}}, tset\right\} \quad (11)$$

$$x_{LC} = t_{LC} \times v_M \quad (12)$$

$$gap_{LC} = gap_{rear}^* + x_{m[i]} + t_{LC} \times v_{m[i]} - x_{LC} \quad (13)$$

(Pre-Deceleration Mode)

When the pre-deceleration mode is adopted, for example, the calculation type selector 148A causes the calculation executor 148B to perform calculation under an assumption that the reference vehicle m[i] performs constant-speed motion and the host vehicle M performs constant-acceleration motion. Motion equations of the host vehicle M and the reference vehicle m[i] are represented by Eq. (14). If Eq. (14) is rearranged for $t_{LC}$, Eq. (15) is given. In order to complete the lane change when the displacement difference from the reference vehicle m[i] becomes $gap_{front}^*$, it is necessary to set a discriminant of Eq. (15) to zero. The acceleration g for setting the discriminant to zero is represented by Eq. (16). The calculation executor 148B calculates $t_{LC}$, $x_{LC}$, and $gap_{LC}$ on the basis of Eqs. (17) to (19) using g obtained by Eq. (16).

[Math. 3]

$$x_{m[i]} + t_{LC} \times v_{m[i]} = t_{LC} \times v_M + \frac{1}{2}g \times 9.8 \times t_{LC}^2 + gap_{front}^* \quad (14)$$

$$g \times 9.8 \times t_{LC}^2 + 2t_{LC} \times (v_M - v_{m[i]}) + 2(gap_{front}^* - x_{m[i]}) = 0 \quad (15)$$

$$g = \frac{-(v_M - v_{m[i]})^2}{2 \times 9.8(x_{m[i]} - gap_{front}^*)} \quad (16)$$

$$t_{LC} = \frac{-(v_M - v_{m[i]})}{g \times 9.8} = \frac{2(x_{m[i]} + gap_{front}^*)}{(v_M - v_{m[i]})} \quad (17)$$

$$x_{LC} = t_{LC} \times v_M + 0.5 \times g \times t_{LC}^2 \quad (18)$$

$$gap_{LC} = gap_{front}^* + x_{LC} - (x_{m[i+1]} + t_{LC} \times v_{m[i+1]}) \quad (19)$$

(Just-Beside Mode)

When the just-beside mode is adopted, the calculation type selector 148A, for example, causes the calculation executor 148B to calculate $t_{LC}$, $x_{LC}$, and $gap_{LC}$ on the basis of Eqs. (20) to (22) under the premise that the host vehicle M can complete the lane change after the elapse of tset.

[Math. 4]

$$t_{LC} = tset \quad (20)$$

$$x_{LC} = t_{LC} \times v_M \quad (21)$$

$$gap_{LC} = x_{m[i]} + t_{LC} \times v_{m[i]} - (x_{m[i+1]} + t_{LC} \times v_{m[i+1]}) \quad (22)$$

(Lateral Deceleration Mode)

When the lateral deceleration mode is adopted, the calculation type selector 148A may cause the calculation executor 148B to calculate $t_{LC}$, $x_{LC}$, and $gap_{LC}$ on the basis of Eqs. (23) to (25) under the premise that the lane change can be completed after the elapse of tset while the host vehicle M is decelerating with constant acceleration g. In this case, the acceleration g is set to a constant value (for example, from about −0.1 g to about −0.2 g).

[Math. 5]

$$t_{LC} = tset \quad (23)$$

$$x_{LC} = t_{LC} \times v_M + 0.5 \times g \times t_{LC}^2 \quad (24)$$

$$gap_{LC} = x_{m[i]} + t_{LC} \times v_{m[i]} - (x_{m[i+1]} + t_{LC} \times v_{m[i+1]}) \quad (25)$$

(Constant-Speed Reverse Mode)

When the constant-speed reverse mode is adopted, the calculation type selector 148A assumes that both the reference vehicle m[i] and the host vehicle M perform constant-speed motion, selects a type of calculation according to the premise that a displacement difference from the reference vehicle m[i] becomes $gap_{front}^*$ when the acceleration g=0 and the required lane change time $t_{LC}$ has elapsed (i.e., when the lane change has been completed), and causes the calculation executor 148B to perform calculation. The calculation executor 148B calculates $t_{LC}$, $x_{LC}$, and $gap_{LC}$ on the basis of Eqs. (27) and (28) obtained from Eq. (26).

[Math. 6]

$$x_{m[i]} + t_{LC} \times v_{m[i]} = t_{LC} \times v_M + gap_{front}^* \quad (26)$$

$$t_{LC} = \text{MAX}\left\{\frac{gap_{front}^* - x_{m[i]}}{v_{m[i]} - v_M}, tset\right\} \quad (27)$$

$$x_{LC} = t_{LC} \times v_M \quad (28)$$

$$gap_{LC} = gap_{front}^* + x_{LC} - (x_{m[i+1]} + t_{LC} \times v_{m[i+1]}) \quad (29)$$

(Post-Deceleration Mode)

When the post-deceleration mode is adopted, the calculation type selector 148A selects a type of calculation according to the premise that a displacement difference from the reference vehicle m[i] becomes $gap_{front}^*$, for example, when the required lane change time $t_{LC}$ has elapsed (i.e., when the lane change has been completed) while the host vehicle M is decelerating at constant acceleration g, and causes the calculation executor 148B to perform calculation. The calculation executor 148B calculates $t_{LC}$, $x_{LC}$, and $gap_{LC}$ on the basis of Eqs. (31) to (33) obtained from Eq. (30). In this case, the acceleration g is set to a constant value (for example, from about −0.1 g to about −0.2 g).

[Math. 7]

$$x_{m[i]} + t_{LC} \times v_{m[i]} = t_{LC} \times v_M + \frac{1}{2}g \times 9.8 \times t_{LC}^2 + gap_{front}^* \quad (30)$$

$$t_{LC} = \frac{-(v_M - v_{m[i]}) + \sqrt{(v_M - v_{m[i]})^2 + 2 \times 9.8g(x_{m[i]} - gap_{front}^*)}}{9.8g} \quad (31)$$

$$x_{LC} = t_{LC} \times v_M + 0.5 \times g \times t_{LC}^2 \quad (32)$$

$$gap_{LC} = gap_{front}^* + x_{LC} - (v_{m[i+1]} \times t_{LC} + x_{m[i+1]}) \quad (33)$$

Figure 20:
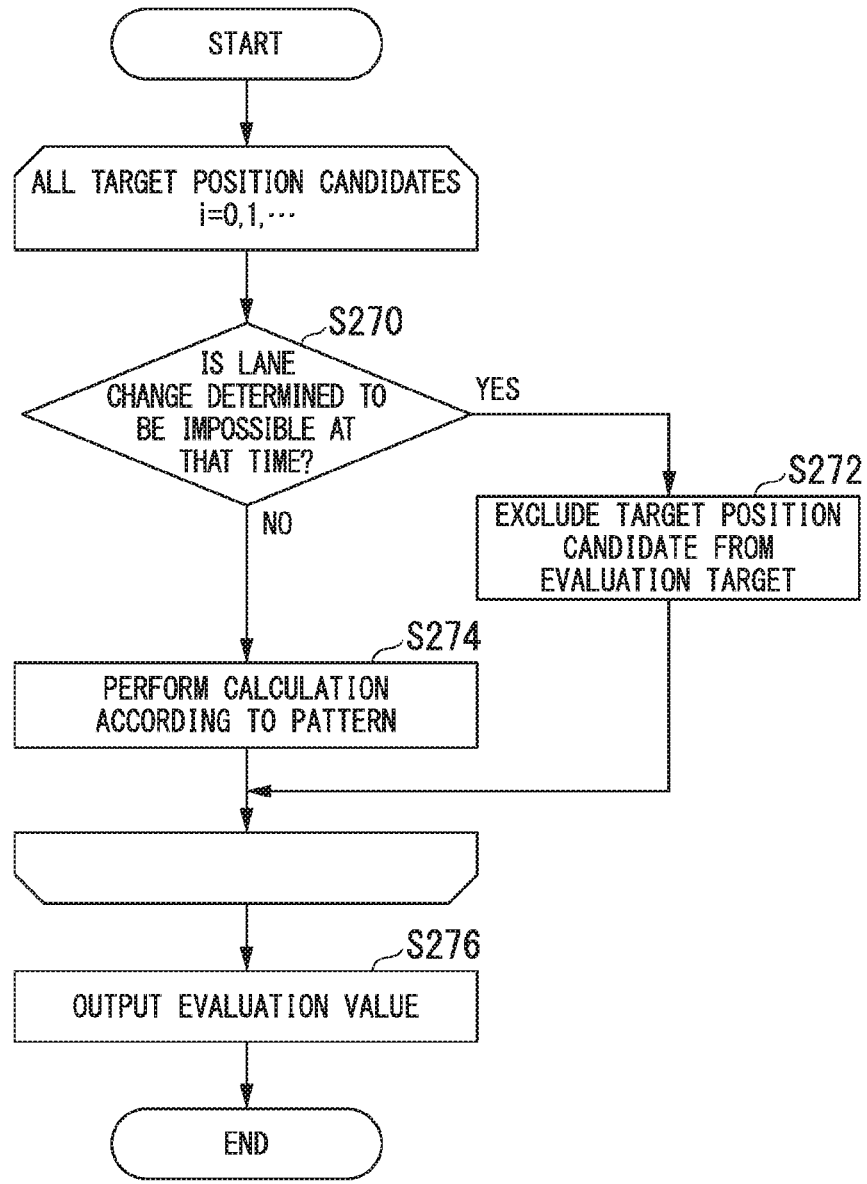
FIG. 20 is a flowchart illustrating an example of a flow of a subsequent-stage process performed by the target position candidate evaluater.

FIG. 20 is a flowchart showing an example of a flow of a previous-stage process executed by the target position candidate evaluater 148. The process of the present flowchart is executed after the processes of the flowcharts of FIGS. 8, 14 and 15.

First, the target position candidate evaluater 148 performs the processing of steps S270 to S274 with respect to all target position candidates cTA[i] (i=0, 1, . . . ). The calculation type selector 148A determines whether or not it is determined that the "lane change is impossible at that time" in step S230 in the flowcharts of FIGS. 8, 14, and 15 (step S270). When it is determined that the "lane change is impossible at that time", the calculation type selector 148A excludes the target position candidate cTA[i] from the evaluation target (step S272). The calculation executor 148B performs calculation according to a lane change mode pattern applied to the flowcharts of FIGS. 8, 14, and 15 with respect to target position candidate cTA[i] that has not been excluded from the evaluation target (step S274). For example, when a plurality of lane change modes are listed as candidates as shown in step S226 of FIG. 8, the calculation executor 148B performs calculations according to the plurality of lane change modes in parallel or sequentially.

Then, the target position candidate evaluater 148 outputs the evaluation value to the target position determiner 150 (step S276). The target position determiner 150 determines the target position TA on the basis of the input evaluation value. Such processing will be described below.

According to the process of the target position candidate evaluater 148 described above, it is possible to reduce the processing load as compared with when all patterns are calculated in the same calculation technique because simple calculation can be performed in some cases by performing different calculation for each lane change mode. The processing load can also be reduced by excluding the excluded pattern from the evaluation target. By reducing the processing load, it is also possible to quickly cope with a change in the surrounding situation and stabilize control.

[Evaluation of Target Position Candidate (Comprehensive Evaluation)—Determination of Target Position]

Hereinafter, a technique of determining a target position candidate cTA based on an evaluation value calculated by the target position candidate evaluater 148 will be described. The target position determiner 150 comprehensively evaluates a plurality of evaluation values (a lane change time traveling distance $x_{LC}$, an evaluated inter-vehicle distance $gap_{LC}$, and acceleration g) and determines a target position candidate cTA of a good evaluation result as a target position TA.

Figure 21:
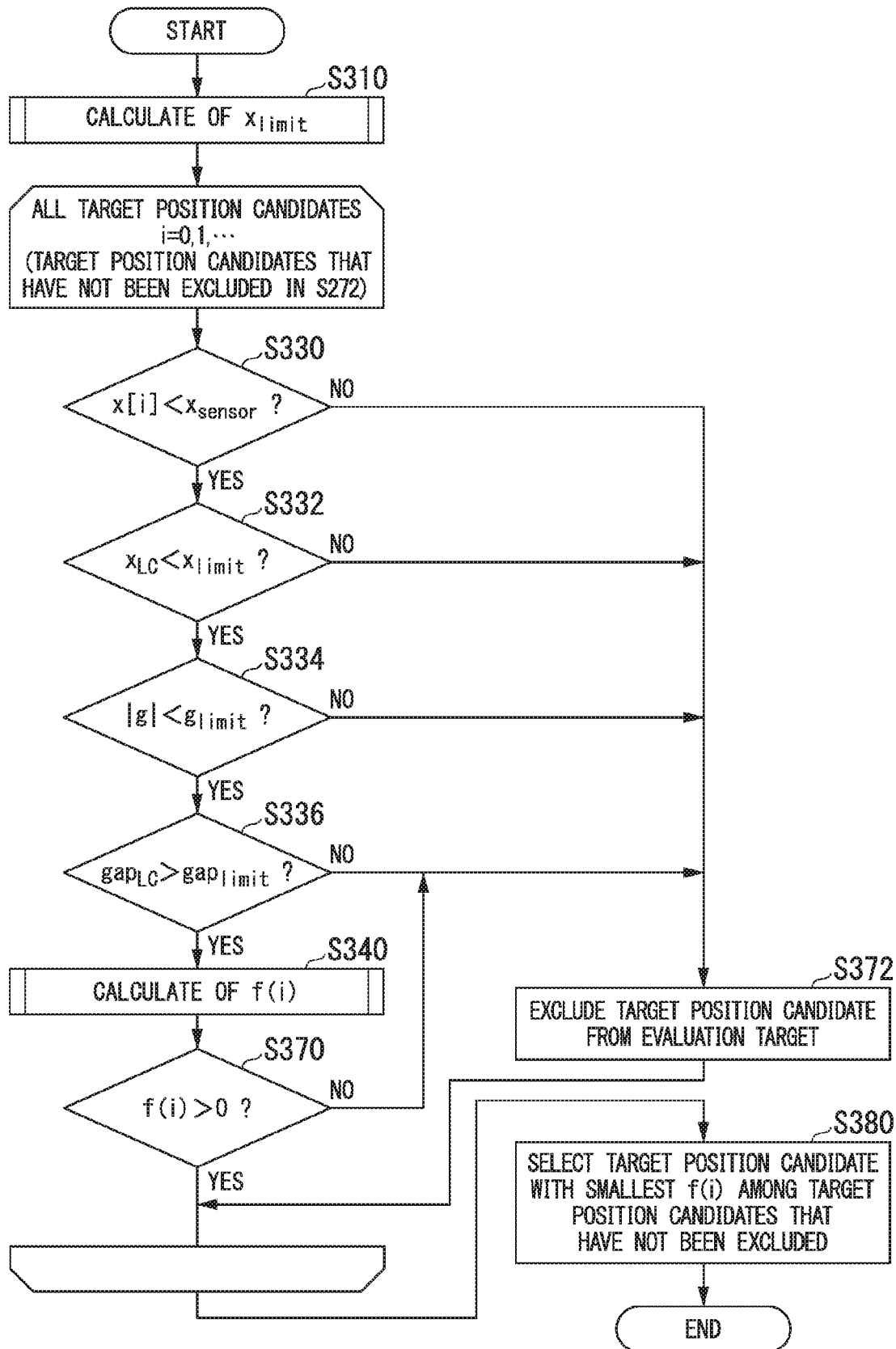
FIG. 21 is a flowchart showing an example of a flow of a process executed by a target position determiner.

FIG. 21 is a flowchart showing an example of a flow of a process executed by the target position determiner 150. The process of the present flowchart shows details of the processing of step S300 in the flowchart of FIG. 3.

Figure 22:
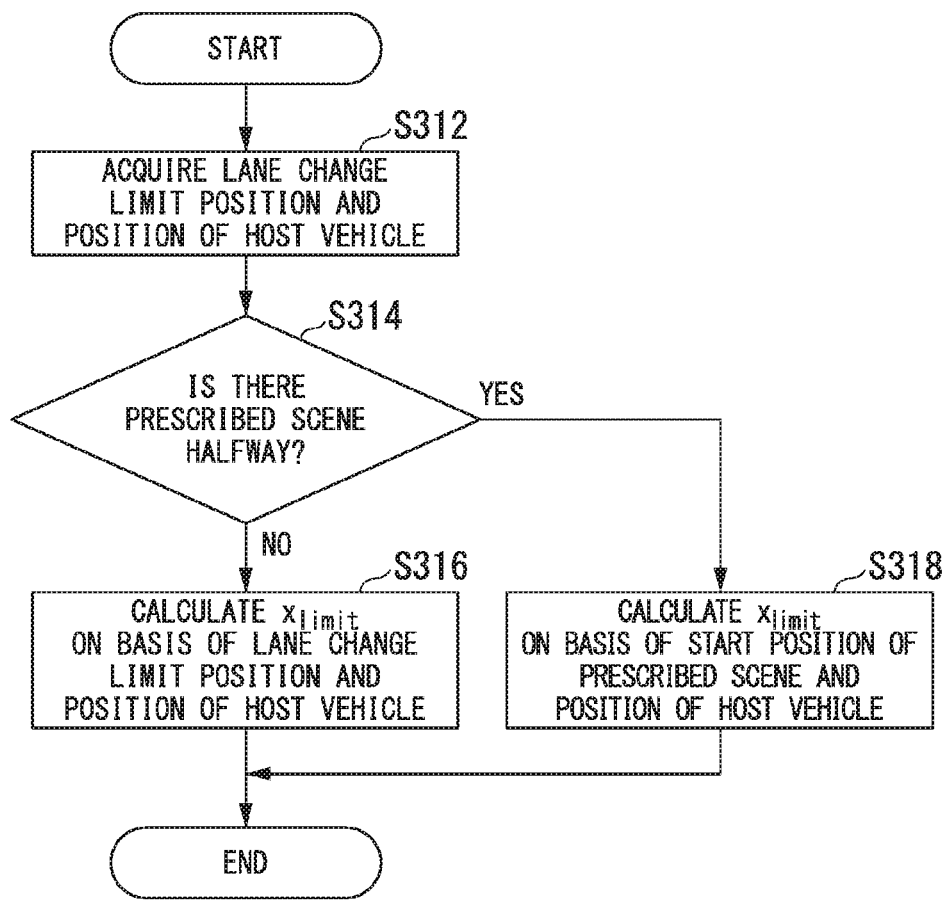
FIG. 22 is a flowchart showing an example of details of a process of a remaining distance calculater.

First, the remaining distance calculater 150A of the target position determiner 150 calculates the remaining event distance $x_{limit}$ (step S310). The remaining event distance $x_{limit}$ is a distance from a position of the host vehicle M to a point at which the host vehicle M is required to complete a lane change. The processing of the present step will be described using the flowchart of FIG. 22. FIG. 22 is a flowchart showing an example of details of the process of the remaining distance calculater 150A. The process of the present flowchart shows details of the processing of step S310 in the flowchart of FIG. 20.

Figure 23:
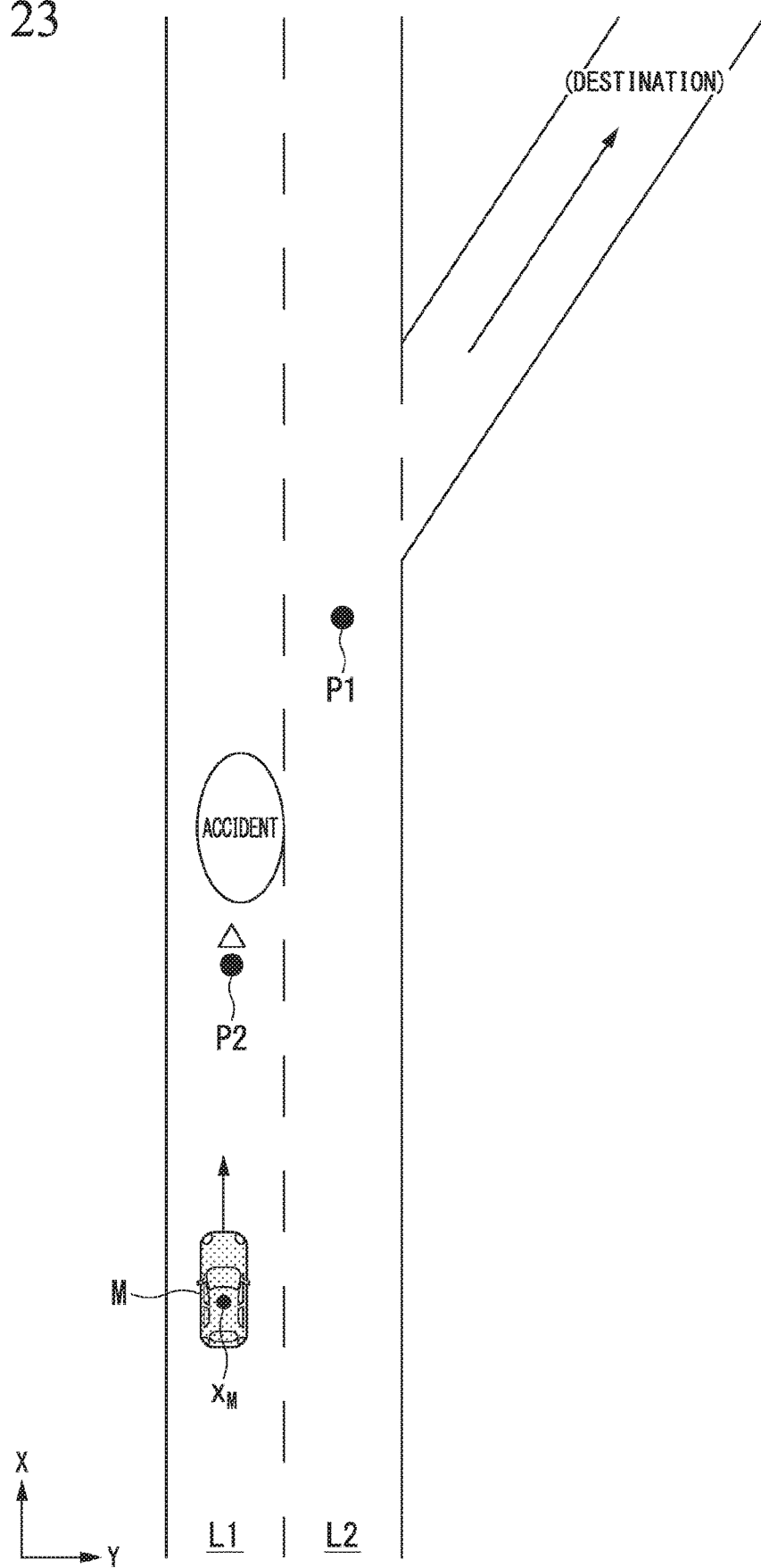
FIG. 23 is an explanatory diagram showing the process of the remaining distance calculater.

First, remaining distance calculater 150A acquires a lane change limit position and a position of the host vehicle M (step S312). FIG. 23 is an explanatory diagram showing the process of the remaining distance calculater 150A. In the illustrated example, the host vehicle M travels in the lane L1 and needs to make the lane change to the lane L2 in order to advance toward a destination before a branch road. In this case, the remaining event distance $x_{limit}$ becomes a distance between a lane change limit position P1 and a position $x_M$ of the host vehicle M. The lane change limit position P1 is a position at a prescribed distance before the branch point. When the host vehicle M does not advance toward the branch road and turns right or left at an intersection, the lane change limit position P1 is a position at a prescribed distance before the intersection. The remaining distance calculator 150A acquires such information from, for example, the MPU 60. In the illustrated example, an accident has occurred on the lane L1 before the lane change limit position P1. In this case, the remaining distance calculater 150A sets the remaining event distance $x_{limit}$ as a distance between a position P2 at a prescribed distance before the accident and a position $x_M$ of the host vehicle M.

Returning to FIG. 21, the remaining distance calculator 150A determines whether or not there is a prescribed scene on the way to the lane change limit position (step S314). In addition to the above-described accident, the prescribed scene may include a road sign indicating the prohibition of a lane change, a traffic jam, a water pool, road surface freezing, and the like. When there is no prescribed scene on the way to the lane change limit position, the remaining distance calculator 150A calculates the remaining event distance $x_{limit}$ on the basis of the lane change limit position P1 and the position $x_M$ of the host vehicle M (step S316).

On the other hand, when there is a prescribed scene on the way to the lane change limit position, the remaining distance calculator 150A calculates the remaining event distance $x_{limit}$ on the basis of a start position of the prescribed scene and the position $x_M$ of the host vehicle M (step S318). The start position of the prescribed scene is a position of a triangular stop display plate placed in front of the accident in the example of FIG. 23. In addition, the start position of the prescribed scene may be a foremost position of the road sign and a rear end of a vehicle at the end of a traffic jam, or the like. "Calculating the remaining event distance $x_{limit}$ on the basis of the start position of the predetermined scene and the position $x_M$ of the host vehicle M" means, for example, that a distance between a position at a predetermined distance before the start position of the prescribed scene and the position $x_M$ of the host vehicle M is set as the remaining event distance)(limit.

Returning to FIG. 21, the target position determiner 150 performs the processing of steps S330 to S372 for all target position candidates cTA[i] that have not been excluded in step S272 in the flowchart of FIG. 20.

First, the target position determiner 150 determines whether or not a position x[i] of the target position candidate cTA[i] is in front of a section $x_{sensor}$ in which the sensor accuracy is reliable (step S330). When the position of the target position candidate cTA[i] is not in front of the section $x_{sensor}$ in which the sensor accuracy is reliable, the target position determiner 150 excludes the target position candidate cTA[i] from the evaluation target (step S372).

When the position of the target position candidate cTA[i] is in front of the section $x_{sensor}$ in which the sensor accuracy is reliable, the target position determiner 150 determines whether or not the lane change time travel distance $x_{LC}$ is shorter than the remaining event distance $x_{limit}$ calculated in step S310 (step S332). When the lane change time traveling distance $x_{LC}$ is greater than or equal to the remaining event distance $x_{limit}$, the target position determiner 150 excludes the target position candidate cTA[i] from the evaluation target (step S372). Thereby, the target position determiner 150 enables a target position candidate cTA for which the lane change time traveling distance $x_{LC}$ is considered shorter, i.e., a distance from the host vehicle is considered shorter, when the remaining event distance $x_{limit}$ is shorter to be likely to be selected as a target position.

When the lane change time traveling distance $x_{LC}$ is shorter than the remaining event distance $x_{limit}$, the target position determiner 150 determines whether or not an absolute value of the acceleration g is smaller than an upper limit acceleration $g_{limit}$ (step S334). When the absolute value of the acceleration g is greater than or equal to the upper limit acceleration $g_{limit}$, the target position determiner 150 excludes the target position candidate cTA[i] from the evaluation target (step S372).

When the absolute value of the acceleration g is smaller than the upper limit acceleration $g_{limit}$, the target position determiner 150 determines whether or not the evaluated inter-vehicle distance $gap_{LC}$ is greater than the target inter-vehicle distance $gap_{limit}$ (step S336). When the evaluated inter-vehicle distance $gap_{LC}$ is less than or equal to the target inter-vehicle distance $gap_{limit}$, the target position determiner 150 excludes the target position candidate cTA[i] from the evaluation target (step S372).

When the success rate of the lane change recognized by the lane change success probability recognizer 136 is high, the target position determiner 150 may change the target inter-vehicle distance $gap_{limit}$ to a smaller value.

When a positive determination is obtained in all of steps S330 to S336, the target position determiner 150 calculates a comprehensive evaluation value f(i) (step S340). Details of the present processing will be described below. The target position determiner 150 determines whether or not the comprehensive evaluation value f(i) is a positive value (step S370). When the comprehensive evaluation value f(i) is less than or equal to zero, the target position determiner 150 excludes the target position candidate cTA[i] from the evaluation target (step S372). The target position candidate cTA[i] has a negative value in a case in which the evaluated inter-vehicle distance $gap_{LC}$ has a negative value. Because this case is excluded in step S336, the determination of step S370 has a meaning of reconfirmation.

The overall evaluation value f(i) will be described below. The target position determiner 150 calculates a comprehensive evaluation value f(i) obtained by evaluating an $i^{th}$ target position candidate cTA[i] on the basis of, for example, Eq. (34). The comprehensive evaluation value f(i) is an index value indicating that the smaller the value is, the better the target position TA is. In Eq. (34), ax, agap, and ag are coefficients. |g| is an absolute value of the acceleration g.

$$f(i)=ax \times x_{LC}[i]+agap \times (1/gap_{LC})+ag \times |g| \qquad (34)$$

Figure 24:
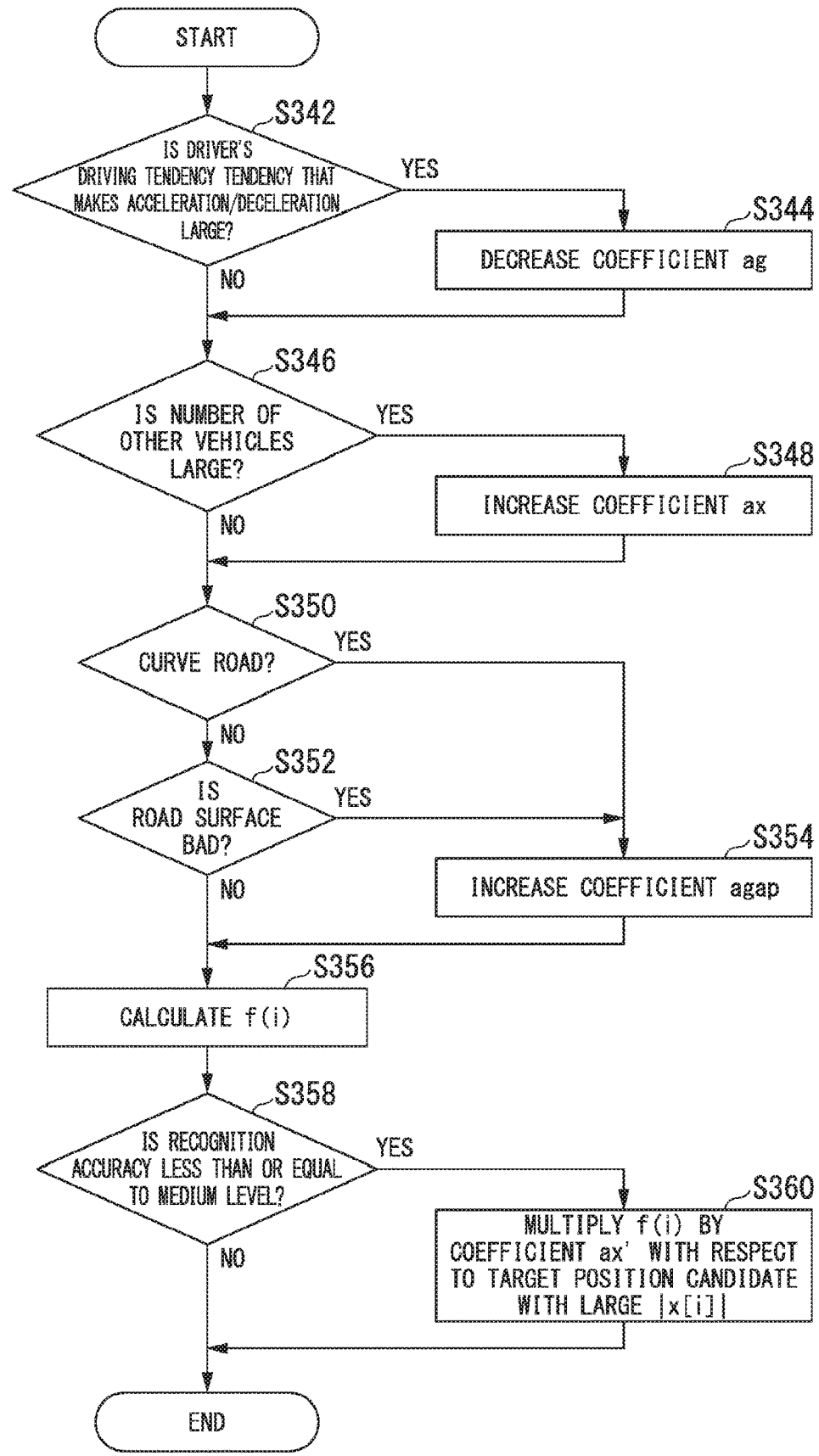
FIG. 24 is a diagram showing an example of a flow of a process of calculating a comprehensive evaluation value f(i) executed by the target position determiner.

Furthermore, the target position determiner 150 causes a calculation technique (calculation tendency) for the comprehensive evaluation value f(i) to be different on the basis of the driver's driving tendency, the number of other vehicles, the curvature of a curve, road surface information, recognition accuracy of the recognizer 130, and the like. FIG. 24 is a diagram showing an example of a flow of a process of calculating the comprehensive evaluation value f(i) executed by the target position determiner 150. The process of the present flowchart shows details of the processing of step S340 in the flowchart of FIG. 21.

First, the target position determiner 150 determines whether or not the driver's driving tendency learned by the driver tendency learner 150B is a tendency that makes acceleration/deceleration large (step S342).

Here, the driver tendency learner 150B will be described. The driver tendency learner 150B classifies the driver into a driver who tends to drive at high acceleration/deceleration or a driver who tends to drive at low acceleration/deceleration by acquiring a speed history or an acceleration/deceleration history of the host vehicle M when manual driving is performed, performing a statistical process, and comparing a result of the statistical process with a reference value. The driver tendency learner 150B may learn the driver's tendency for each individual by identifying the driver using an in-vehicle camera or the like or learn the driver's tendency in units of vehicles under an assumption that the number of drivers who drive the host vehicle M is one. When the driver's driving tendency is a tendency in which acceleration/deceleration is high, the target position determiner 150 reduces the coefficient ag (step S344) and reduces the penalty when the acceleration g is high. Thereby, it is possible to cause the host vehicle M to make the lane change with behavior close to that when the driver is manually driving the host vehicle M and it is possible to prevent the driver from feeling discomfort.

Next, the target position determiner 150 refers to a recognition result of the traveling vehicle number recognizer 135 and determines whether or not the number of other vehicles traveling in a predetermined range around the host vehicle M is larger than a reference number (step S346). If the number of other vehicles is larger than the reference number, the target position determiner 150 increases the coefficient ax (step S348). This is a process of easily making the lane change to a position relatively close to the host vehicle M in order to increase the success rate of the lane change because of the psychology of missing an opportunity unless the lane change is immediately made when the number of other vehicles is large (in congestion).

Next, the target position determiner 150 determines whether or not the host vehicle M is traveling on a curve road (step S350). The target position determiner 150 determines whether or not the state of the road surface on which the host vehicle M is traveling is bad (step S352). When the host vehicle M is traveling on the curve road or when the state of the road surface on which the host vehicle M is traveling is bad, the target position determiner 150 increases the coefficient agap (step S354). These processes are processes of reducing the acceleration g because it is not preferable to perform rapid acceleration and deceleration.

In addition to the above-described processing, the target position determiner 150 may increase the coefficient ax as the remaining event distance $x_{limit}$ decreases or may increase the coefficient ax when the remaining event distance $x_{limit}$ is less than or equal to a prescribed distance. Thereby, the target position determiner 150 enables a target position candidate cTA for which the lane change time traveling distance $x_{LC}$ is considered shorter, i.e., a distance from the host vehicle is considered shorter, when the remaining event distance $x_{limit}$ is shorter to be more likely to be selected as a target position.

Then, the target position determiner 150 calculates a comprehensive evaluation value f(i) on the basis of Eq. (34) (step S356).

Furthermore, the target position determiner 150 determines whether or not the recognition accuracy derived by the recognition accuracy deriver 134 is less than or equal to the "medium" level (step S358). When the recognition accuracy is less than or equal to the "medium" level, the target position determiner 150 multiplies the coefficient ax' with respect to the target position candidate cTA[i] with a large |x[i]| (i.e., far from the host vehicle M) (step S360).

The coefficient ax' is a value of 1 or more and is set to a larger value when |x[i]| is larger. Thereby, when the recognition accuracy is low, it is possible to select the target position candidate cTA as close as possible to the host vehicle M.

Returning to FIG. 21, the target position determiner 150 selects the target position candidate cTA[i] having a smallest comprehensive evaluation value f(i) among the target position candidates cTA[i] that have not been excluded in step S372 as the target position TA (step S380).

Thus, the target position determiner 150 changes an evaluation rule in accordance with an environment in which the host vehicle M is placed.

According to the process of the target position determiner 150 described above, when the target position cTA is evaluated on the basis of a plurality of evaluation values, it is possible to more efficiently implement the lane change with less discomfort by changing the evaluation rule in accordance with the environment in which the host vehicle is placed.

[Execution of Lane Change]

Hereinafter, various processes of the lane change executor 152 will be described. The lane change executor 152 performs control while fixing the target position TA until the holding cancellation determiner 152A cancels the holding of the target position TA. The cancellation of the holding will be described below.

The speed determiner 152B determines the speed during the lane change and performs speed adjustment. The steering angle determiner 152C determines a steering angle of the host vehicle M so that the speed in the lateral direction during the lane change becomes constant in accordance with the speed determined by the speed determiner 152B.

Speed Adjustment (First Example)

Figure 25:
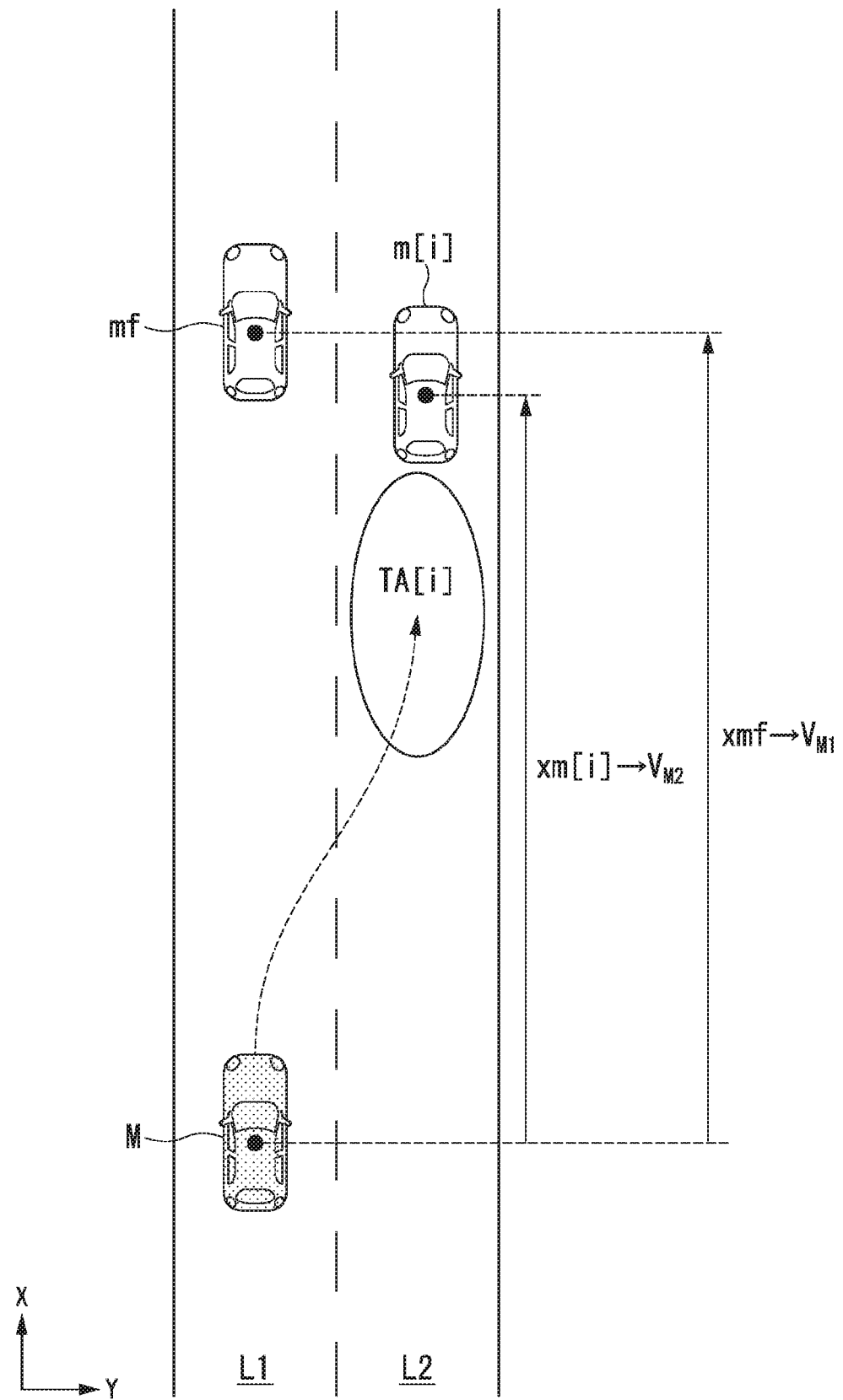
FIG. 25 is a diagram showing a relationship between a first target speed and a second target speed.

For example, when the lane change from a first lane (hereinafter referred to as a host vehicle lane) to a second lane (hereinafter referred to as a lane change destination lane) is made, the speed determiner 152B determines the speed $V_M$ of the host vehicle M by reflecting a first target speed $V_{M1}$ based on a relationship between a first vehicle (hereinafter a preceding vehicle mf) that travels in front of the host vehicle M in the host vehicle lane and the host vehicle M and a second target speed $V_{M2}$ based on a relationship between a second vehicle (another vehicle m[i]) that travels in front of the target position TA in the lane change destination lane and the host vehicle M in a prescribed ratio (for example, by obtaining a weighted sum). This relationship is represented by Eq. (35). FIG. 25 is a diagram showing the relationship between the first target speed $V_{M1}$ and the second target speed $V_{M2}$.

$$V_M = (1-\text{ratio}) \times V_{M1} + \text{ratio} \times V_{M2} \quad (35)$$

The speed determiner 152B calculates the first target speed $V_{M1}$ on the basis of Eq. (36). The speed determiner 152B calculates the second target speed $V_{M2}$ on the basis of Eq. (37). In Eqs. (36) and (37), Vset is a preset upper limit speed. $V_{FB}$ (xmf→xset1) is a speed obtained by feedback control for making a magnitude of a relative position xmf of the preceding vehicle mf relative to that of the host vehicle M in the longitudinal direction closer to a first target inter-vehicle distance xset1. $V_{FB}$ (xm[i]→xset2) is a speed obtained by feedback control for making a magnitude of a relative position xm[i] of the other vehicle m[i] relative to that of the host vehicle M in the longitudinal direction close to a second target inter-vehicle distance xset2. The first target inter-vehicle distance xset1 and the second target inter-vehicle distance xset2 may be the same value or the second target inter-vehicle distance xset2 may be smaller than the first target inter-vehicle distance xset1. Although the speed obtained by the feedback control may be increased inappropriately when the preceding vehicle mf or the other vehicle m[i] is sufficiently far from the host vehicle M (when the preceding vehicle mf or the other vehicle m[i] does not exist within the appropriate range), it is possible to maintain the speed within an appropriate range by forming a guard using the upper limit speed Vset.

$$V_{M1} = \text{MAX}\{V\text{set}, V_{FB}(xmf \rightarrow xset1)\} \quad (36)$$

$$V_{M2} = \text{MAX}\{V\text{set}, V_{FB}(xm[i] \rightarrow xset2)\} \quad (37)$$

When the lane change mode is the acceleration mode, the speed determiner 152B further determines the target speed on the basis of the speed of the other vehicle m[i+1] that travels behind the target position TA.

When the lane change mode is the constant-speed overtaking mode or the constant-speed reverse mode, the speed determiner 152B maintains the speed at the constant speed without changing the speed of the host vehicle M on the basis of the relationship with the other vehicle m.

Then, the speed determiner 152B dynamically changes the ratio, for example, between zero and 1 in accordance with the progress of the lane change. The progress of the lane change includes progress in the longitudinal direction and progress in the lateral direction as will be described below. Hereinafter, a case in which alignment in the longitudinal direction is unnecessary to advance toward the target position TA and a case in which the alignment in the longitudinal direction is necessary will be separately described.

(When Alignment in Longitudinal Direction is Unnecessary)

Figure 26:
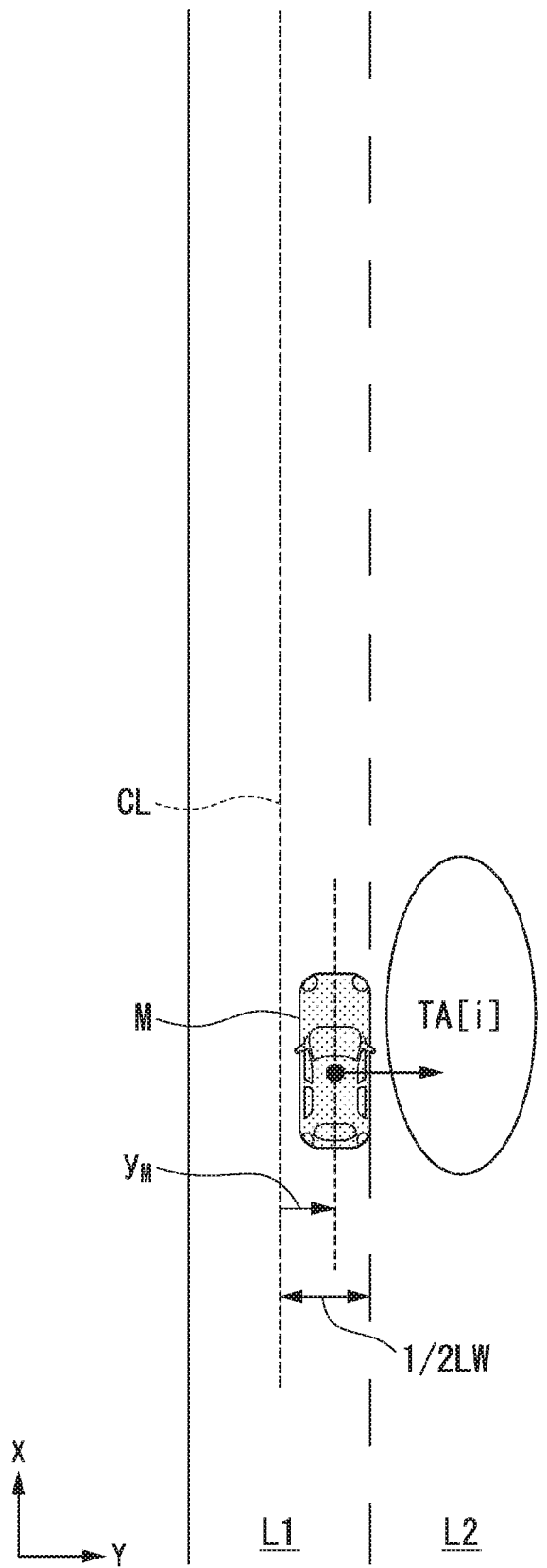
FIG. 26 is an explanatory diagram showing a technique of determining a progress rate in a lateral direction.

A case in which the alignment in the longitudinal direction is unnecessary (a first case) is a case in which the target position TA is on the side of the host vehicle M and it is possible to change the lane when the host vehicle M makes a turn as it is. For example, this case corresponds to a case in which a target position candidate cTA[2] in FIG. 4 is selected as the target position TA. In this case, the speed determiner 152B determines the ratio on the basis of a progress rate PRy of the lane change in the lateral direction. FIG. 26 is an explanatory diagram showing a technique of determining the progress rate PRy in the lateral direction. The speed determiner 152B calculates a value in which a denominator is a distance from a center line CL of the host vehicle lane to a road dividing line on a lane change side, i.e., half (½LW) of a lane width LW, and a numerator is a distance from the center line CL of the host vehicle lane to a representative point of the host vehicle M as the progress rate PRy. This relationship is represented, for example, by Eq. (38).

$$PRy = \text{MIN}[\text{MAX}\{(2 \times y_M/LW), 0\}, 1] \quad (38)$$

Figure 27:
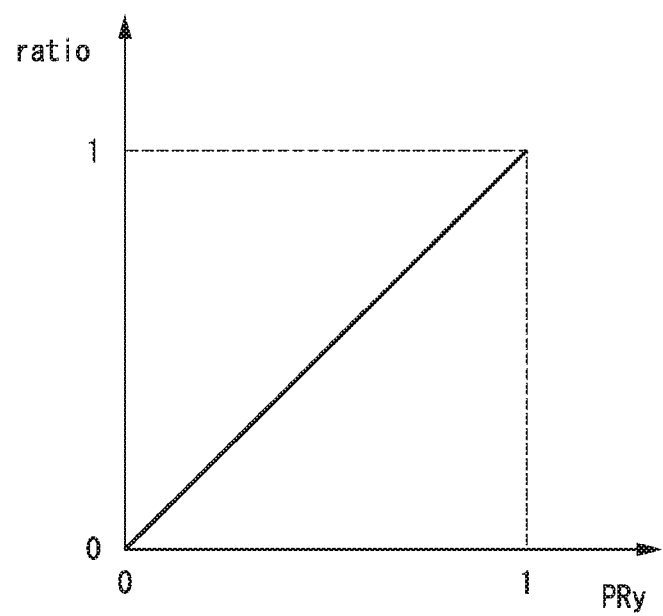
FIG. 27 is a diagram showing a first example of the transition of a ratio when alignment in the longitudinal direction is unnecessary.

The speed determiner 152B sets the ratio=the progress rate PRy in the lateral direction, sets the proportion of the first target speed $V_{M1}$ to 1 and sets the proportion of the second target speed $V_{M2}$ to zero, for example, when the lane change starts, and makes the proportion of the first target speed $V_{M1}$ close to zero and makes the proportion of the second target speed $V_{M2}$ close to 1 when the ratio approaches 1. FIG. 27 is a diagram showing a first example of the transition of the ratio when alignment in the longitudinal direction is unnecessary.

(When Alignment in Longitudinal Direction is Necessary)

A case in which alignment in the longitudinal direction is necessary (a second case) is a case in which the target position TA is not on the side of the host vehicle M and it is necessary to adjust a relative position of the lane change destination relative to the other vehicle m. For example, this corresponds to a case in which a target position candidate cTA other than the target position candidate cTA[2] in FIG. 4 is selected as the target position TA. In this case, the speed determiner 152B first determines the ratio on the basis of the progress rate PRx in the longitudinal direction and determines the ratio by adding the progress rate PRx of the lane change in the lateral direction after the progress rate PRx in the longitudinal direction becomes 1. A technique of determining the progress rate PRx in the longitudinal direction is different between the case in which the reference vehicle is in front of the host vehicle M and the case in which the reference vehicle is behind the host vehicle M.

Figure 28:
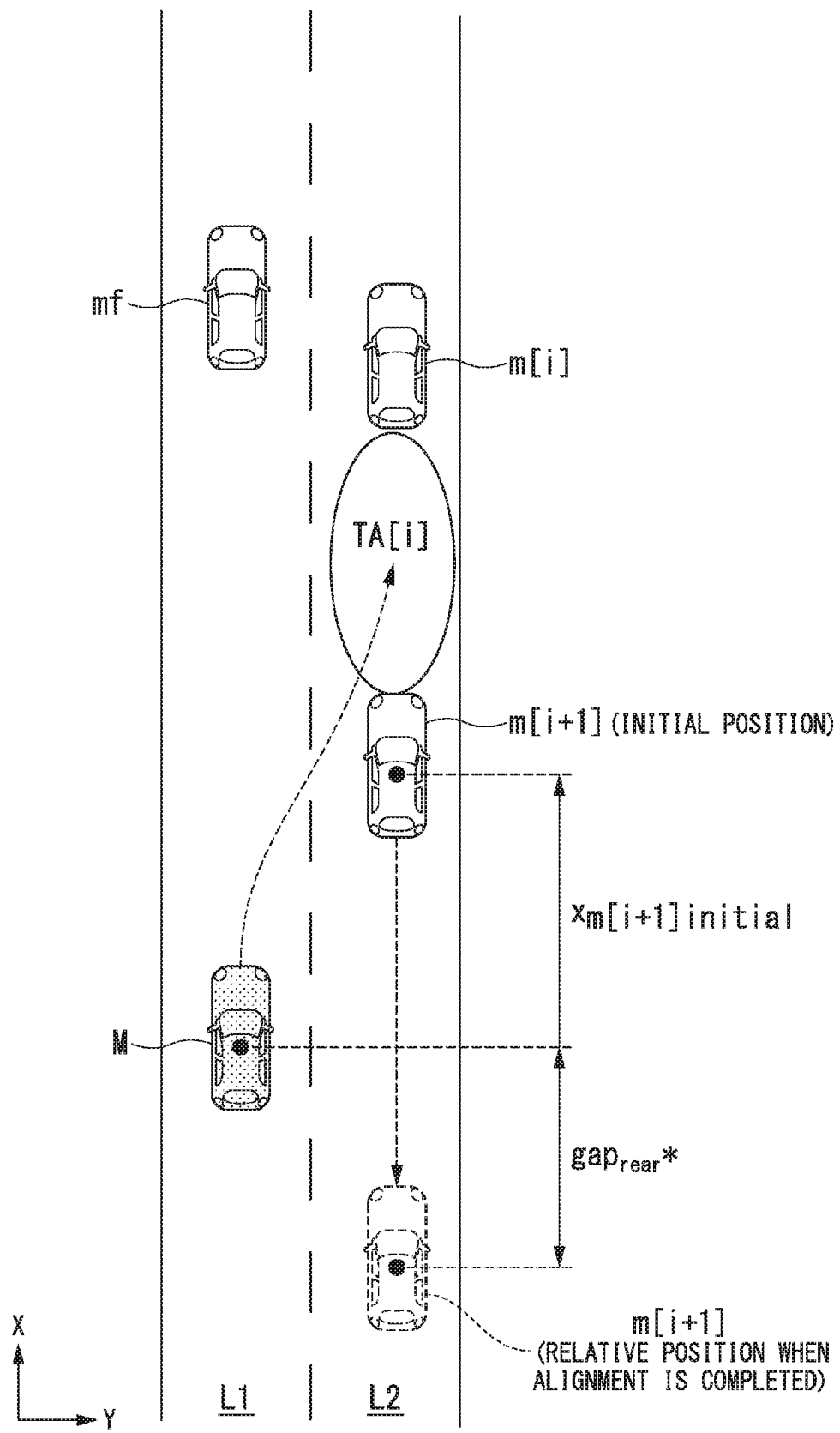
FIG. 28 is an explanatory diagram showing a technique of determining a progress rate in the longitudinal direction when the target position is in front of the host vehicle.

FIG. 28 is an explanatory diagram showing a technique of determining the progress rate PRx in the longitudinal direction when the reference vehicle is behind the target position. In this case, because the alignment in the longitudinal direction is completed if the relative position xm[i+1] of the reference vehicle m[i+1] relative to the host vehicle M becomes $-\text{gap}_{rear}^*$, the speed determiner 152B calculates the progress rate PRx on the basis of Eq. (39). In Eq. (39), $xm_{[i+1]initial}$ is an initial position of the reference vehicle m[i+1] (a position at the start of the lane change).

[Math. 8]

$$PRx = \text{MAX}\left\{\frac{x_{m[i+1]initial} - x_{m[i+1]}}{x_{m[i+1]initial} + gap_{rear}^*}, 0\right\} \quad (39)$$

Figure 29:
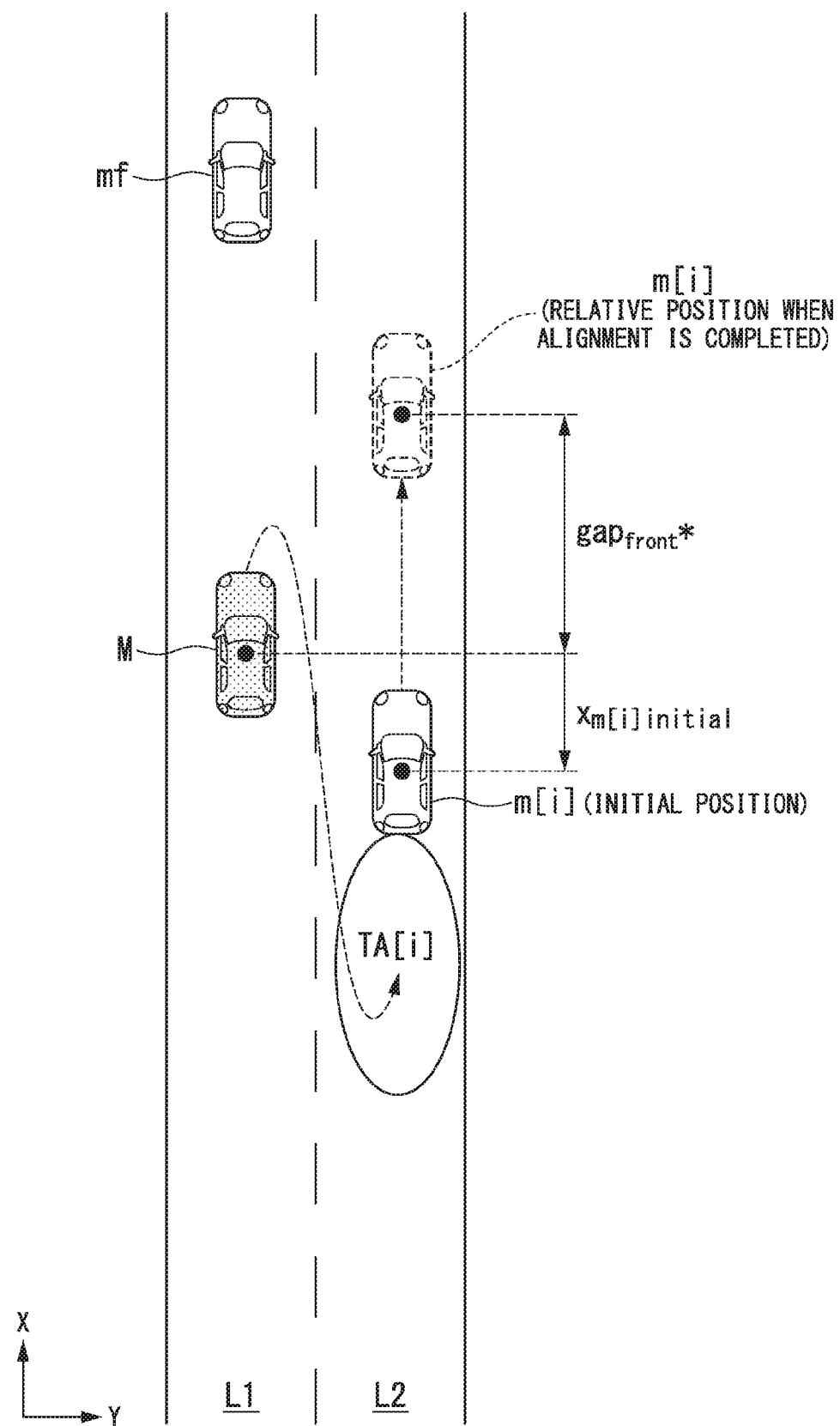
FIG. 29 is an explanatory diagram showing a technique of determining a progress rate in the longitudinal direction when the target position is behind the host vehicle.

FIG. 29 is an explanatory diagram showing a technique of determining the progress rate PRx in the longitudinal direction when the reference vehicle is in front of the target position (including the case of the pre-deceleration mode). In this case, because the alignment in the longitudinal direction is completed if the relative position xm[i] of the reference vehicle m[i] relative to the host vehicle M becomes $+\text{gap}_{front}^*$, the speed determiner 152B calculates the progress rate PRx on the basis of Eq. (40). In Eq. (40), $x_{m[i]initial}$ is an initial position of the reference vehicle m[i].

[Math. 9]

$$PRx = \text{MAX}\left\{\frac{x_{m[i]} - x_{m[i]initial}}{gap_{front}^* - x_{m[i]initial}}, 0\right\} \quad (40)$$

Figure 30:
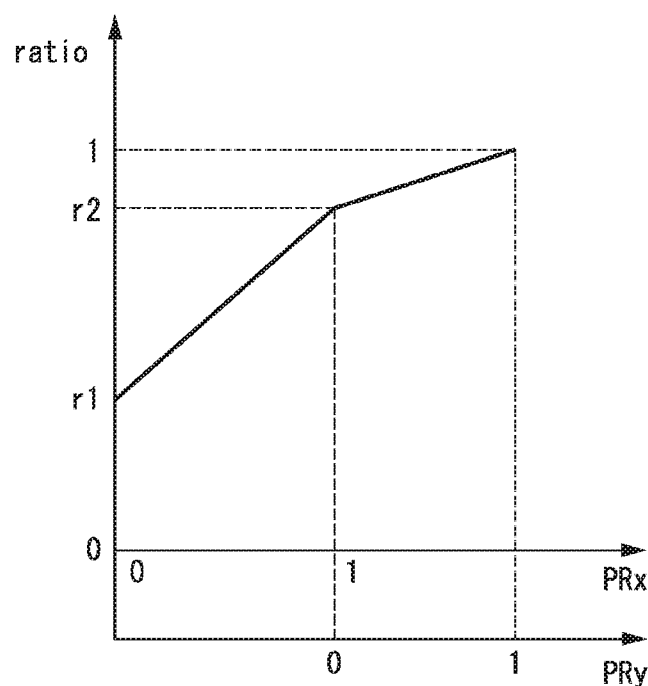
FIG. 30 is a diagram showing a first example of the transition of a ratio when alignment in the longitudinal direction is necessary.

The speed determiner 152B sets a positive value r1 as the initial value of the ratio and therefore starts alignment in the longitudinal direction so that the relative position is aligned toward the front of the other vehicle m[i+1] or the rear of the other vehicle m[i] immediately after the start of the lane change. The speed determiner 152B sets a gradient GR1 relative to the progress rate PRx of the ratio during a period (a first period) until alignment in the longitudinal direction is completed so that it is greater than a gradient GR2 relative to the progress rate PRy of the ratio during a period (a second period) after alignment in the longitudinal direction is completed. FIG. 30 is a diagram showing a first example of the transition of the ratio when alignment in the longitudinal direction is necessary. The speed determiner 152B determines the ratio on the basis of, for example, Eq. (41). The gradients GR1 and GR2 are determined on the basis of Eqs. (42) and (43). r1 and r2 are values set in advance arbitrarily.

$$\text{ratio}=(GR1 \times PRx + r1) + (GR2 \times PRy) \quad (41)$$

$$GR1 = r2 - r1 \quad (42)$$

$$GR2 = 1 - r2 \quad (43)$$

According to the process of the speed determiner 152B described above, it is possible to implement a natural lane change with less discomfort.

Speed Adjustment (Second Example and Third Example)

Figure 31:
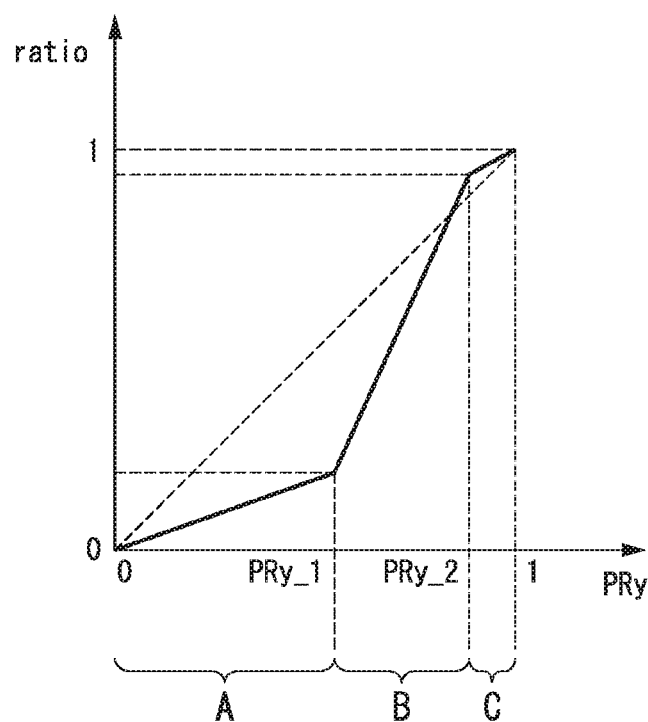
FIG. 31 is a diagram showing a second example of the transition of a ratio when alignment in the longitudinal direction is unnecessary.
Figure 32:
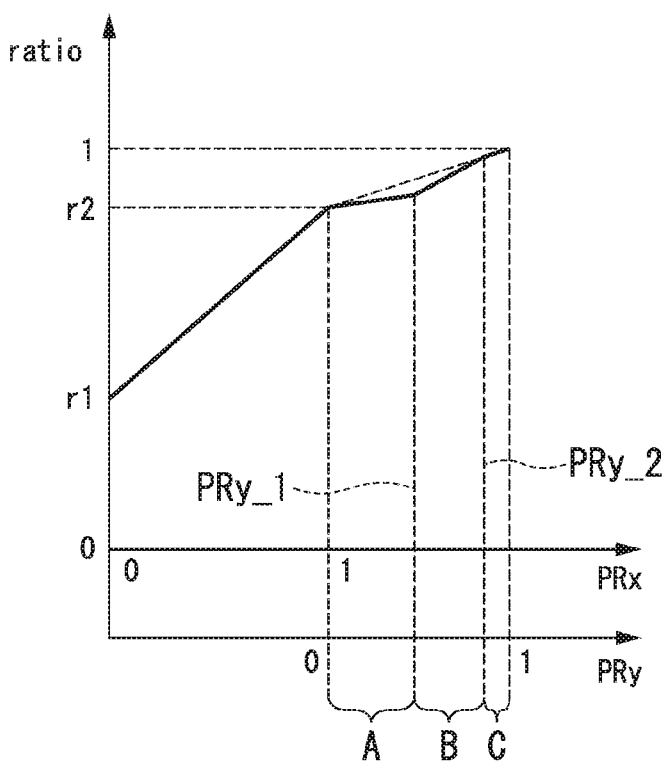
FIG. 32 is a diagram showing a second example of the transition of a ratio when alignment in the longitudinal direction is necessary.

When the ratio is determined, the speed determiner 152B may adjust a degree of increase of the ratio relative to the progress rate PRy in the lateral direction in a technique different from the above. FIG. 31 is a diagram showing a second example of the transition of the ratio when alignment in the longitudinal direction is unnecessary. FIG. 32 is a diagram showing a second example of the transition of the ratio when alignment in the longitudinal direction is necessary. As illustrated, when the ratio is increased in accordance with the progress rate PRy in the lateral direction, the speed determiner 152B sets an increase rate of the ratio in a section A from 0 to a first change point PRy_1 in the progress rate PRy in the lateral direction so that it is less than an increase rate of the ratio in a section B from the first change point PRy_1 to a second change point PRy_2 in the progress rate PRy in the lateral direction. When the ratio is increased in accordance with the progress rate PRy in the lateral direction, the speed determiner 152B sets the increase rate of the ratio in the section B so that it is greater than an increase rate of the ratio in a section C from the second change point PRy_2 to 1 in the progress rate PRy of the lateral direction. The first change point PRy_1 in the case of FIG. 31 and the first change point PRy_1 in the case of FIG. 32 may have the same value or different values. The second change point PRy_2 in the case of FIG. 31 and the second change point PRy_2 in the case of FIG. 32 may have the same value or different values.

Thereby, immediately after the host vehicle M starts movement in the lateral direction, the host vehicle M moves in the lateral direction while suppressing an influence of other vehicles in the lane of the lane change destination and moves in the lateral direction while gradually increasing an influence of other vehicles in the lane of the lane change destination when the progress rate PRy exceeds the first change point PRy_1. In other words, when an excess of time has not elapsed from the start of the movement in the lateral direction within the lane change, priority is given to the movement in the lateral direction even if a space of the lane change destination is slightly narrow and behavior of the host vehicle M is controlled so that an inter-vehicle distance is appropriate in the step in which the movement to the lane change destination has progressed to a certain extent. As a result, it is possible to increase the success rate of the lane change.

Figure 33:
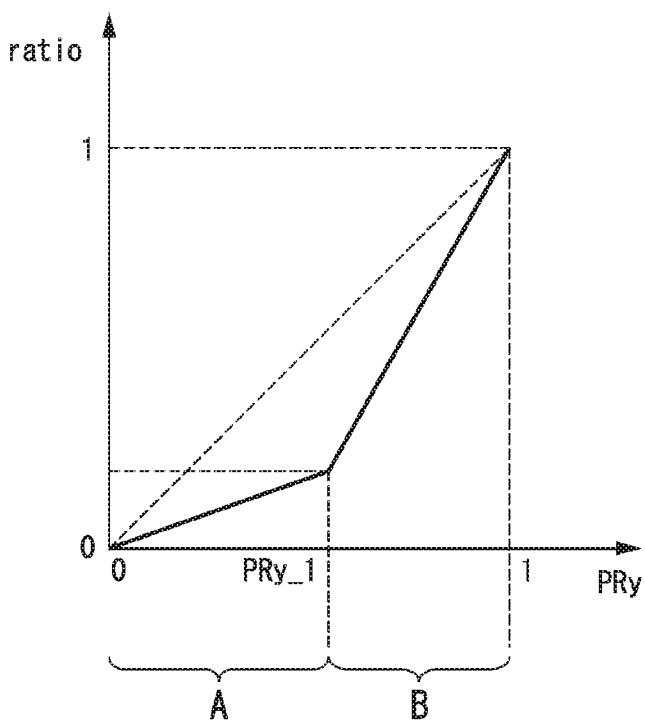
FIG. 33 is a diagram showing a third example of the transition of a ratio when alignment in the longitudinal direction is unnecessary.
Figure 34:
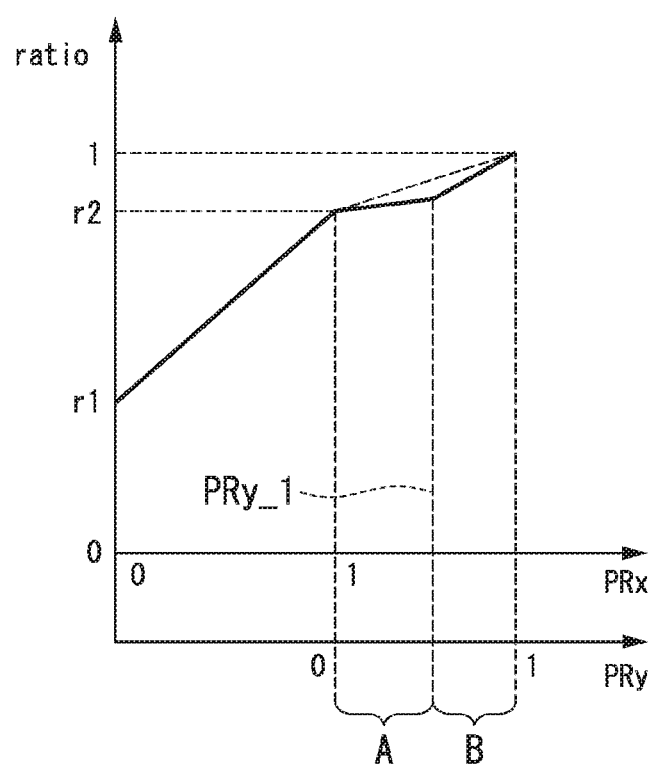
FIG. 34 is a diagram showing a third example of the transition of a ratio when alignment in the longitudinal direction is necessary.

A similar effect can also be implemented in a third example to be described below. FIG. 33 is a diagram showing the third example of the transition of the ratio when alignment in the longitudinal direction is unnecessary. FIG. 34 is a diagram showing a third example of the transition of the ratio when alignment in the longitudinal direction is necessary. As illustrated, when the ratio is increased in accordance with the progress rate PRy in the lateral direction, the speed determiner 152B sets an increase rate of the ratio in a section A from 0 to a first change point PRy_1 in the progress rate PRy in the lateral direction so that it is less than an increase rate of the ratio in a section B from the first change point PRy_1 to a second change point PRy_2 in the progress rate PRy in the lateral direction.

According to the process of the speed determiner 152B described above, it is possible to implement a natural lane change with less discomfort.

[Holding of Target Position]

A process of the holding cancellation determiner 152A will be described below. The holding cancellation determiner 152A holds a determined target position TA at a timing when the target position TA is determined by the target position determiner 150 and instructs the speed determiner 152B and the steering angle determiner 152C to perform control for the target position TA during the holding until a prescribed condition is satisfied. "Holding the target position TA" means holding or maintaining the target position TA. "Holding the target position TA" may mean holding at least one of the vehicles in front of and behind the target position TA.

Figure 35:
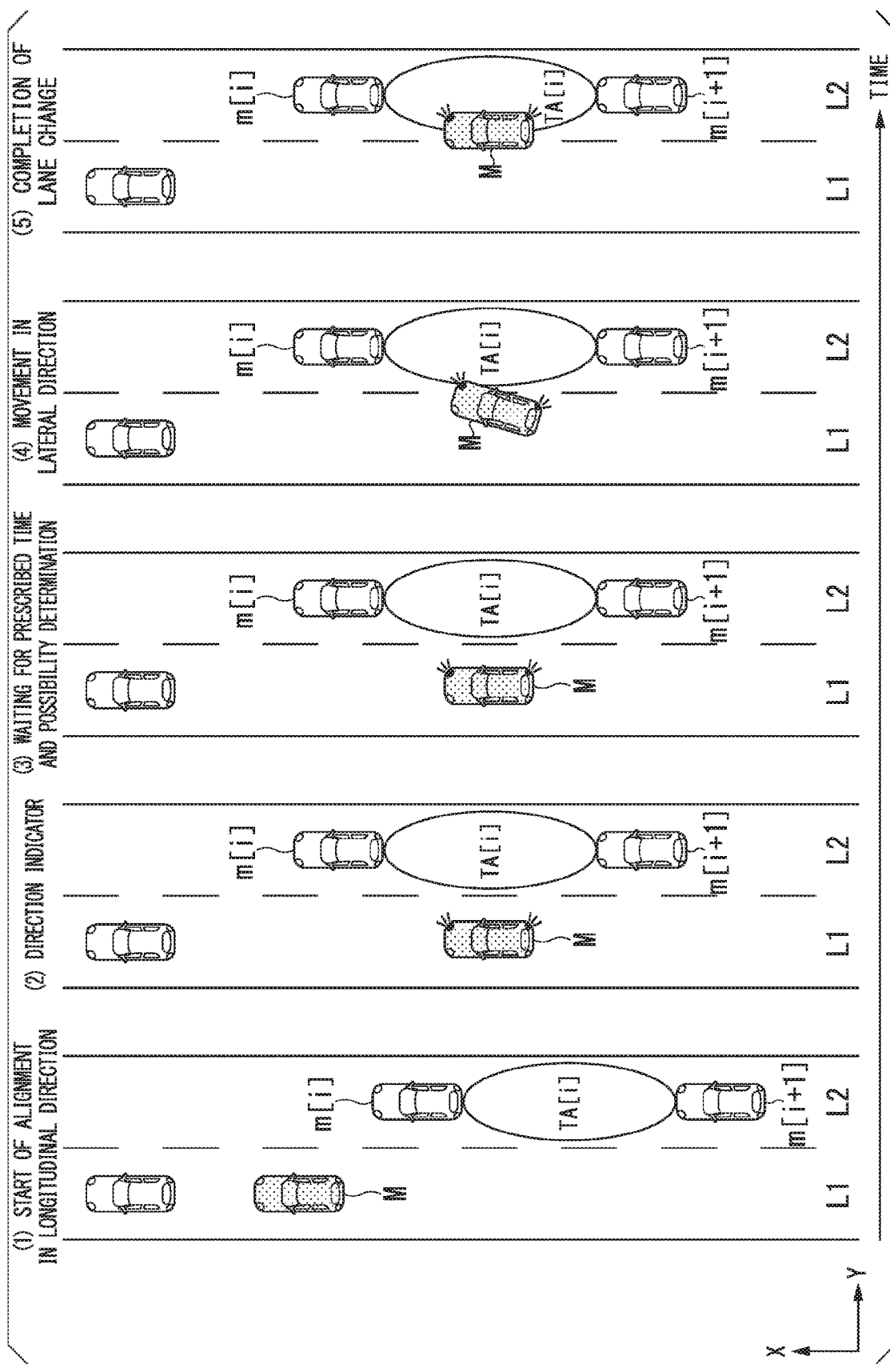
FIG. 35 is a diagram illustrating the progress of the lane change in accordance with the elapse of time.

FIG. 35 is a diagram illustrating the progress of the lane change in accordance with the elapse of time. First, (1) the lane change executor 152 starts alignment in the longitudinal direction. (2) The lane change executor 152 operates a direction indicator when the longitudinal alignment is completed. Next, (3) the lane change executor 152 waits for a prescribed time (for example, 1 [sec]) and determines whether or not it is possible to enter a side region. In this step, the lane change executor 152 checks time-to-collision (TTC) in the longitudinal direction relative to vehicles (hereinafter, another vehicle m[i] and another vehicle m[i+1] are referred to as a front reference vehicle m[i] and a rear reference vehicle m[i+1], respectively) in front of and behind the target position TA, whether the space is 2 $\text{gap}_{limit}$ or more, or the like and determines whether entry is possible. The lane change executor 152 causes an operation of a timer for counting prescribed time to be described below to be started. (4) The lane change executor 152 causes the host vehicle M to move in the lateral direction when it is determined that the entry is possible. Then, (5) the lane change is completed. The holding of the target position is performed between (1) and (5). Also, when the alignment in the longitudinal direction is unnecessary, the target position is held between (2) and (5) because the scene starts from (2).

While holding is being performed, the holding cancellation determiner 152A determines whether or not the pattern corresponds to various types of cancellation patterns (a prescribed condition is satisfied) and performs holding cancellation or the like when the pattern corresponds to any one of the cancellation patterns.

Figure 36:
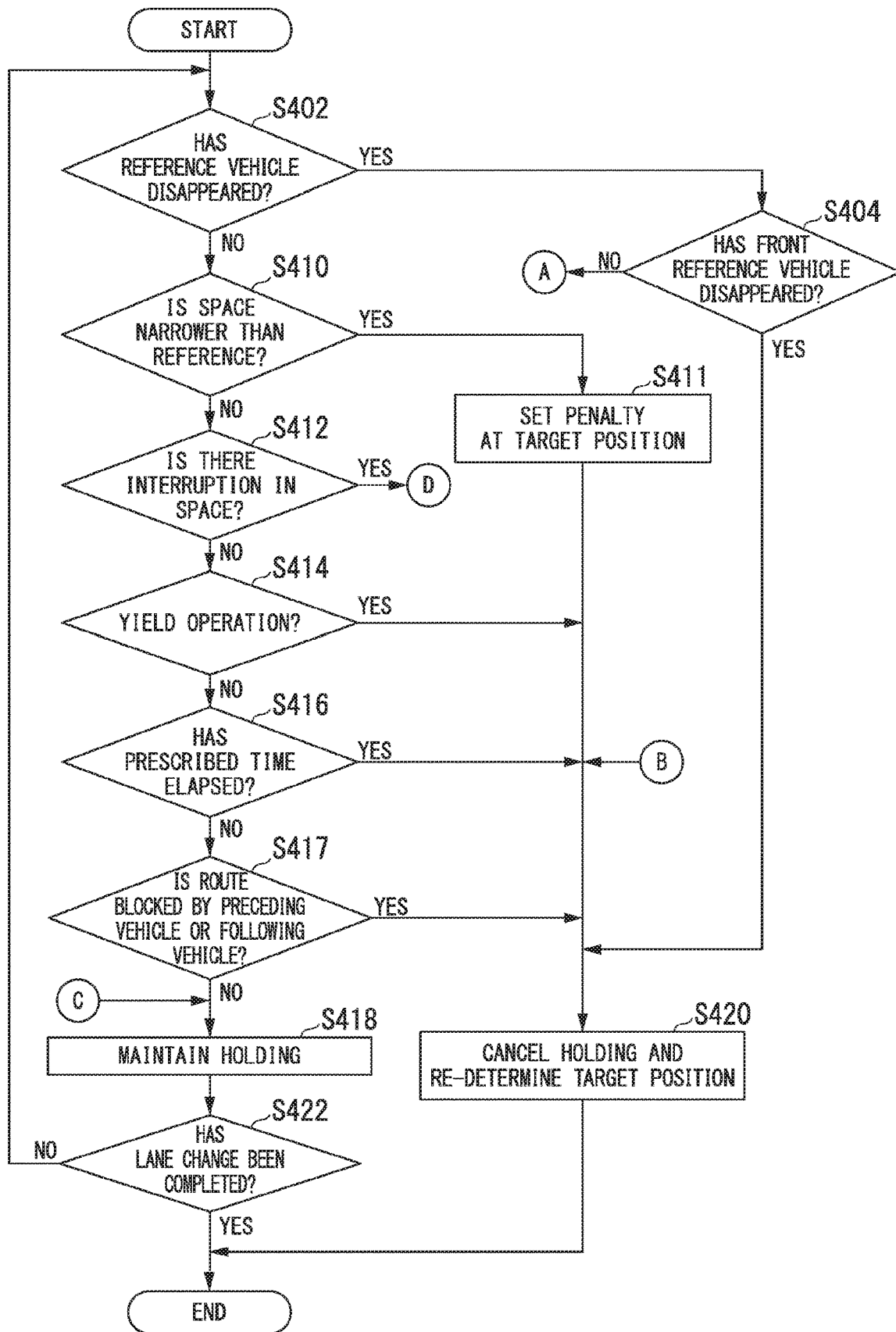
FIG. 36 is a part of a flowchart showing an example of a flow of a process performed by a holding cancellation determiner.
Figure 37:
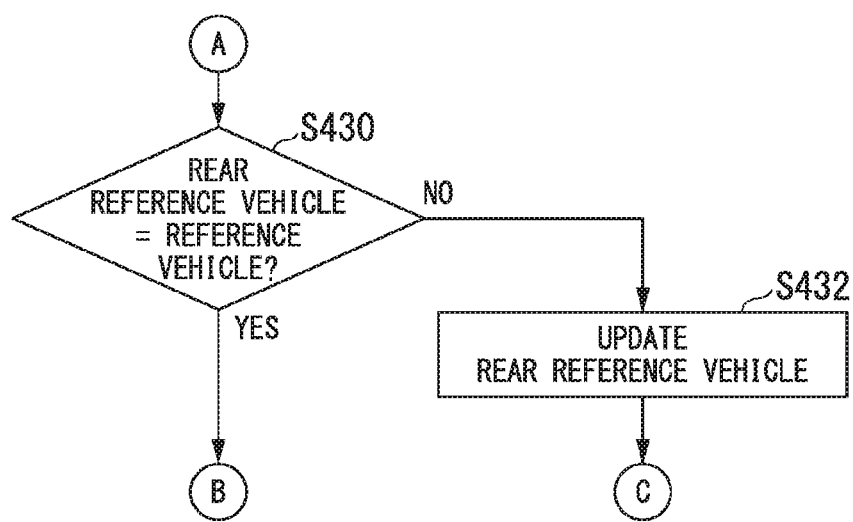
FIG. 37 is a part of the flowchart showing the example of the flow of the process performed by the holding cancellation determiner.
Figure 38:
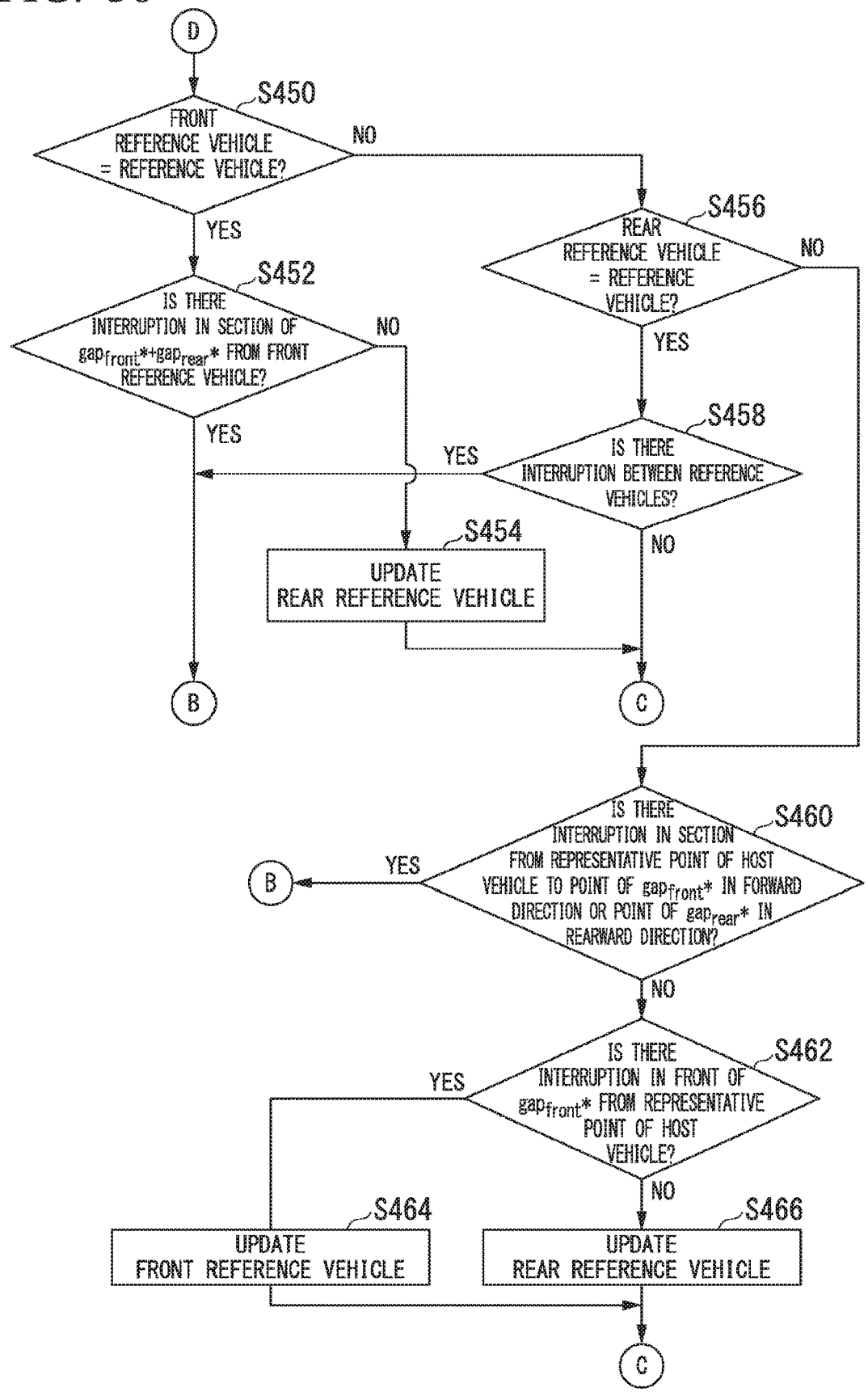
FIG. 38 is a part of the flowchart showing the example of the flow of the process performed by the holding cancellation determiner.

FIGS. 36 to 38 are parts of a flowchart showing an example of the flow of a process executed by the holding cancellation determiner 152A. The processes of these flowcharts show parts of details of the processing of step S400 in the flowchart of FIG. 3. Procedures of the processes will first be described and specific scenes will be described after the flowchart.

First, the holding cancellation determiner 152A determines whether or not a reference vehicle has disappeared (step S402). The reference vehicle is the front reference vehicle m[i] or the rear reference vehicle m[i+1]. The term "disappeared" indicates that the reference vehicle is absent on the lane of the lane change destination of the host vehicle M due to the lane change of another vehicle, that the reference vehicle has been lost from a range in which detection is possible in the sensor, or the like.

When the reference vehicle has disappeared, the holding cancellation determiner 152A determines whether or not the front reference vehicle m[i] has disappeared (step S404). When the front reference vehicle m[i] has disappeared, the holding cancellation determiner 152A cancels the holding and instructs the target position candidate setter 146, the target position candidate evaluater 148, and the target position determiner 150 to re-determine the target position TA (step S420).

When the front reference vehicle m[i] has not disappeared but the rear reference vehicle m[i+1] has disappeared, the process proceeds to FIG. 37 and the holding cancellation determiner 152A determines whether or not the rear reference vehicle m[i+1] is a reference vehicle (step S430). When the rear reference vehicle m[i+1] is the reference vehicle, the holding cancellation determiner 152A cancels the holding and instructs the target position candidate setter 146, the target position candidate evaluater 148, and the target position determiner 150 to re-determine the target position TA (step S420). When the rear reference vehicle m[i+1] is not the reference vehicle, the holding cancellation determiner 152A treats another rear vehicle m[i+2] as the rear reference vehicle m[i+1] in place of the disappeared rear reference vehicle m[i+1] (updates the rear reference vehicle) (step S432) and maintains the holding (step S418).

When a negative determination is obtained in step S402, the holding cancellation determiner 152A determines whether or not a space of the target position TA is narrower than a reference (2 $\text{gap}_{limit}$) according to the behavior of the front reference vehicle m[i] and/or the rear reference vehicle m[i+1] (step S410). When the space of the target position TA is narrower than the reference, the holding cancellation determiner 152A sets a penalty at the target position TA (step S411) and moves the process to step S420. The penalty is referred to when the target position TA is re-determined and the target position TA at which the penalty is set is unlikely to be selected.

When a negative determination is obtained in step S410, the holding cancellation determiner 152A determines whether or not there is an interruption in the space of the target position TA (step S412). A process when there is an interruption in the space of the target position TA will be described with reference to FIG. 38.

Proceeding to FIG. 38, the holding cancellation determiner 152A determines whether or not the front reference vehicle m[i] is the reference vehicle (step S450). When it is determined that the front reference vehicle m[i] is the reference vehicle, the holding cancellation determiner 152A determines whether or not there is an interruption in a section of $\text{gap}_{front}^*+\text{gap}_{rear}^*$ in a rearward direction from a representative point of the front reference vehicle m[i] (step S452). When it is determined that there is an interruption in the section of $\text{gap}_{front}^*+\text{gap}_{rear}^*$ in the rearward direction from the representative point of the front reference vehicle m[i], the holding cancellation determiner 152A cancels the holding and instructs the target position candidate setter 146, the target position candidate evaluater 148, and the target position determiner 150 to re-determine the target position TA (step S420).

When it is determined that there is an interruption outside the section of $\text{gap}_{front}^*+\text{gap}_{rear}^*$ in the rearward direction from the representative point of the front reference vehicle m[i] in step S452, the holding cancellation determiner 152A updates the rear reference vehicle m[i+1] by determining the interrupting vehicle as the rear reference vehicle m[i+1] (step S454) and maintains the holding (step S418).

When it is determined that the front reference vehicle m[i] is not the reference vehicle in step S450, the holding cancellation determiner 152A determines whether or not the rear reference vehicle m[i] is the reference vehicle (step S456). When it is determined that the rear reference vehicle m[i] is the reference vehicle, the holding cancellation determiner 152A determines whether or not there is an interruption between the front reference vehicle m[i] and the rear reference vehicle m[i+1] (step S458). When it is determined that there is an interruption between the front reference vehicle m[i] and the rear reference vehicle m[i+1], the holding cancellation determiner 152A cancels the holding and instructs the target position candidate setter 146, the target position candidate evaluater 148, and the target position determiner 150 to re-determine the target position TA (step S420). When it is determined that there is no interruption between the front reference vehicle m[i] and the rear reference vehicle m[i+1], the holding cancellation determiner 152A maintains the holding (step S418).

When it is determined that the rear reference vehicle m[i] is not the reference vehicle (when neither the front reference vehicle m[i] nor the rear reference vehicle m[i+1] is the reference vehicle, i.e., the lane change mode is the just-beside mode or the lateral deceleration mode) in step S456, the holding cancellation determiner 152A determines whether or not there is an interruption in a section from the representative point of the host vehicle M to a point of $\text{gap}_{front}^*$ in the forward direction or a point of $\text{gap}_{rear}^*$ in the rearward direction (step S460). When it is determined that there is an interruption in the section from the representative point of the host vehicle M to the point of $\text{gap}_{front}^*$ in the forward direction or the point of $\text{gap}_{rear}^*$ in the rearward direction, the holding cancellation determiner 152A cancels the holding and instructs the target position candidate setter 146, the target position candidate evaluater 148, and the target position determiner 150 to re-determine the target position TA (step S420).

When it is determined that there is an interruption outside the section from the representative point of the host vehicle M to the point of $\text{gap}_{front}^*$ in the forward direction or the point of $\text{gap}_{rear}^*$ in the rearward direction, the holding cancellation determiner 152A determines whether or not there is an interruption in front of $\text{gap}_{front}^*$ from the representative point of the host vehicle M (step S462). When it is determined that there is an interruption in front of $\text{gap}_{front}^*$ from the representative point of the host vehicle M, the holding cancellation determiner 152A updates the front reference vehicle m[i] and maintains the holding (step S418). When it is determined that there is no interruption in front of $\text{gap}_{front}^*$ from the representative point of the host vehicle M (when it is determined that there is an interruption behind $\text{gap}_{rear}^*$ from the representative point of the host vehicle M), the holding cancellation determiner 152A updates the rear reference vehicle m[i+1] and maintains the holding (step S418).

Figure 39:
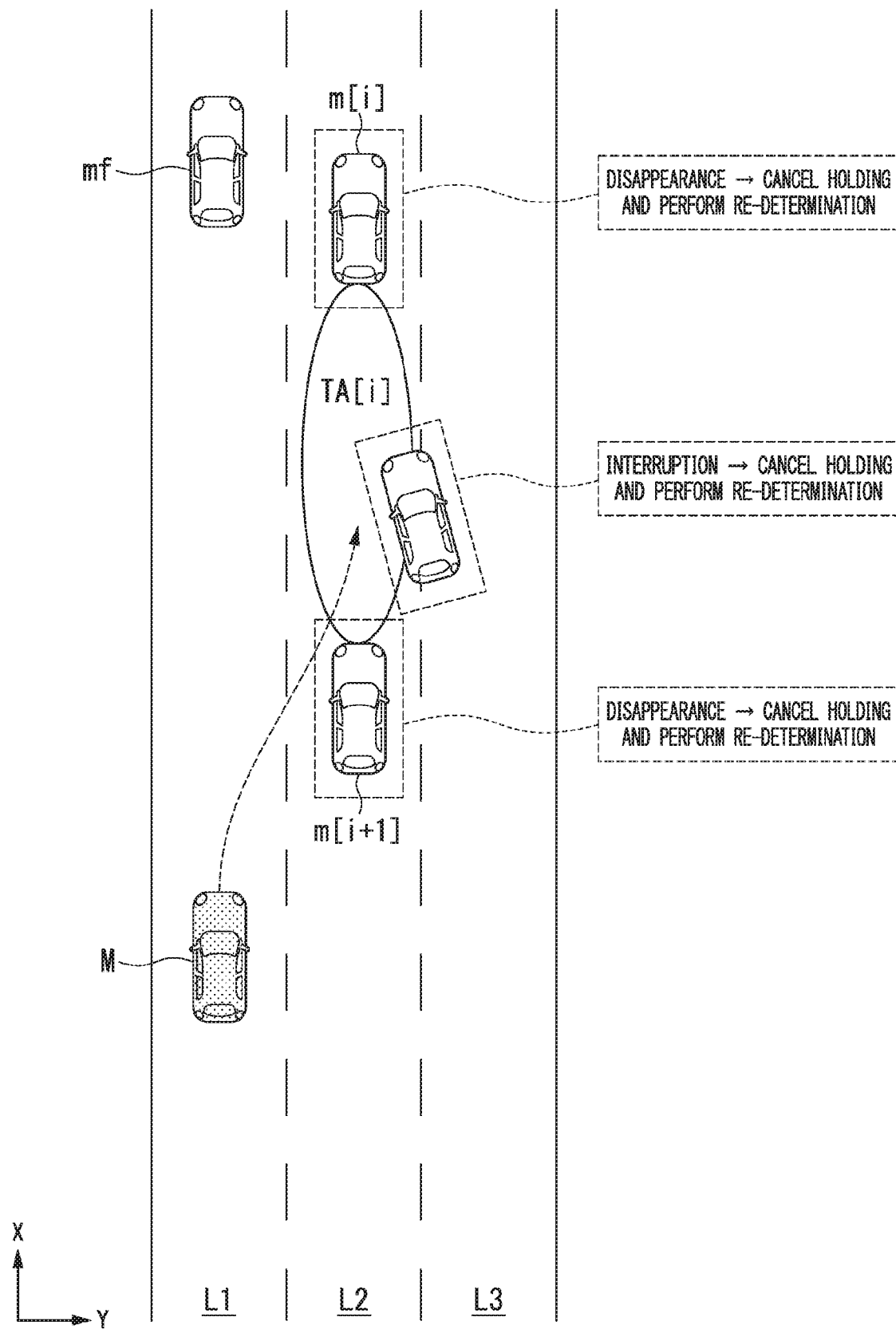
FIG. 39 is an explanatory diagram showing a relationship between disappearance of a reference vehicle, an interruption at a target position, and holding.
Figure 40:
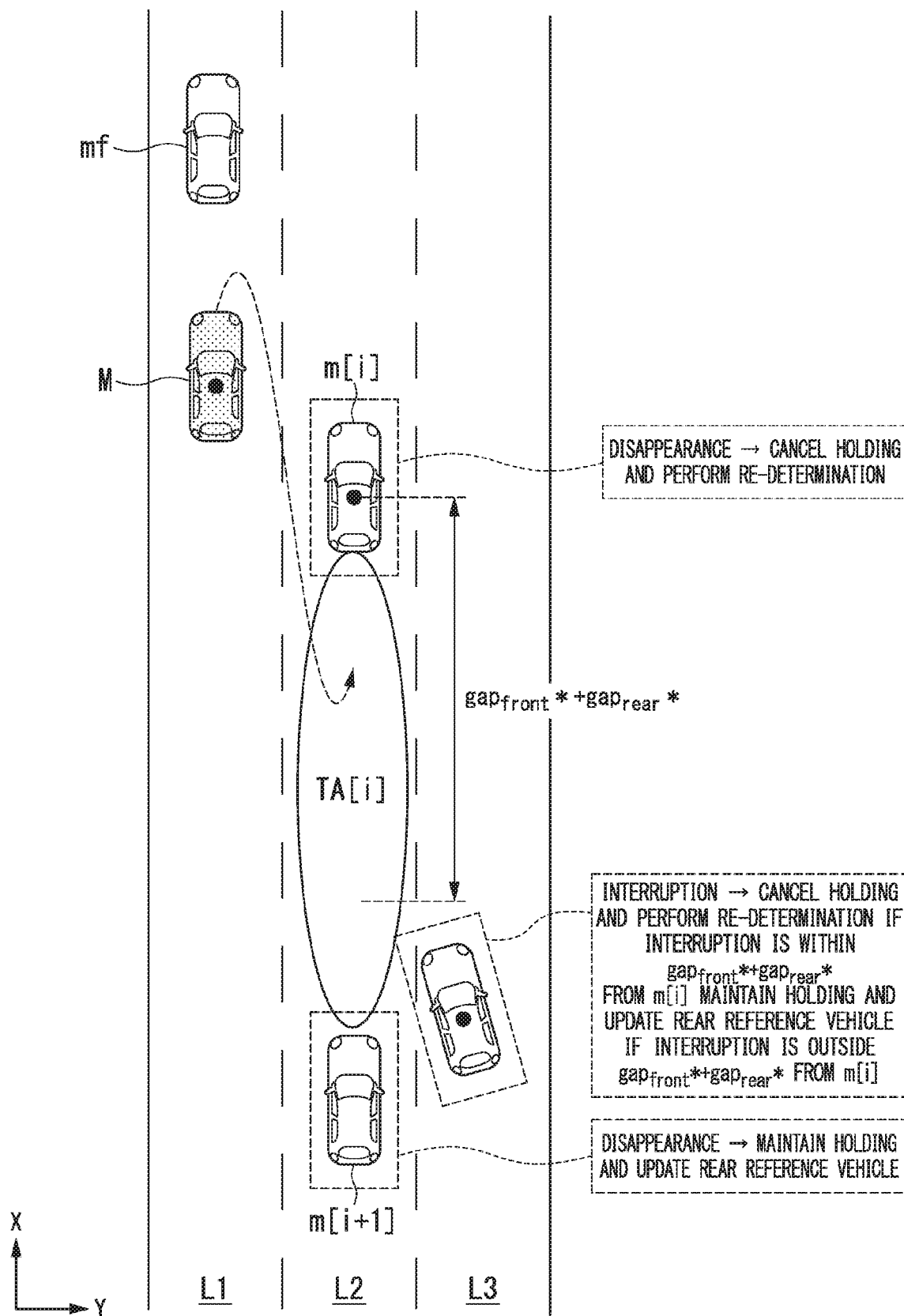
FIG. 40 is an explanatory diagram showing a relationship between disappearance of a reference vehicle, an interruption at a target position, and holding.
Figure 41:
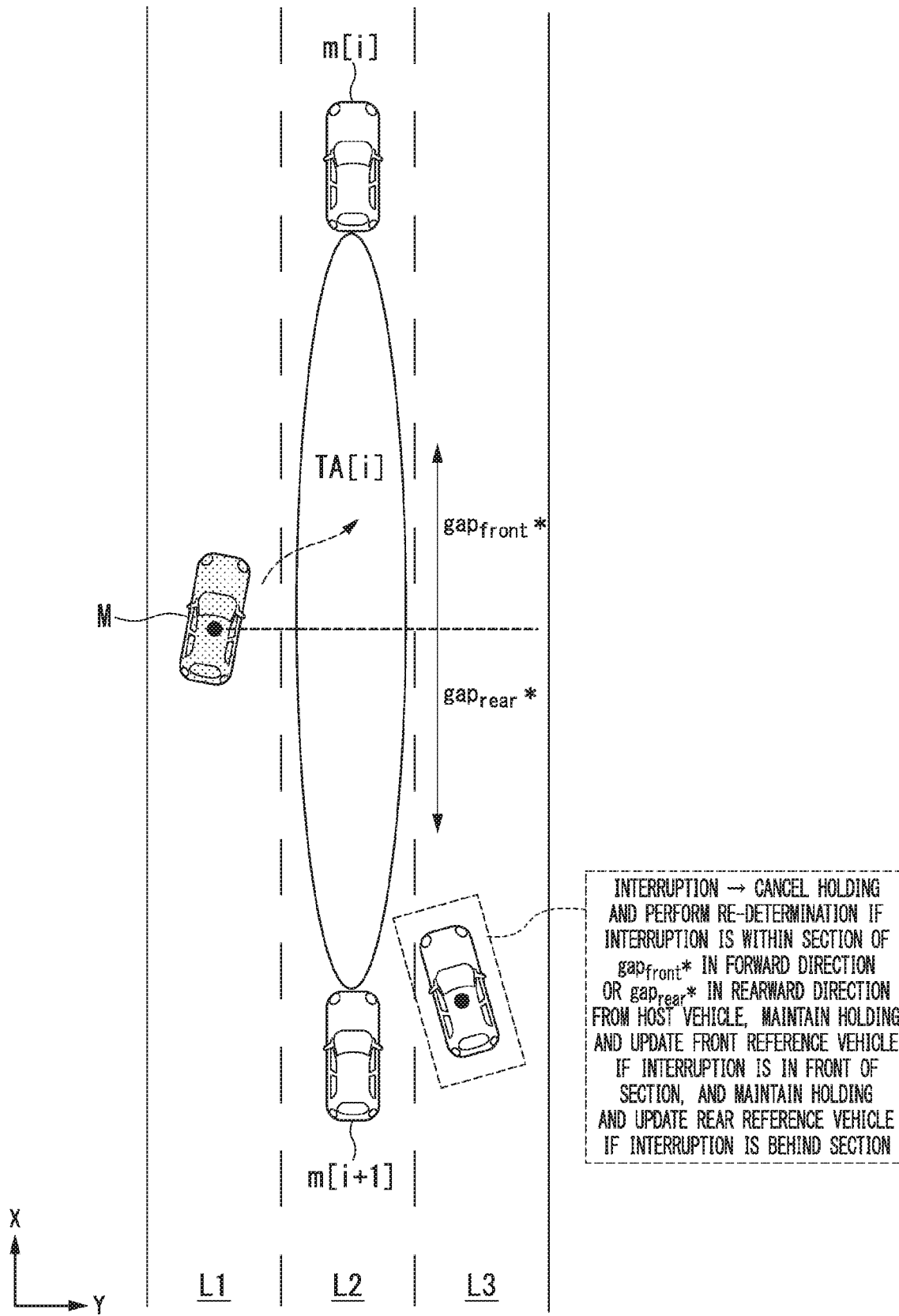
FIG. 41 is an explanatory diagram showing a relationship between disappearance of a reference vehicle, an interruption at a target position, and holding.

FIGS. 39 to 41 are explanatory diagrams showing a relationship between the disappearance of the reference vehicle, the interruption at the target position TA, and the holding.

FIG. 39 is a diagram showing an example of a scene in which the host vehicle M is aligned forward, i.e., a scene in which the rear reference vehicle m[i+1] is a reference vehicle. In this scene, when the front reference vehicle m[i] has disappeared, the holding cancellation determiner 152A cancels the holding because the reference for speed control has disappeared (steps S404 and S420 of FIG. 36). Even when the rear reference vehicle m[i+1] has disappeared, the holding cancellation determiner 152A cancels the holding because the ratio relative to the reference vehicle cannot be set (step S430 of FIG. 37 and S420 of FIG. 36). When an interrupting vehicle has occurred, the holding cancellation determiner 152A cancels the holding because the reference of the speed control has changed (steps S456 and S458 of FIG. 38 and S420 of FIG. 36).

FIG. 40 is a diagram showing an example of a scene in which the host vehicle M is aligned rearward, i.e., a scene in which the front reference vehicle m[i] is a reference vehicle. In this scene, when the front reference vehicle m[i] has disappeared, the holding cancellation determiner 152A cancels the holding because the reference of speed control has disappeared (steps S404 and S420 of FIG. 36). When the rear reference vehicle m[i+1] has disappeared, the holding cancellation determiner 152A updates the rear reference vehicle m[i+1] by determining another vehicle m[i+2] that travels behind the rear reference vehicle m[i+1] as a new rear reference vehicle m[i+1] and maintains the holding (steps S430 and S432 of FIG. 37 and S418 of FIG. 36). When an interrupting vehicle has occurred, the holding cancellation determiner 152A cancels the holding because the lane change is impossible in a space behind the front reference vehicle m[i] when the interrupting vehicle causes an interruption within a section of $gap_{front}^*+gap_{rear}^*$ in the rearward direction from the representative point of the front reference vehicle m[i] (steps S450 and S452 of FIG. 38 and S420 of FIG. 36). On the other hand, when the interrupting vehicle has caused an interruption outside a section of $gap_{front}^*+gap_{rear}^*$ in the rearward direction from the representative point of the front reference vehicle m[i], the holding cancellation determiner 152A updates the rear reference vehicle m[i+1] by determining the interrupting vehicle as a new rear reference vehicle m[i+1], and maintains the holding because the lane change is possible between the front reference vehicle m[i] and the interrupting vehicle (step S450, S452, and S454 of FIG. 38 and S418 of FIG. 36).

FIG. 41 is a diagram showing an example of a scene in which the host vehicle M intends to make a lane change to a position just beside the host vehicle M, i.e., a scene in which there is no reference vehicle. In this case, when an interrupting vehicle has occurred, the holding cancellation determiner 152A cancels the holding if there is an interruption in a section from the representative point of the host vehicle M to a point of $gap_{front}^*$ in the forward direction or a point of $gap_{rear}^*$ in the rearward direction. The holding cancellation determiner 152A updates the front reference vehicle m[i] when there is an interruption in front of the section and updates the rear reference vehicle m[i+1] when there is an interruption behind the section.

Returning to FIG. 36, when a negative determination is obtained in step S412, the holding cancellation determiner 152A determines whether or not the front reference vehicle m[i] has shown a yield operation (step S414). Specifically, when a space of the target position TA is narrowed by a prescribed distance or more due to the deceleration of the front reference vehicle m[i], the holding cancellation determiner 152A determines that the front reference vehicle m[i] has shown the yield operation. When the front reference vehicle m[i] has shown the yield operation, the holding cancellation determiner 152A moves the process to step S420. In this case, the holding cancellation determiner 152A may instruct the target position determiner 150 to skip the setting and evaluation of the target position candidate cTA and set a position in front of the front reference vehicle m[i] as a new target position TA.

When a negative determination is obtained in step S414, the holding cancellation determiner 152A determines whether or not prescribed time has elapsed from an operation of the timer (step S416). When the prescribed time has elapsed, the holding cancellation determiner 152A moves the process to step S420.

The holding cancellation determiner 152A may change the prescribed time which is a criterion of the determination of step S416 in accordance with a degree of progress of the lane change. The degree of progress of the lane change is, for example, a value derived by the progress rate PRx in the longitudinal direction, the progress rate PRy in the lateral direction of the lane change, the ratio, or a combination thereof. The holding cancellation determiner 152A may lengthen the prescribed time when the degree of progress of the lane change is low and may shorten the prescribed time when the degree of progress of the lane change is high.

When the prescribed time has not elapsed, the holding cancellation determiner 152A determines whether or not a route is blocked by a preceding vehicle or a following vehicle during the lane change (step S417). The process of the present step is a process in which the processing of step S228 of FIG. 8 and the processing of step S260 of FIG. 15 are OR-connected. That is, when the target position TA is in front of the host vehicle M, the holding cancellation determiner 152A determines that the route is blocked by the preceding vehicle during the lane change (FIG. 13) if the host vehicle M is assumed to be at a position of an inter-vehicle distance equivalent to the rear allowance distance $gap_{rear}$ from the reference vehicle m[i+1] or if an inter-vehicle distance between the host vehicle M and a preceding vehicle mAf that travels in the same direction on the same lane is less than the following inter-vehicle distance gape (see Eq. (3)). When the target position TA is behind the host vehicle M, the holding cancellation determiner 152A determines that the route is blocked by the following vehicle during the lane change (FIG. 16) if the host vehicle M is assumed to be at a position of an inter-vehicle distance equivalent to the front allowance distance $gap_{front}$ from the reference vehicle m[i] or if an inter-vehicle distance between the host vehicle M and a following vehicle mAr that travels in the same direction on the same lane is less than the followed inter-vehicle distance $gap_{fr}$ (see Eq. (4)).

If it is determined that the route is not blocked by the preceding vehicle or the following vehicle during the lane change, the holding cancellation determiner 152A maintains the holding (step S418). Thereafter, the holding cancellation determiner 152A determines whether or not the lane change has been completed (step S422).

When the lane change has not been completed, the holding cancellation determiner 152A returns the process to step S402 and ends the process of the present flowchart when the lane change has been completed.

The holding cancellation determiner 152A does not cancel the holding when at least a part of the vehicle is recognized by the recognizer 130 even if the front reference vehicle or the rear reference vehicle is outside a guaranteed range of the sensor.

According to the processing of the holding cancellation determiner 152A described above, it is possible to prevent hunting from occurring in control and implement a stable lane change.

[Hardware Configuration]

Figure 42:
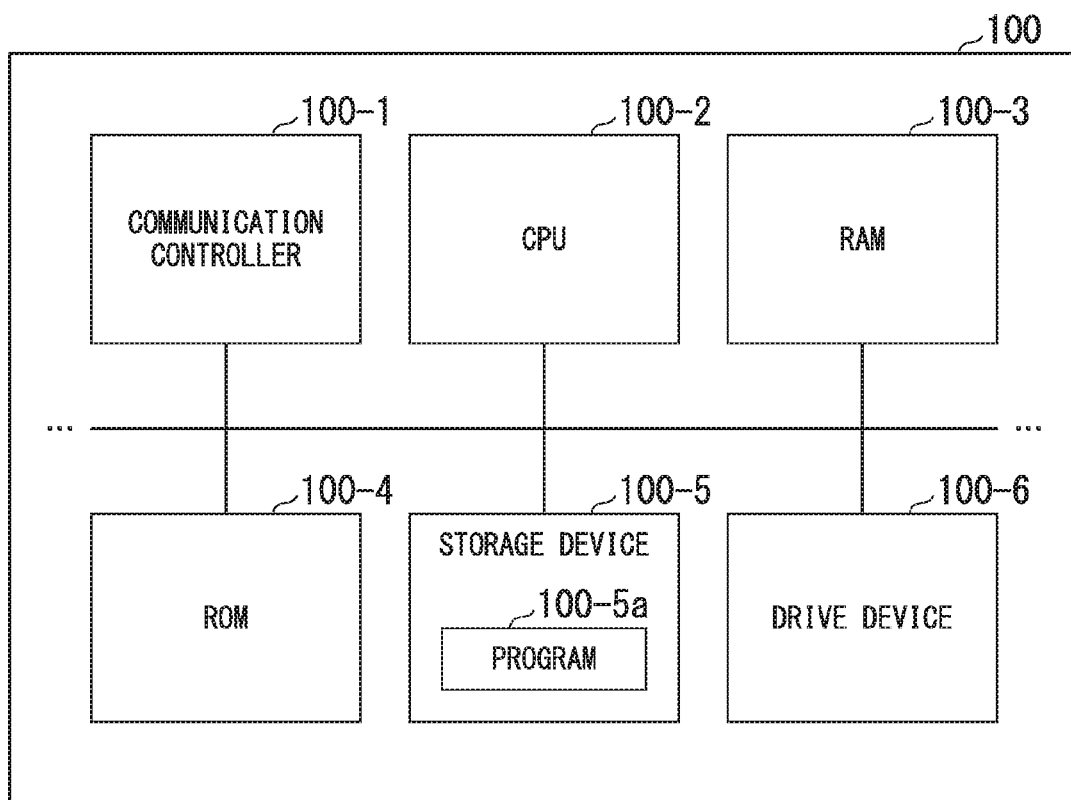
FIG. 42 is a diagram illustrating an example of a hardware configuration of the automatic driving control device of the embodiment.

FIG. 42 is a diagram showing an example of a hardware configuration of the automated driving control device 100 of the embodiment. As shown, the automated driving control device 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6, and the like are mutually connected by an internal bus or a dedicated communication line. The communication controller 100-1 communicates with components other than the automated driving control device 100. A program 100-5a executed by the CPU 100-2 is stored in the storage device 100-5. This program is loaded to the RAM 100-3 by a direct memory access (DMA) controller (not shown) or the like and executed by the CPU 100-2. Thereby, some or all of the recognizer 130, the action plan generator 140, and the second controller 160 are implemented.

The above-described embodiment can be represented as follows.

A vehicle control device including:

a storage device configured to store a program; and a hardware processor, wherein the hardware processor executes the program stored in the storage device to:

recognize a surrounding situation of a host vehicle;

control acceleration/deceleration and steering of the host vehicle on the basis of a recognition result;

determine a target speed of the host vehicle by reflecting a first target speed based on a relationship between a first vehicle that travels in front of the host vehicle in a first lane and the host vehicle and a second target speed based on a relationship between a second vehicle that travels in front of a target position to which the host vehicle makes a lane change in a second lane and the host vehicle in a prescribed ratio according to progress of the lane change when the host vehicle makes the lane change from the first lane to the second lane, and determine a degree of change in the prescribed ratio relative to the progress of the lane change in accordance with a type of lane change.

While modes for carrying out the present invention have been described using embodiments, the present invention is not limited to such embodiments in any way and various modifications and replacements can be added without departing from the scope of the present invention.

What is claimed is:

1. A vehicle control device comprising a processor, the processor being configured to:

recognize a surrounding situation of a host vehicle; and control acceleration/deceleration and steering of the host vehicle on the basis of a recognition result, wherein, when the processor causes the host vehicle to make a lane change from a first lane to a second lane, the processor sets a target position in the second lane, calculates a progress ratio of the lane change, and determines a target speed of the host vehicle by calculating a weighted sum of a first target speed and a second target speed using a weight based on the progress ratio, wherein, the first target speed is obtained by feedback control for making a distance between a first vehicle and the host vehicle in an extension direction closer to a first target distance, the first vehicle being a vehicle that travels in front of the host vehicle in the first lane, and the second target speed is obtained by feedback control for making a distance between the second vehicle and the host vehicle in an extension direction closer to a second target distance, the second vehicle being a vehicle that travels in front of the target position in the second lane, and wherein the processor changes the calculation way to calculate the progress ratio in accordance with a type of lane change.

2. The vehicle control device according to claim 1, wherein the processor calculates the progress ratio in accordance with progress of the lane change in an extension direction of a road and/or progress of the lane change in a width direction of the road.

3. The vehicle control device according to claim 1, wherein the processor changes the way to calculate the progress ratio between a first case in which the host vehicle is able to move to the target position without changing relative positions of the host vehicle and the second vehicle in a road extension direction at a start time point of the lane change and a second case in which it is necessary to change the relative positions of the host vehicle and the second vehicle so that the host vehicle is moved to the side of the target position at the start time point of the lane change.

4. The vehicle control device according to claim 3, wherein the processor sets the weight of the second target speed at the start time point of the lane change to a value exceeding zero in the first case.

5. The vehicle control device according to claim 3, wherein the processor makes an increase rate of the weight of the second target speed smaller after the host vehicle reached the side of the target position, than the increase rate of the weight of the second target speed before the host vehicle reached the side of the target position in the first case.

6. The vehicle control device according to claim 3, wherein, in the second case, the processor makes an increase rate of the weight of the second target speed before a first time point smaller than an increase rate of the weight of the second target speed after the first time point.

7. The vehicle control device according to claim 6, wherein, in the second case, the processor makes an increase rate of the weight of the second target speed before a second time point after the first time point larger than an increase rate of the weight of the second target speed after the second time point.

8. The vehicle control device according to claim 1, wherein, after the host vehicle enters the second lane, the processor controls the acceleration/deceleration of the host vehicle so that a distance between the second vehicle and the host vehicle is extended.

9. The vehicle control device according to claim 1, wherein the processor sets a predetermined prescribed speed as the first target speed or the second target speed when there is no object vehicle in an appropriate range when the first target speed or the second target speed is determined.

10. A vehicle control method using a computer mounter in the vehicle, comprising:

recognizing, a surrounding situation of a host vehicle; and controlling, acceleration/deceleration and steering of the host vehicle on the basis of a recognition result, wherein, when the computer causes the host vehicle to make a lane change from a first lane to a second lane, the method further comprising:

setting a target position in the second lane;

calculating a progress ratio of the lane change;
determining a target speed of the host vehicle by calculating a weighted sum of a first target speed and a second target speed using a weight based on the progress ratio; and
changing the calculation way to calculate the progress ratio in accordance with a type of lane change, and
wherein, the first target speed is obtained by feedback control for making a distance between a first vehicle and the host vehicle in an extension direction closer to a first target distance, the first vehicle being a vehicle that travels in front of the host vehicle in the first lane, and the second target speed is obtained by feedback control for making a distance between the second vehicle and the host vehicle in an extension direction closer to a second target distance, the second vehicle being a vehicle that travels in front of the target position in the second lane.

11. A computer-readable non-transitory storage medium storing a program for causing a computer to:
recognize a surrounding situation of a host vehicle; and
control acceleration/deceleration and steering of the host vehicle on the basis of a recognition result,
wherein, when the computer causes the host vehicle to make a lane change from a first lane to a second lane, the program further causing the computer to:
set a target position in the second lane;
calculate a progress ratio of the lane change;
determine a target speed of the host vehicle by calculating a weighted sum of a first target speed and a second target speed using a weight based on the progress ratio; and
change the calculation way to calculate the progress ratio in accordance with a type of lane change, and
wherein, the first target speed is obtained by feedback control for making a distance between a first vehicle and the host vehicle in an extension direction closer to a first target distance, the first vehicle being a vehicle that travels in front of the host vehicle in the first lane, and the second target speed is obtained by feedback control for making a distance between the second vehicle and the host vehicle in an extension direction closer to a second target distance, the second vehicle being a vehicle that travels in front of the target position in the second lane.

* * * * *